_(12)_ United States Patent
Yeager et al.

(10) Patent No.: US 7,222,187 B2
(45) Date of Patent: *May 22, 2007

(54) DISTRIBUTED TRUST MECHANISM FOR DECENTRALIZED NETWORKS

(75) Inventors: William J. Yeager, Menlo Park, CA (US); Rita Y. Chen, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 791 days.

This patent is subject to a terminal disclaimer.

(21) Appl. No.: 10/164,535

(22) Filed: Jun. 7, 2002

(65) Prior Publication Data

US 2003/0028585 A1 Feb. 6, 2003

Related U.S. Application Data

(60) Provisional application No. 60/308,932, filed on Jul. 31, 2001.

(51) Int. Cl.
*G06F 15/16* (2006.01)
(52) U.S. Cl. ............... 709/237; 709/217
(58) Field of Classification Search .......... 709/217, 709/237, 230, 200–203, 218–227
See application file for complete search history.

(56) References Cited

U.S. PATENT DOCUMENTS

| 5,220,657 A | 6/1993 | Bly et al. |
| 5,479,514 A | 12/1995 | Klonowski |
| 5,619,657 A | 4/1997 | Sudama et al. |
| 5,627,892 A | 5/1997 | Kauffman |
| 5,671,428 A | 9/1997 | Muranaga et al. |
| 5,745,574 A | 4/1998 | Muftic |
| 5,812,793 A | 9/1998 | Shakib et al. |
| 5,832,514 A | 11/1998 | Norin et al. |
| 5,896,503 A | 4/1999 | Badovinatz et al. |

(Continued)

FOREIGN PATENT DOCUMENTS

EP 1229442 8/2002

OTHER PUBLICATIONS

Oram, Andy (editor); Peer-to-peer: Harnessing the Benifits of a Disruptive Technology; Mar. 2001; O'Reilly & Associates; First Edition; Chapters 16 and 18.*

(Continued)

*Primary Examiner*—Moustafa M. Meky
(74) *Attorney, Agent, or Firm*—Robert C Kowert; Meyertons, Hood, Kivlin, Kowert & Goetzel, P.c.

(57) ABSTRACT

Embodiments of a decentralized, distributed trust mechanism that may be used in various networking platforms including peer-to-peer platforms, to implement trust relationships between and among nodes on a network and to implement trust relationships between nodes and content and data (codat). Protocols and methods may be provided for determining, disseminating and updating trust. For participating nodes, trust may be biased towards data relevance. Trust may have multiple components or factors, which may include node confidence, codat confidence and risk components, and embodiments may provide for the inclusion of factors of trust based on groups of nodes' common interests and/or group content relevance. Embodiments may be used for a variety of applications in which trust may be based on the norm for social interaction between participating nodes.

40 Claims, 17 Drawing Sheets

U.S. PATENT DOCUMENTS

| | | | |
|---|---|---|---|
| 5,964,837 A | 10/1999 | Chao et al. | |
| 5,987,446 A | 11/1999 | Corey et al. | |
| 5,995,951 A | 11/1999 | Ferguson | |
| 6,029,192 A | 2/2000 | Hill et al. | |
| 6,067,551 A | 5/2000 | Brown et al. | |
| 6,078,914 A | 6/2000 | Redfern | |
| 6,134,550 A | 10/2000 | Van Oorschot et al. | |
| 6,182,136 B1 | 1/2001 | Ramanathan et al. | |
| 6,233,601 B1 | 5/2001 | Walsh | |
| 6,269,099 B1 | 7/2001 | Borella et al. | |
| 6,446,113 B1 * | 9/2002 | Ozzie et al. | 709/204 |
| 6,473,761 B1 | 10/2002 | Shigemori et al. | |
| 6,560,217 B1 | 5/2003 | Peirce, Jr. et al. | |
| 6,584,493 B1 | 6/2003 | Butler | |
| 6,611,872 B1 | 8/2003 | McCanne | |
| 6,657,116 B1 | 12/2003 | Gunnerson | |
| 6,658,540 B1 | 12/2003 | Sicola et al. | |
| 6,671,746 B1 | 12/2003 | Northrup | |
| 6,681,282 B1 | 1/2004 | Golden et al. | |
| 6,687,878 B1 | 2/2004 | Eintracht et al. | |
| 6,697,944 B1 | 2/2004 | Jones et al. | |
| 6,810,259 B1 | 10/2004 | Zhang | |
| 6,854,016 B1 | 2/2005 | Kraenzel et al. | |
| 6,892,230 B1 | 5/2005 | Gu et al. | |
| 6,938,095 B2 | 8/2005 | Basturk et al. | |
| 6,963,867 B2 | 11/2005 | Ford et al. | |
| 7,016,306 B2 | 3/2006 | Alapuranen et al. | |
| 7,039,701 B2 | 5/2006 | Wesley | |
| 7,043,522 B2 | 5/2006 | Olson et al. | |
| 7,046,995 B2 | 5/2006 | Rygaard | |
| 7,050,861 B1 | 5/2006 | Lauzon et al. | |
| 2001/0029526 A1 | 10/2001 | Yokoyama et al. | |
| 2002/0027567 A1 | 3/2002 | Niamir | |
| 2002/0052885 A1 | 5/2002 | Levy | |
| 2002/0062375 A1 | 5/2002 | Teodosiu et al. | |
| 2002/0065848 A1 | 5/2002 | Walker et al. | |
| 2002/0071099 A1 | 6/2002 | Kurtz et al. | |
| 2002/0073075 A1 | 6/2002 | Dutta et al. | |
| 2002/0073204 A1 | 6/2002 | Dutta et al. | |
| 2002/0083145 A1 | 6/2002 | Perinpanathan | |
| 2002/0138471 A1 | 9/2002 | Dutta et al. | |
| 2002/0138576 A1 | 9/2002 | Schleicher et al. | |
| 2002/0184311 A1 | 12/2002 | Traversat et al. | |
| 2003/0009570 A1 | 1/2003 | Moskowitz et al. | |
| 2003/0009660 A1 | 1/2003 | Walker | |
| 2003/0037097 A1 | 2/2003 | Meyer et al. | |
| 2003/0055892 A1 | 3/2003 | Huitema et al. | |
| 2003/0055894 A1 | 3/2003 | Yeager et al. | |
| 2003/0055898 A1 | 3/2003 | Yeager et al. | |
| 2003/0056093 A1 | 3/2003 | Huitema et al. | |
| 2003/0061287 A1 | 3/2003 | Yu et al. | |
| 2003/0070070 A1 | 4/2003 | Yeager et al. | |
| 2003/0105812 A1 | 6/2003 | Flowers et al. | |
| 2003/0115251 A1 | 6/2003 | Fredrickson et al. | |
| 2003/0130947 A1 | 7/2003 | Benantar | |
| 2003/0152034 A1 | 8/2003 | Zhang et al. | |
| 2003/0163697 A1 | 8/2003 | Pabla et al. | |
| 2003/0191828 A1 | 10/2003 | Ramanathan et al. | |
| 2003/0191933 A1 | 10/2003 | Xu et al. | |
| 2003/0206638 A1 | 11/2003 | Xu et al. | |
| 2003/0212804 A1 | 11/2003 | Hashemi | |
| 2003/0217140 A1 | 11/2003 | Burbeck et al. | |
| 2004/0006586 A1 | 1/2004 | Melchione et al. | |
| 2004/0019514 A1 | 1/2004 | Verbeke et al. | |
| 2004/0039781 A1 | 2/2004 | La Vallee et al. | |
| 2004/0071099 A1 | 4/2004 | Costa-Requena et al. | |
| 2004/0088347 A1 | 5/2004 | Yeager et al. | |
| 2004/0088348 A1 | 5/2004 | Yeager et al. | |
| 2004/0088369 A1 | 5/2004 | Yeager et al. | |
| 2004/0088646 A1 | 5/2004 | Yeager et al. | |
| 2004/0133640 A1 | 7/2004 | Yeager | |
| 2004/0205772 A1 | 10/2004 | Uszok | |
| 2005/0086300 A1 | 4/2005 | Yeager et al. | |
| 2005/0251539 A1 | 11/2005 | Parekh et al. | |

OTHER PUBLICATIONS

Sniffen, Brian; Trust Economies in the Free Haven Project; Publisher Unknown; May 22, 2000.*

Ku, et al., "An Intelligent Mobile Agent Framework for Distributed Network Management," IEEE, 1997, pp. 160164.

Abdul-Rahman et al., "A Distributed Trust Model," 1997 New Security Paradigms Workshop, ACM 1998, (pp. 48-59).

Zacharia et al., "Trust Management Through Reputation Mechanisms," Applied Artificial Intelligence, 2000, 14:881-907.

"Frequently Asked Questions about PGPi," http://web.archive.org/web/20020207220715/http://stale.schumacher.no/email.shtml, Mar. 2, 2001, (9 pages).

Bill Yeager, "Self Constructing P2P Networks Using the Project JXTA P2P Protocols," http://netseminar.stanford.edu/sessions/2002-03-14.html, Mar. 14, 2002, (2 pages).

Cameron Ross Dunne, "Using Mobile Agents for Network Resource Discovery in Peer-to-Peer Networks," http://www.acm.org/sigs/sigecom/exchanges/volume_2_(01)/2.3-index.html, 2001, (11 pages).

Fung et al., "Part-Time MSC Project 1 Mid-Term Review report," Peer-to-Peer Networks & Mobile Agents, Oct. 31, 2001, (12 pages).

Alan Beecraft, "Peer-to-Peer: From JMS to Project JXTA Part 1: Shall we Chat?," http://java.sun.com/developer/technical/articles/peer/, Nov. 2001, 5 pages.

"LICQ Info," http://web.archive.org/web/20010808110229/www.licq.org/info.html, Aug. 8, 2001, 4 pages.

Oshima et al., "Aglets Specification 1.1 Draft," Sun Microsystems, Sep. 8, 1998, (40 pages).

"Project JXTA: An Open, Innovative Collaboration," Sun Microsystems, Inc., Apr. 25, 2001, (7 pages).

"JXTA v1.0 Protocols Specification," Sun Microsystems, Inc., 2002, (86 pages).

Traversat et al., "Project JXTA Virtual Networks," Sun Microsystems, Inc., Feb. 5, 2002, (10 pages).

Lange et al., "Mobile Agents with Java: The Aglet API," World Wide Web, vol. 1, Issue 3, 1998, (pp. 111-121).

Rita Chen, et al., "Poblano: A Distributed Trust Model for Peer-to-Peer Networks," Sun Microsystems, Inc., Aug. 2001, XP002392926, 26 pages.

European Search Report for Application No. 02255374.7-2211, mailed Aug. 22, 2006, 3 pages.

Karl Aberer, et al., "Managing Trust in a Peer-2-Peer Information System," 2001 ACM, pp. 310-317.

* cited by examiner

| Value | Meaning |
|---|---|
| -1 | Distrust |
| 0 | Ignore |
| 1 | Minimal trust |
| 2 | Average trust |
| 3 | Good trust |
| 4 | Complete trust |

FIG. 6

DISTRIBUTED TRUST MECHANISM FOR DECENTRALIZED NETWORKS

PRIORITY INFORMATION

This application claims benefit of priority to provisional application Ser. No. 60/308,932 filed Jul. 31, 2001 titled Trust Mechanism For A Peer-To-Peer Network Computing Platform.

BACKGROUND OF THE INVENTION

1. Field of the Invention

This invention relates to computer networks, and more particularly to a distributed trust mechanism for decentralized computer networking environments.

2. Description of the Related Art

Trust is at the core of most relationships between human beings. The parameters of trust are often personal, and thus, decentralization is the nature of trust, because each individual has his/her own opinions. On a decentralized network, such as a Peer-to-Peer (P2P) network, users may see from where information arrives, as well as communicate their opinions on both the information they have acquired and the peers who are its source. These personal opinions may be collected, exchanged, and evaluated. Furthermore, these opinions, when evaluated, may be used as guidelines for searching for information, and recommending information sources, thus, creating decentralized, personalized "Webs of Trust."

When such a decentralized trust model is implemented on a P2P topology, trust between peers may begin to mirror those real-world relationships with which users are familiar, and may permit software engineers to craft interfaces to the underlying trust model that are both understandable and usable. Trust becomes a social contract with social implications for the participants. Each such peer may develop a reputation among his peers, which may be the basis for P2P trust relationships.

In current trust or reputation models, the degree of trust is calculated with parameters such as performance, honesty, reliability, etc., of a given peer. If a peer cheats at playing cards, for example, the peer might be deprived of his ability to authenticate and join another card game.

However, for a group of people interested in cooking, the above measurement may be too biased towards personal risk and not content, and may thus be of little use. Hence, for a group such as a cooking group, it may desirable that trust be biased towards data relevance, or the quality of recipes. Trust may have multiple components or factors, and a factor of trust which is based on the group's interests and/or group content relevance, may be important.

Prior art implementations for certificate distribution, such as SSL and TLS, typically require certificates to be signed by recognized, trusted certificate authorities to both establish identity, and exchange public keys for public-key algorithms such as RSA and Diffy-Hellman. In a peer-to-peer network, it may be undesirable to require every participating peer to acquire, i.e., pay for, a Certificate Authority signed certificate in order to implement, for example, peer-to-peer TLS. In some embodiments, peer-to-peer zero-dollar-cost certificates may be desirable.

The ability to move one's private security environment from device to device may be desirable. For example, having multiple identities may be confusing and may add unwanted complexity to a security model. Since a private security environment may include information such as a user's private key, trusted root certificates, and peer group credentials, it may be desirable for mobility to be under the constraints of strong security. If a private key is no longer private, one's security environment, and all of the associated relationships may need to be recreated from zero.

The IETF's (Internet Engineering Task Force) SACRED Working Group is working on the standardization of a set of protocols for securely transferring credentials among devices. A general framework is being developed that may provide an abstract definition of protocols which may meet the credential-transfer requirements. This framework may allow for the development of a set or sets of protocols, which may vary from one another in some respects. Specific protocols that conform to the framework may then be developed.

Peer-to-Peer Computing Environment

Peer-to-peer (P2P) computing, embodied by applications like Napster, Gnutella, and Freenet, has offered a compelling and intuitive way for Internet users to find and share resources directly with each other, often without requiring a central authority or server. The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems. FIG. 1A illustrates two peer devices 104A and 104B that are currently connected. Either of the two peer devices 104 may serve as a client of or a server to the other device. FIG. 1B illustrates several peer devices 104 connected over the network 106 in a peer group. In the peer group, any of the peer devices 104 may serve as a client of or a server to any of the other devices.

SUMMARY OF THE INVENTION

Embodiments of a decentralized, distributed trust mechanism are described that may be used in various networking platforms, including, but not limited to, peer-to-peer and other decentralized networking platforms. The mechanism may be used, among other things, to implement trust relationships between and among peers and to implement trust relationships between peers and content and data (codat). Protocols and methods may be provided for disseminating and updating trust. For participating peers, trust may be biased towards data relevance, e.g. the quality of recipes in a cooking peer group in some embodiments. Trust may have multiple components or factors, and embodiments of the decentralized trust mechanism may provide for the inclusion of factors of trust based on a peer group's interests and/or group content relevance. Embodiments of the decentralized trust mechanism may be used for a variety of applications. In general, embodiments may be used for applications in which trust may be based on the norm for social interaction between participating peers.

Embodiments may provide mechanisms for representing trust between peers or systems in decentralized networking environments including peer-to-peer networking environments. This trust may be used, for example, when providing and/or acquiring content and data (codat) from peers in a common area of interest. Trust may include both direct trust between two peers and trust in a pipeline of peers along which codat may be passed. In order to evaluate trust, in one embodiment, trust may be represented with two components, confidence and risk. Embodiments may provide mechanisms for measuring the components, and may provide mechanisms for feeding back trust information to other peers.

The trust mechanism may include a codat trust component that may be used in collecting information associated with a group's interests. In order to evaluate trust with respect to a peer's interests, the peer's interests may be represented as one or more keywords. A user of a peer may evaluate trust in a codat to build a trust with that codat for the peer. In one embodiment, the peer may receive codat from another peer and may evaluate trust with respect to the peer's interest in the received codat. This evaluation may be made, for example, using search results (e.g. relevance) and user evaluation (e.g. the user's rating of the codat), and may generate or update codat confidence in the received codat. In one embodiment, peer confidence in the providing peer may be used in determining codat confidence. In one embodiment, the codat may be received from a providing peer over a path of one or more other peers, and peer confidences in the one or more providing peers may be used in determining codat confidence.

The results (codat confidence) of the interest evaluation on the codat received from the other peer may then be used to evaluate the peer's trust in the other peer (trust may be a function of peer confidence and possibly one or more other factors, including risk) as a source for codat corresponding to one or more keywords which represent areas of interests of the peer. Thus, evaluations of trust on a peer (for codat, paths, other peers, etc.) may be based on content and relative to areas of interest. From a user's perspective, rating codat may be generally easier than rating a peer. Note that other peers may perform similar trust evaluations of the peer.

The codat trust component is based on content, and differs from the traditional trust concept based on risk, which may be identified as the risk trust component. The risk trust component's value may be determined by one or more factors including, but not limited to: codat integrity, peer accessibility, and peer performance.

On a network comprising a plurality of peer nodes, each peer may build a trust relationship with one or more of the other peers to form a "web of trust." Each peer may belong to one or more peer groups. Each peer group may be formed or joined based upon a particular area of interest, which may be represented by a particular keyword. In one embodiment, a peer group may be associated with two or more areas of interests, and thus keywords. In one embodiment, two or more peer groups may be associated with the same area of interest, and thus keyword. Peers may exchange codats relevant to an area of interest within a peer group (or, in one embodiment, with peers outside the peer group), determine codat confidence in the codat, and determine peer confidences relative to the area of interest for the providing peers using the codat confidences in codat relevant to the area of interest received from the peers. Trust relationships between peers thus may be based on content (the codat trust component) instead of or in combination with the risk trust component. Peers may also propagate codat confidence and peer confidence information to other peers. Propagated confidences in peers and/or codats may be used in determining peer and/or codat confidences, and trust, by the peers.

BRIEF DESCRIPTION OF THE DRAWINGS

FIG. 6 illustrates one embodiment of a table of trust values with corresponding significances or meanings;

Figure 1A:
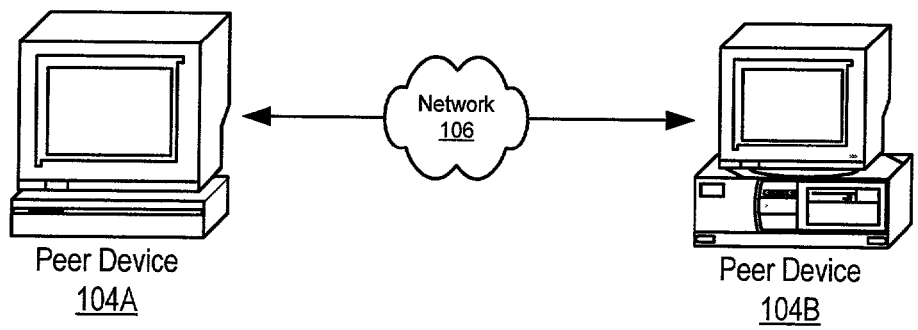
FIG. 1A illustrates a prior art example of two devices that are currently connected as peers.
Figure 1B:
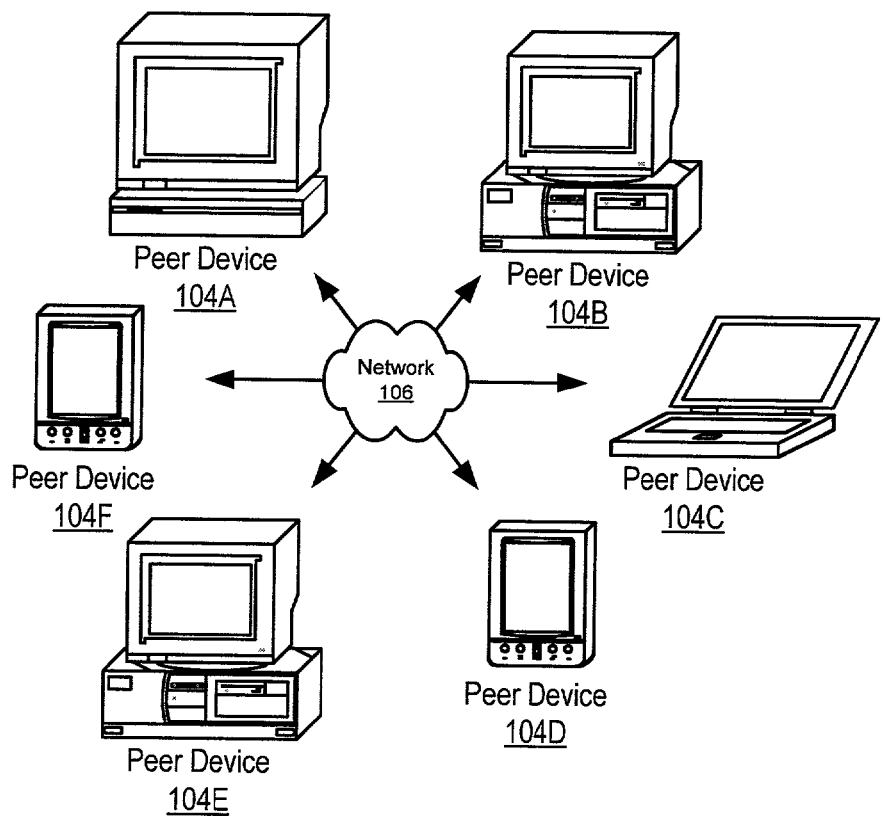
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a decentralized, distributed trust mechanism are described that may be used in various networking platforms, including, but not limited to, peer-to-peer and other decentralized networking platforms. The mechanism may be used, among other things, to implement trust relationships between and among peers and to implement trust relationships between peers and content and data (codat). Protocols and methods may be provided for disseminating and updating trust. For participating peers, trust may be biased towards data relevance, e.g. the quality of recipes in a cooking peer group in some embodiments. Trust may have multiple components or factors, and embodiments of the decentralized trust mechanism may provide for the inclusion of factors of trust based on a peer group's interests and/or group content relevance.

The term "codat" as used herein refers to any computer content—code, data (static and dynamic), documents, applications, certificates, or any other collection of computer-representable resources. Examples of codat may include, but are not limited to: text files, photographs, applets, executable files, serialized Java objects, SOAP messages, certificates, etc. Codat may also include abstractions, for example, routes or paths in a network.

Embodiments may provide mechanisms for representing trust between peers or systems in decentralized networking environments including peer-to-peer networking environments. This trust may be used, for example, when providing and/or acquiring content and data (codat) from peers in a common area of interest. Trust may include both direct trust between two peers and trust in a pipeline of peers along which codat may be passed.

Embodiments may provide a mechanism for a peer to represent and rate the trustworthiness of codat acquired from another peer according to the peer's interest. For example, an area of interest may be represented by a keyword, and a peer may perform a keyword search on the network to find codats relevant to the area of interest. In order to evaluate trust, in one embodiment, trust may be represented with two components, confidence and risk. Embodiments may provide mechanisms for measuring the components, and may provide mechanisms for feeding back trust information to other peers.

Embodiments of this decentralized trust mechanism may be used for a variety of applications. One exemplary application of this trust mechanism may be to perform reputation-guided searching. Another exemplary application of the trust mechanism may be to build a recommendation system for security purposes. In general, embodiments may be used for applications in which trust may be based on the norm for social interaction between participating peers.

In a distributed network such as a distributed peer-to-peer network, embodiments may provide a mechanism to dynamically measure the confidence in exchanged content from the viewer's perspective. Confidence may refer to the relevance of codat in response to a keyword search in an area of interest. In a keyword search, content may be acquired from a chain of requests traversing any number of peers in a peer group. Such a chain of requests may be referred to as a pipe or path.

Figure 2A:
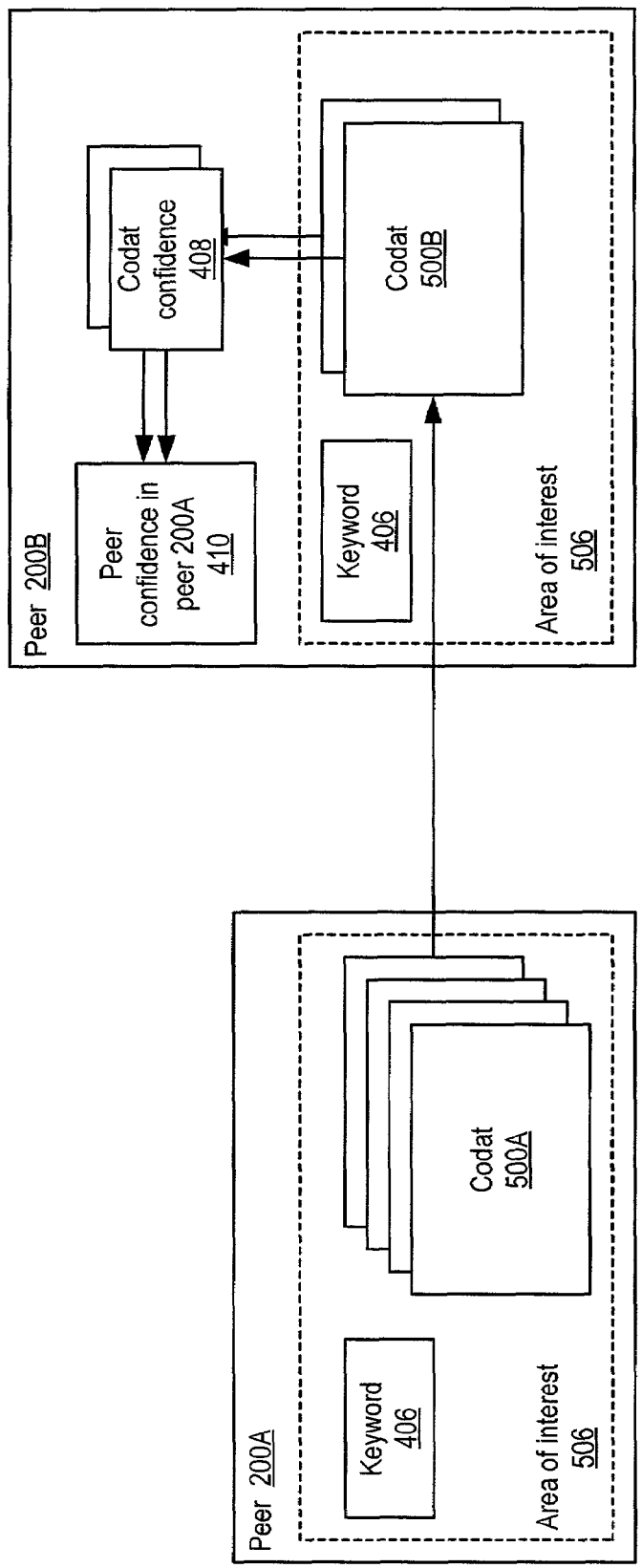
FIG. 2A illustrates trust relationships between peers and between peers and codat according to one embodiment.

FIG. 2A illustrates trust relationships between peers and between peers and codat according to one embodiment. The trust mechanism may include a codat trust component that may be used in collecting information associated with a group's interests. In order to evaluate trust with respect to a peer 200B's interests, the peer's interests may be represented as one or more keywords 406. A user (i.e. of the peer 200B) may evaluate trust in a codat 500 to build a trust relationship for peer 200B with that codat. In one embodiment, the peer 200B may receive codat 500 from another peer 200A and may evaluate trust with respect to the peer's interest in the received codat 500. This evaluation may be made, for example, using search results (e.g. relevance) and user evaluation (e.g. user rating of the codat 500 using a GUI), and may generate or update codat confidence 408 in the received codat 500. In one embodiment, peer confidence 410 in the providing peer may be used in determining codat confidence 408. In one embodiment, the codat 500 may be received from a providing peer over a path of one or more other peers 200, and peer confidences 410 in the one or more providing peers may be used in determining codat confidence 408.

The results of the interest evaluation on the codat received from peer 200A, codat confidence 408, may then be used to evaluate peer 200B's trust in peer 200A (trust is a function of peer confidence 410 and possibly one or more other factors) as a source for codat 500 corresponding to one or more keywords 406 which represent areas of interests 506 of the peer 200B. Thus, evaluations of trust on a peer (for codat, paths, other peers, etc.) may be based on content and relative to areas of interest. From a user's perspective, rating codat 500 may be generally easier than rating a peer 200. Note that peer 200A may perform a similar trust evaluation of peer 200B.

The codat trust component is based on content, and differs from the traditional trust concept based on risk, which may be identified as the risk trust component. The risk trust component's value may be determined by one or more factors including, but not limited to: codat integrity (e.g., the codat contained a virus as noted by a virus pre-processor), peer accessibility (is the peer up most of the time), and peer performance (long delays in retrieving data).

Figure 2B:
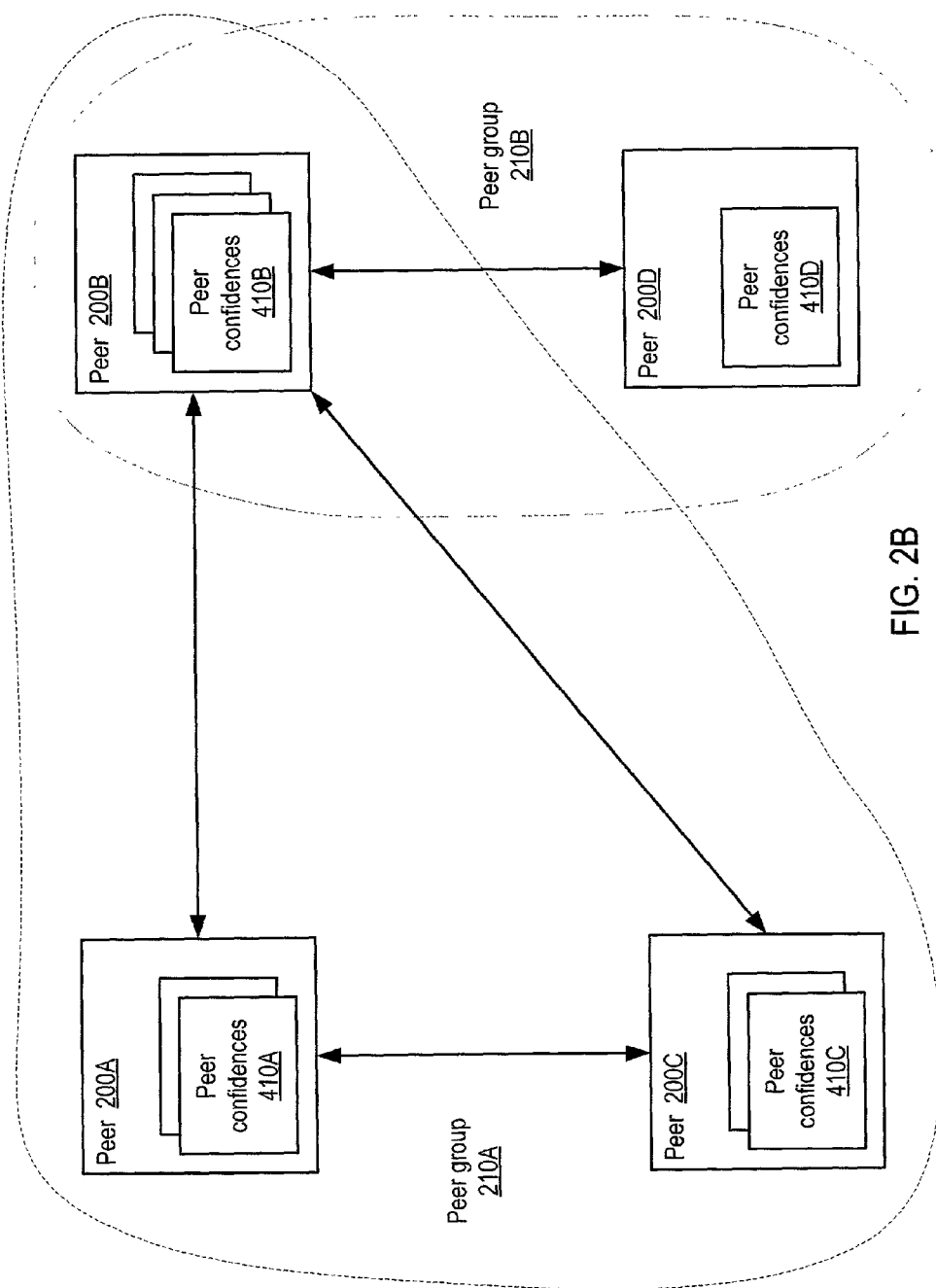
FIG. 2B illustrates peers in a "web of trust" according to one embodiment.

On a network comprising a plurality of peer nodes, each peer may build a trust relationship with one or more of the other peers to form a "web of trust" as illustrated in FIG. 2B according to one embodiment. Each peer 200 may belong to one or more peer groups 210. Each peer group 210 may be formed or joined based upon a particular area of interest, which may be represented by a particular keyword. In one embodiment, a peer group 210 may be associated with two or more areas of interests, and thus keywords. In one embodiment, two or more peer groups may be associated with the same area of interest, and thus keyword. Peers 200 may exchange codats relevant to an area of interest within a peer group (or, in one embodiment, with peers 200 outside the peer group), determine codat confidence in the codat, and determine peer confidences relative to the area of interest for the providing peers using the codat confidences in codat relevant to the area of interest received from the peers 200. Trust relationships between peers 200 thus may be based on content (the codat trust component) instead of or in combination with the risk trust component. Peers 200 may also propagate codat confidence and peer confidence information to other peers 200.

In one embodiment, a peer, for example peer 200D, may receive codat from another peer, for example peer 200C, via one or more intermediary peers 200. In this example, there are two paths between peer 200C and peer 200D, one through peers 200A and 200B, and one through 200B. In one embodiment, a codat confidence may be determined using confidence information for the path, which may include peer confidences 410 in peers on the path.

In general, peers 200 are not necessarily members of all peer groups 210, and new peers 200 may not initially belong to any peer group 210. In one embodiment, since peer group membership may be motivated by keyword/interest, peers 200 that are not members of a particular peer group 210 may be allowed to retrieve peer confidence information from the peer group 210 to use as initial peer confidence information for the peer group 210. In one embodiment, peers 200 that are not members of a particular peer group 210 may also be allowed to retrieve codat confidence information from the peer group 210.

Figure 3:
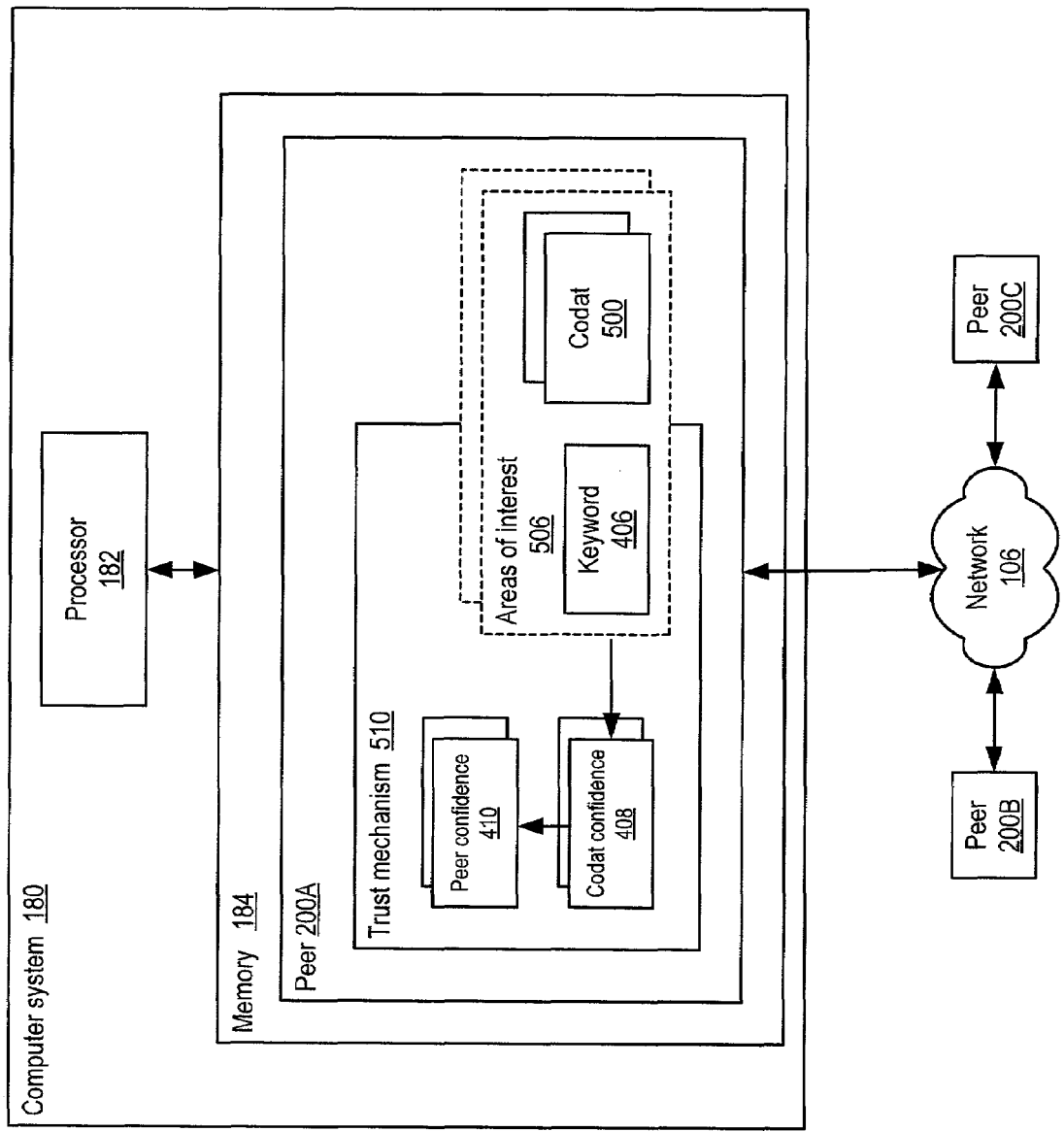
FIG. 3 illustrates a typical computer system that is suitable for implementing various embodiments of the decentralized trust mechanism.

FIG. 3 illustrates a typical computer system that is suitable for implementing various embodiments of the decentralized trust mechanism on peers or other systems as described herein. Each computer system 180 typically includes components such as a processor 182 with an associated computer-accessible memory medium 184. Processor 182 may include one or more processors, such as a Sparc, X86 (Pentium), PowerPC, or Alpha processor. Computer-accessible memory medium 184 may store program instructions for computer programs, wherein the program instructions are executable by processor 182. The computer system 180 may further include a display device such as a monitor, an alphanumeric input device such as a keyboard, and a directional input device such as a mouse. Computer system 180 is operable to execute the computer programs to implement the decentralized trust mechanism as described herein.

The computer system 180 may further include hardware and program instructions for coupling to a network 106. The network 106 may be any of a variety of networks including, but not limited to, the Internet, corporate intranets, dynamic proximity networks, home networking environments, LANs and WANs, among others, and may include wired and/or wireless connections. The network 106 may implement any of a variety of transport protocols or combinations thereof, including, but not limited to, TCP/IP, HTTP, Bluetooth, HomePNA, and other protocols.

Computer system 180 typically includes a computer-accessible memory medium 184 on which computer programs according to various embodiments may be stored. The term "computer-accessible memory medium," which may be referred to herein as "memory," may include an installation medium, e.g., a CD-ROM, DVD or floppy disks, a computer system memory such as DRAM, SRAM, EDO DRAM, SDRAM, DDR SDRAM, Rambus RAM, etc., or a non-volatile memory such as a magnetic media, e.g., a hard drive, or optical storage, or a combination thereof. The memory 184 may include other types of memory as well, or combinations thereof. In addition, the memory 184 may be located in a first computer in which the programs are executed, or may be located in a second different computer that connects to the first computer over a network. In the latter instance, the second computer provides the program instructions to the first computer for execution. The instructions and/or data according to various embodiments may also be transferred upon a carrier medium. In some embodiments, a computer readable medium may be a carrier medium such as network 106 and/or a wireless link upon which signals such as electrical, electromagnetic, or digital signals may be conveyed.

In addition, computer system 180 may take various forms, including a personal computer system, server, workstation, cell phone, pager, laptop or notebook computer, smart appliance, network appliance, Internet appliance, personal digital assistant (PDA), set-top box, television system, mainframe computer system, and even supercomputer or other device. In general, the term "computer system" can be broadly defined to encompass any device having a processor that executes instructions from a computer-accessible memory medium.

In one embodiment, the memory 184 may store software programs and/or data for implementing a decentralized trust mechanism as described herein. In one embodiment, the memory 184 may further store software programs and/or data for implementing a peer 200 for participating in a peer-to-peer environment with other peers 200 (implemented on other computer systems 180) on network 106. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host processor 182, executing code and data from the memory medium 184 includes a means for creating and executing the software program or programs according to the methods and/or block diagrams described herein.

An exemplary peer-to-peer platform for enabling computer systems 180 to participate as a peer 200 in a peer-to-peer environment, and in or with which embodiments of the decentralized trust mechanism may be implemented, is described later in this document. It is noted that embodiments may also be implemented in other peer-to-peer environments implemented in accordance with other peer-to-peer mechanisms. It is further noted that, although embodiments as described herein are generally described in reference to peers and peer-to-peer networking environments, embodiments may also be implemented on other systems and in other architectures including other networking architectures and environments, for example client-server systems.

In one embodiment, the memory 184 may store one or more codat 500. Peer 200A may participate in the peer-to-peer environment with one or more groups of peers 200. The peer 200A may have one or more areas of interests 506 and may choose to participate in particular peer groups concerned with particular areas of interest 506. Codat 500 may be classified according to areas of interest 506. In one embodiment, a particular codat 500 may be classified in more than one area of interest 506. Memory 184 may also store one or more keywords 406 each associated with a particular area of interest 506. Memory 184 may also store one or more codat confidences 408 and one or more peer confidences 410. Each codat confidence 408 may represent the peer 200A's trust or confidence in a particular codat 500. Memory 184 may also store one or more peer confidences 410. Each peer confidence 410 may represent the peer 200A's trust in a particular peer 200. In one embodiment, trust mechanism 510 may be executable to determine or adjust a peer confidence 410 associated with a particular peer 200 using one or more codat confidences 408 associated with codat 500 received from the particular peer. Embodiments of methods for calculating codat confidence 408 and peer confidence 410 are described later in this document. While trust mechanism is illustrated as being a component or module integrated in peer 200, in some embodiments trust mechanism 510 may be a stand-alone module or program external to peer 200.

In one embodiment, the computer programs executable by the computer system 180 may be implemented in an object-oriented programming language. In an object-oriented programming language, data and related methods can be grouped together or encapsulated to form an entity known as an object. All objects in an object-oriented programming system belong to a class, which can be thought of as a category of like objects that describes the characteristics of those objects. Each object is created as an instance of the class by a program. The objects may therefore be said to have been instantiated from the class. The class sets out variables and methods for objects that belong to that class. The definition of the class does not itself create any objects. The class may define initial values for its variables, and it normally defines the methods associated with the class (i.e., includes the program code which is executed when a method is invoked.) The class may thereby provide all of the program code that will be used by objects in the class, hence maximizing re-use of code that is shared by objects in the class.

In one embodiment, an API may be provided for developing graphical user interfaces (GUIs) for codat user rating. Implicitly, a user may be able to perceive how well retrieved codat fits the search criteria. This goes beyond simple keyword match, and rating information may be provided by user input to the GUI, and may in one embodiment serve as a user-supplied factor of the codat confidence relevance metric.

Figure 4:
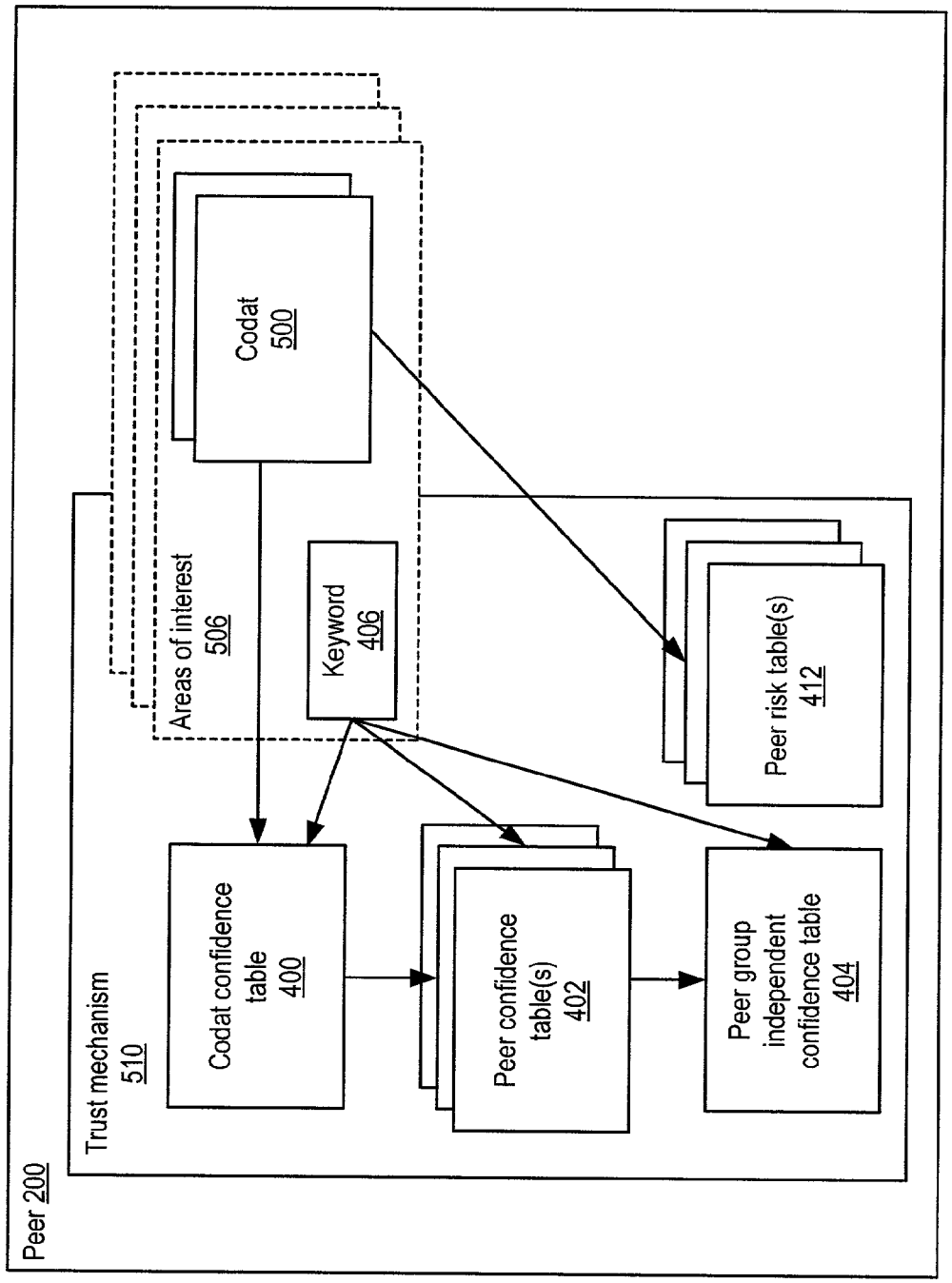
FIG. 4 illustrates an exemplary architecture of a peer implementing a trust mechanism according to one embodiment.

FIG. 4 illustrates an exemplary architecture of a peer 200 (which also may be referred to as a peer node of a network) implementing a trust mechanism according to one embodiment. In one embodiment, a peer 200 may include a trust mechanism 510 which may include one or more codat confidence tables 400 which each may include one or more codat confidences, and one or more peer confidence tables 402 which each may include one or more peer confidences. In one embodiment, there may be one peer confidence table 402 for each peer group of which peer 200 is a member. In one embodiment, peer 200 may include a peer group independent peer confidence table 404 which may include one or more peer confidences corresponding to the peers in the peer groups in which peer 200 is a member peer.

Peer 200 may include codat 500. Codat 500 may be classified by area of interest 506 of peer 200. Each area of interest 506 may correspond to a particular keyword 406. Peer 200 may determine confidence in codat 500 and record the codat confidences in codat confidence table 400. Codat confidences for codat received from another peer in a particular area of interest represented by a keyword 406 may be used to determine or adjust peer 200's peer confidence in the other peer. The peer confidence may be recorded or updated in the peer confidence table 402 corresponding to the peer group in which both peer 200 and the other peer are member peers. The peer confidence may also be recorded or updated in the peer group independent peer confidence table 404.

In one embodiment, peer trust may be a function of peer confidence and risk. In one embodiment, peer 200 may also include one or more peer risk tables 412 which each may include one or more peer risks each associated with a particular peer. Peer risk for a particular peer may be determined using one or more factors including, but not limited to, codat integrity (e.g., did codat received from the peer contain a virus as noted by a virus pre-processor), peer accessibility (is the peer up most of the time?), and peer performance (e.g. are there long delays in retrieving data from the peer?). Entries in peer risk tables 412 may be used in evaluating a peer's risk trust component. In one embodiment, the peer confidence and risk tables may be used in determining if a target peer is able to cooperate and is thus trustworthy.

Figure 5A:
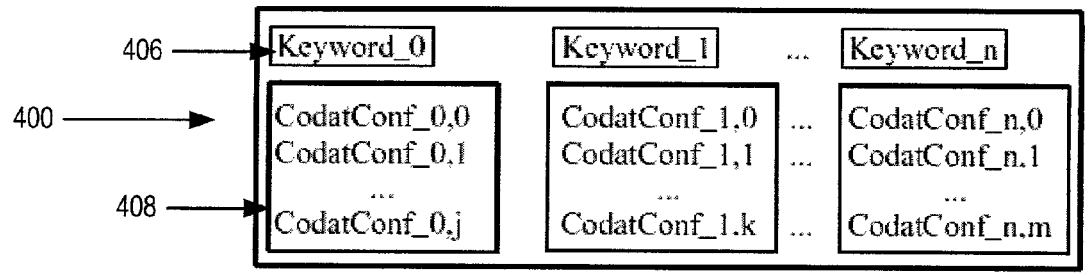
FIG. 5A illustrates a codat confidence table according to one embodiment.

FIG. 5A illustrates a codat confidence table 400 according to one embodiment. For each keyword 406 representing an interest of the peer, there may be one or more codat confidences 408 each corresponding to a codat 500 classified under the particular interest 506 represented by the keyword 406. Each codat confidence 408 may indicate a confidence value of the peer 200 in the corresponding codat 500. In one embodiment, codat confidence tables 400 may be used in determining and/or adjusting peer confidences 410. In one embodiment, codat confidence tables 400 may be searched by keyword 406 when searching for codat 500.

In one embodiment, codat 500 may be associated with peer groups, and a peer 200 may include a codat confidence table 400, for example as illustrated in FIG. 5A, for each peer group of which the peer 200 is a member peer, that may be used to record the (keyword, codat) relationships for peers in the particular peer group.

Figure 5B:
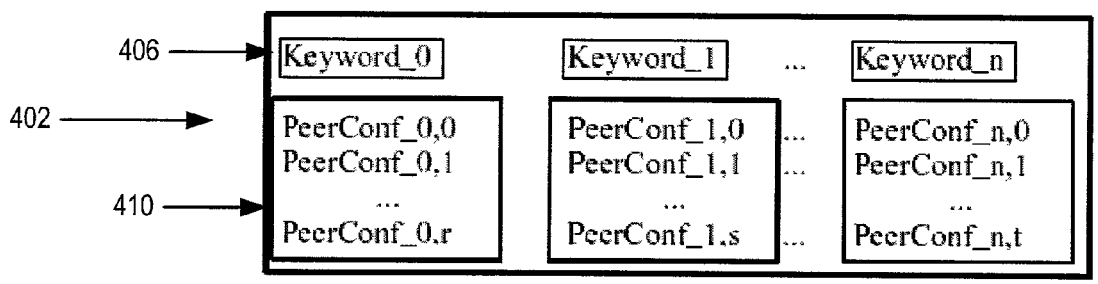
FIG. 5B illustrates a peer confidence table according to one embodiment.

In one embodiment, there may be a peer confidence table 402 as illustrated in FIG. 5B that includes peer confidence information for those peers for which the peer 200 has (keyword, codat) information. In a peer confidence table 402, for each keyword 406 representing an interest of the peer 200, there may exist one or more peer confidences 410 each corresponding to a particular peer that provided a particular codat 500. In one embodiment, there may be a separate peer confidence table 402 for each peer group in which the peer 200 is a member peer. In one embodiment, the peer confidence table(s) 402 may be included in codat confidence table(s) 400 as illustrated in FIG. 5A. In one embodiment, peer confidence tables 402 may be used when searching for a codat 500.

Figure 5C:
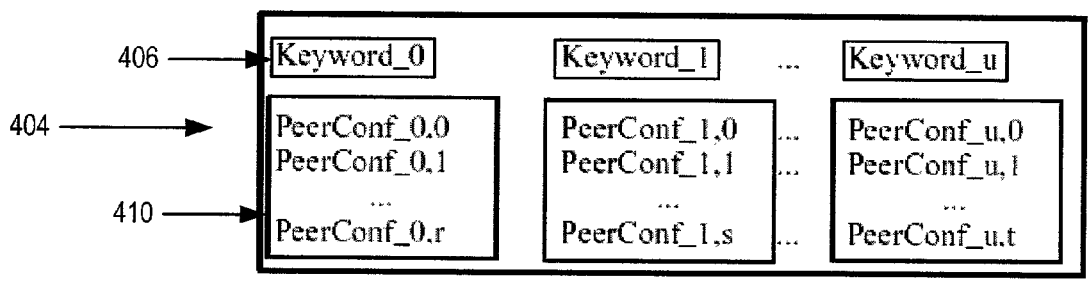
FIG. 5C illustrates a peer group-independent peer confidence table according to one embodiment.

In one embodiment, there may be a peer confidence table 404 that includes peer confidence information for peers across all the peer groups to which the peer 200 belongs, as illustrated in FIG. 5C. This table 404 may be used, for example, in calculating peer group-independent peer confidence values.

In one embodiment, the decentralized trust mechanism may use data structures such as object-oriented programming language classes to represent the different trust components. In one embodiment, the classes may include a codat confidence class, a peer confidence class, and a risk class.

In one embodiment, a codat confidence class may be used in evaluating the codat trust component according to a keyword. In one embodiment, the codat confidence class may include, but is not limited to, keyword, codat identifier, local flag, and confidence value as elements of the class. In one embodiment, the confidence value may have two metrics: popularity, and relevance to keywords. Popularity may be monotonically increasing and may be incremented at the provider each time the codat is requested. The relevance may be in a range of relevance values, and may be in a range, for example (−1, 0, 1, 2, 3, 4) in one embodiment, as described below. The codat confidence class may be instantiated to implement codat confidence 408 as illustrated in FIGS. 2A and 3.

A peer confidence class may be used in evaluating the codat peer trust component according to a keyword. In one embodiment, the peer confidence class may include, but is not limited to, class keyword, peer identifier and confidence value as elements of the class. In one embodiment, in addition to the codat confidence metrics above, the running average of the popularity of each codat accessed from this peer for a given keyword may also be kept. The peer confidence class may be instantiated to implement peer confidence 410 as illustrated in FIGS. 2A, 2B and 3.

In one embodiment, trust may be a function of peer confidence and risk. A risk class may be used in evaluating a peer's risk trust component. In one embodiment, the risk class may include, but is not limited to, peer identifier, integrity of the codat, accessibility and performance.

In one embodiment, the peer confidence and risk classes may be used in determining if another peer, for example a peer offering to provide codat in a particular area of interest, is able to cooperate and is thus trustworthy.

The above describes how two components of trust relationships, confidence and risk, map to hardcoded information. The following discusses embodiments of methods for the calculation and propagation of such information to form a complex chain of relationships, and describes embodiments of methods to rate a propagated degree of trust. Various methods for determining metrics including confidence metrics and reputation metrics are described. Methods are described for determining the confidence a particular peer has in a particular codat or set of codats over a particular path. Methods are also described for updating the confidence in a particular codat or set of codats and for updating the reputations of codat providers. Methods are also described for determining if a peer's reputation meets threshold requirements and thus may be considered cooperative given a past history of interaction with the peer.

In one embodiment, a trust value may be assigned to a peer. FIG. 6 illustrates one embodiment of a table 420 of trust values 422 and the significance of or meaning 424 corresponding to the trust values 422. In the embodiment illustrated in FIG. 6, a peer may have a trust value of −1, 0, 1, 2, 3, or 4. Note that other embodiments may use other trust values and/or meanings corresponding to the trust values.

In the exemplary embodiment illustrated in FIG. 6, for the trust values of 0 and −1, the associated codat is never accessed. In one embodiment, the trust value may be propagated through a transaction pipe (which may be described as a path). In one embodiment, the trust value of a target for a single path, $V_{path}(T)$, from peer S to peer T through peers $P_i$, (i=1, 2, ..., n) may be calculated as in the following formula:

$$V_{path}(T) = \frac{1}{4n}\left(\sum_{i=1}^{n} V(P_i)\right) \times V(T) \quad\quad 1)$$

Here, $V(P_i)$ is the trust value of the peer, $P_i$, who provides the information. In the exemplary embodiment illustrated in FIG. 6, $V(P_i)$ is one of 1, 2, 3, or 4. V(T) is the trust value on the target peer, T. Note that in other embodiments other formulas for calculating $V_{path}(T)$ may be used.

For multiple paths, in one embodiment the final trust value may be the average of all the propagated trust values. As an example, assume there are two paths from peer A to peer D. The first path is through peer B and C, the second one is though B, E and F. C trusts D with a value of 3, B trusts C as a recommender with a value 2, and A trusts B as recommender with a value of 3. Thus:

$$V_1(D) = \frac{V(B)+V(C)}{8} \times V(D) = \frac{3+2}{8} \times 3 = 1.88 \quad\quad 1')$$

Using the same method, assume the trust value of the second path $V_2(D)$ is 2.15. In this example, the trust value A gives D is the average of two paths, 2.01. In one embodiment, in addition to the propagation of trust information, reputation may also be initialized and updated. (Note that the values calculated in these and other examples herein may be rounded or truncated for simplicity, but in application may or may not be rounded or truncated.)

In one embodiment of the trust mechanism, there may be two values for peer confidence and codat confidence. The codat confidence value is the information to be propagated and the peer confidence value is the carrier information to be used for weighting. In one embodiment, equation 1) may be transformed as follows, where the codat confidence and peer confidence are the relevance metrics for codat within a given peer group:

$$\text{codat confidence}_{path} = \frac{1}{4n}\left(\sum_{i=1}^{n} \text{peer confidence}(P_i)\right) \times \text{codat confidence} \quad\quad 2)$$

Propagation of confidence values may be employed when requesting information remotely and successfully. In one embodiment, when a remote request for information succeeds, the provider sends the codat confidence object to the requester. If after computing codat confidence$_{path}$, the requester wants the codat, then the codat may be sent to the requester (or alternatively the requester may access the codat remotely). Even if the codat transfer (or access) occurs between $P_1$ and $P_n$, the codat confidence$_{path}$ remains as if the data was received through the pipe. In one embodiment, propagation may also be employed when giving feedback to codat providers. The updated codat confidence object from a requester may be propagated back to the provider. Note that in other embodiments other formulas for calculating codat confidence$_{path}$ may be used.

When updating trust value, each peer may update several (e.g. three) kinds of confidence tables. In addition, the updates may be based on a peer's rating as well as on the feedback rating. Trust value updating may be illustrated using some examples. As one example of trust value updating, a peer may update its codat confidence using its own rating and the codat confidence propagated from remote peers. The propagated popularity may be, for example, a running average. This example focuses on the confidence and quality updating. In one embodiment, a new codat confidence may be a function of the old codat confidence, the propagated codat confidence, and the user rating:

new codat confidence=F(old codat confidence, propagated codat confidence, user rating)

The following is an exemplary function that may be used to calculate a new codat confidence in some embodiments:

new codat confidence=(a×old codat confidence)+(b× propagated codat confidence)+(c×user rating)　　0.3)

where (a+b+c)=1.0, and a, b and c are nonnegative real numbers. a, b and c may be used as weights for relative importance of the old codat confidence, the propagated codat confidence, and the user rating, respectively, when calculating new codat confidence. Note that in other embodiments other formulas for calculating new codat confidence may be used.

In one embodiment, the user's personal rating may be the most important criteria for a user, and thus c may be given more weight (e.g. c=0.70). In one embodiment, if the new popularity value is greater than the old popularity value, then the propagated codat confidence may be given more weight (e.g. a=0.10 and b=0.20); if the new popularity value is less than the old popularity value, the old codat confidence may be given more weight (e.g. a=0.20 and b=0.10). If they are equal, the old codat confidence and the propagated codat confidence may be given equal weight. Thus, using weights, more popular codat may be given an edge. Note that other schemes for distributing weights may be used in other embodiments.

In one embodiment, the user rating may be received as user input. It is possible that neither the old codat confidence nor the propagated codat confidence is available. In this case, the old codat confidence and the propagated codat confidence may be preset, for example, to 1. A similar rule may be applied to one or more of the other exemplary functions herein.

As another example of trust value updating, a peer may update an old codat confidence using feedback. The peer may have a peer confidence corresponding to the peer who provided the feedback. In one embodiment, a feedback may be defined as a reverse-propagated codat confidence from another peer. In one embodiment, a new codat confidence may be a function of the old codat confidence, the feedback, and the peer confidence corresponding to the peer that provides the feedback:

new codat confidence=$F$(old codat confidence, feedback, peer confidence of feedback peer)

The following is an exemplary function that may be used to calculate a new codat confidence in some embodiments:

$$\text{new codat confidence} = \frac{\left(\text{old codat confidence} + \left(\text{feedback} \times \frac{\text{peer confidence}_{feedback\ peer}}{4}\right)\right)}{2} \quad 4)$$

In at least some cases, the peer may not have peer confidence for the peer who provides the feedback, so the peer confidence in the feedback peer may be preset, for example, to 1. Note that in other embodiments other formulas for calculating new codat confidence may be used.

In yet another example of trust value updating, a peer may update the peer confidence of an information provider in a peer group. In this example, the peer may not receive information from other peers on a provider's performance. Instead, the peer may itself generate an opinion of the provider, associated with one or more keywords. The peer may know the codat confidence, relevance metric of the codat the provider has provided to the peer. In one embodiment, a new peer confidence may be a function of the old peer confidence and the set of codat confidences related to the provider:

new peer confidence=$F$(old peer confidence, set of codat confidences related to the provider)

The following is an exemplary function that may be used to calculate a new peer confidence in some embodiments:

$$\text{new peer confidence} = \frac{\text{old peer confidence} + \frac{1}{|K|}\sum_{a \in K} \text{codat confidence}_{provider}}{2} \quad 5)$$

where $|K|$ is the number of keywords a in K related to the provider. Note that in other embodiments other formulas for calculating new peer confidence may be used.

The trust mechanism may employ numerous updating functions, and in one embodiment, a Bayesian approach may be used. Using a Bayesian approach, current data may be used to derive what the a posteriori model looks like.

To make these trust values more meaningful for users, one embodiment may include a cooperation threshold. If a peer confidence value corresponding to another peer is greater than the cooperation threshold, the other peer may be considered cooperative. Otherwise, the other peer may be considered uncooperative, and the user of the peer may decide that interaction with the other peer may involve too much risk. The cooperation threshold may be calculated based on the risk value, the codat confidence value(s) and an importance value. The importance value may be used to indicate how important the cooperation is to the user. A user may be willing to take a risk, i.e., override the trust mechanism's recommendation, even though the peer confidence may be low. In one embodiment, the importance may have a value of, for example, (−1, 0, 1, 2, 3, 4) and may be input by users through a GUI. In one embodiment, the importance value may be initially set to a default, e.g. 2. In one embodiment, the risk value may be in a range from, for example, 0 to 4, where 0 implies no risk and 4 implies maximum risk. In one embodiment, the risk value may be statistically computed using peer accessibility and performance information. In one embodiment, a network quality of service study method may be adopted to compute the risk value.

In one embodiment, if the following comparison is true, then the cooperation threshold is met:

$$(\text{peer confidence} \times \text{importance}) > \frac{\text{Risk}_{peer}}{\frac{1}{|K|}\sum_{a \in K} \text{codat confidence}_{peer}} \quad 6)$$

Here, K is the set of all keywords, a, for the given peer for which there are codat confidence values across all peer groups, and $|K|$ is the number of such keywords. The codat confidence values corresponding to the peer (related to a particular keyword k) may be used to represent the experienced confidence in the peer. Assuming the importance is constant, if the risk is high and the experience is not good, the threshold will tend to be high. In this case, the peer confidence may not be higher than the threshold. Note that in other embodiments other comparisons for determining if the cooperation threshold is met may be used.

Reputation-Guided Searching

Figure 7:
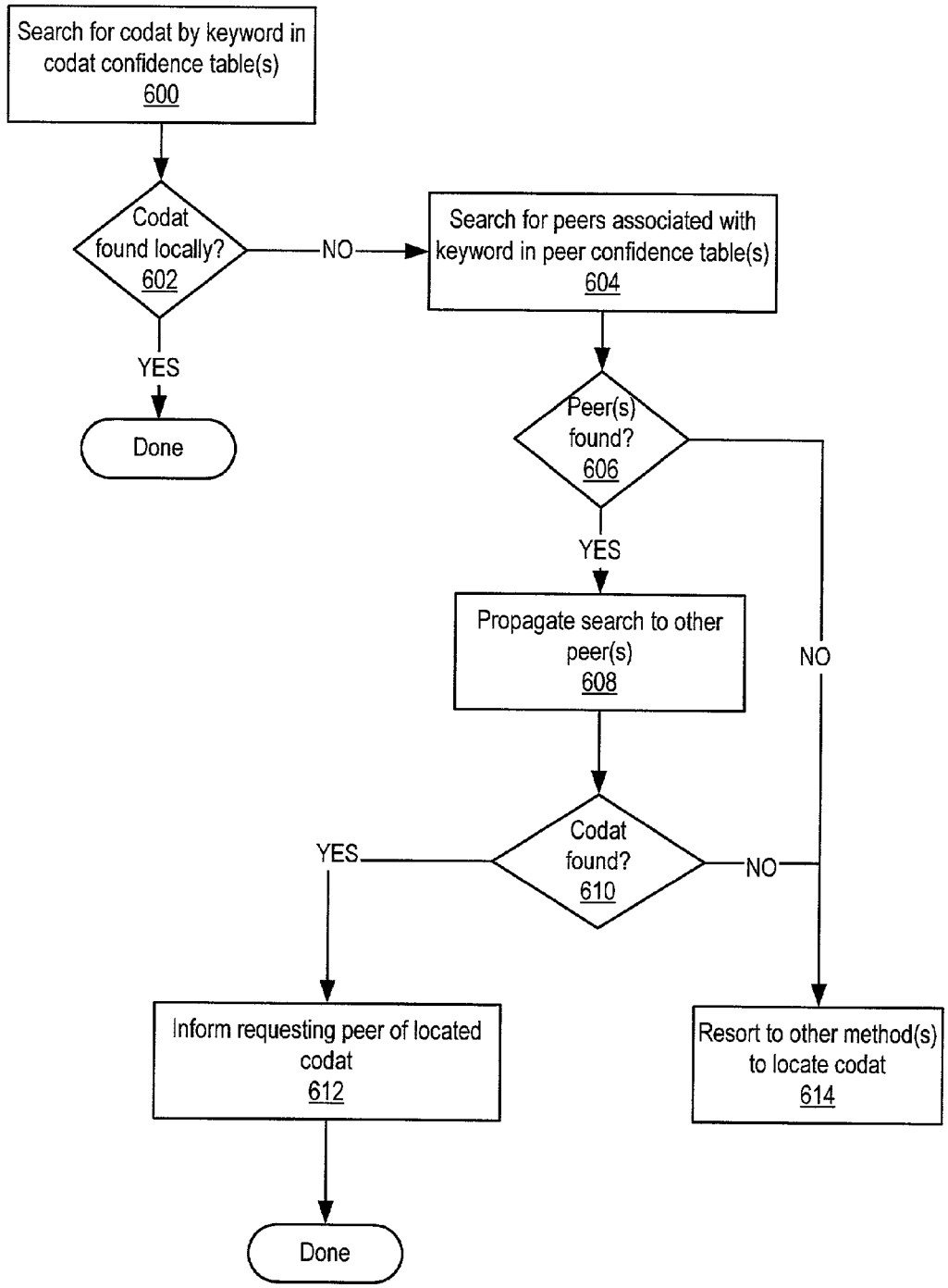
FIG. 7 illustrates a method for searching for codat according to one embodiment.

Peers in a peer-to-peer environment may desire or need to search for codat relevant to a particular area of interest. FIG. 7 illustrates a method for searching for codat according to one embodiment, and illustrates an exemplary application of the confidence tables and how the confidence tables are related. When a peer searches for a codat associated with a keyword (area of interest), the peer may look up the keyword in its own codat confidence table(s) as indicated at 600. At 602, if there is a local codat associated with the keyword that satisfies the search requirements, the peer has successfully found the codat and the search is done. At 602, if there is not a local codat associated with the keyword, the peer may look up the keyword in one or more peer confidence tables as indicated at 604. In, one embodiment, a peer may choose to search remotely, even if a local codat is found at 600. As indicated at 606, if there are peers associated with the keyword, the request may be forwarded or propagated to other peers as indicated at 608. Each of these peers may in turn perform a local search for the codat in its codat confidence table(s), and a remote search (further propagation) for the keyword, if necessary or desired, using their own peer confidence tables. Propagation may continue until a relevant codat is found or until a limit on propagation is reached (e.g. a time-to-live indicator expires or there are no more peers to propagate to). If one of these peers has a valuable codat relevant to the keyword, the peer may inform the requesting peer as indicated at 612, and the search may be terminated. As indicated at 614, if the propagation fails to find a relevant codat (or if there are no peers located at 604 to propagate the search to), then the originating peer may resort to the peer group keyword tables as described below for other possible sources of codat relevant to the keyword. The originating peer may make a query to all members of all peer group tables that have keyword-relevant content to find peer keyword matches. These matches may be for peer groups to which the originating peer does not belong or for which the originating peer has no prior knowledge.

As described above, when searching for codat associated with a particular keyword, the keyword search may propagate from peer to peer until at least one peer finds the desired results and returns the appropriate feedback. In one embodiment, the search propagation process may have a time-to-live that may be used to limit the number of peers that can be visited for a given lookup, and may also prevent inadvertent search loops. In one embodiment, the time-to-live may be a limit on the number of peers that can be visited in a given lookup, e.g. 16. In another embodiment, the time-to-live may be a time limit for the search, e.g. 5 minutes. In yet another embodiment, the time-to-live may be a limit on the number of levels of propagation (e.g., three levels of propagation). Still yet another embodiment may use a combination of two or more of the above methods for limiting a search.

In one embodiment, as the search is propagated from a $peer_i$ to a peer $peer_{i+1}$, $peer_i$ may append an indication of its confidence in $peer_{i+1}$ to the propagation message. However, this embodiment may violate the privacy of the preceding peer (as a peer may view how the preceding peer rated it) and may allow a peer to tamper with or falsify the recommendations. To avoid these privacy and security issues, in another embodiment, as the search is propagated from a $peer_i$ to a $peer_{i+1}$, $peer_i$ may send an indication of its confidence in $peer_{i+1}$ to the peer that initiated the lookup. In one embodiment, the peer identifier of the initiating peer may be included in each successive query.

Figure 8:
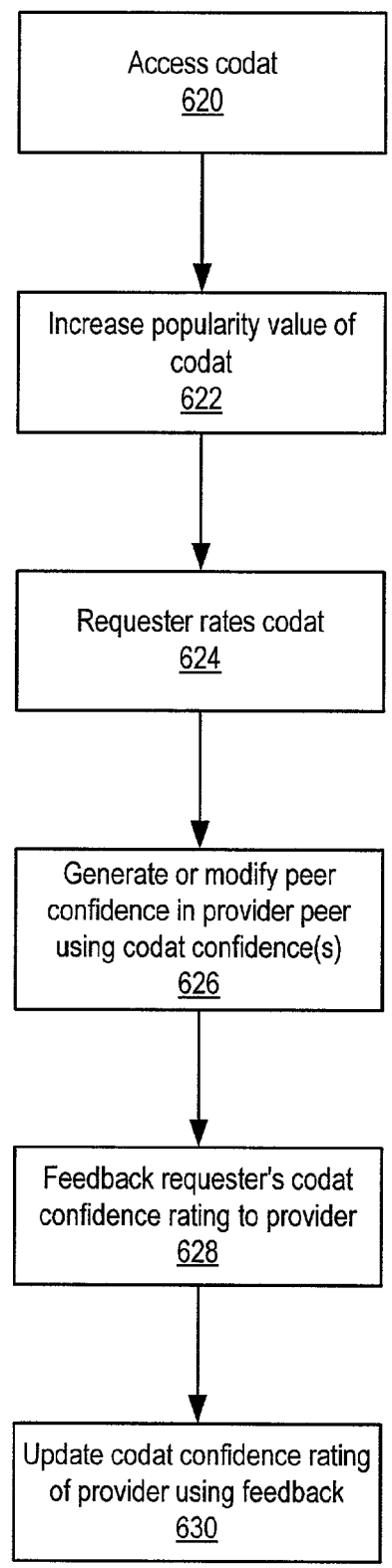
FIG. 8 illustrates calculating or adjusting codat confidence during a search on a keyword.

In one embodiment, when performing a search on a keyword, codat confidence in the keyword may be calculated or adjusted as illustrated in FIG. 8. In one embodiment, in calculating the codat confidence of a codat, the requester may access the codat as indicated at 620, and the provider's popularity value for the codat may be increased as indicated at 622, e.g., by 1, by such access, for example by user selection of the codat in a user interface. As indicated at 624, the requester may rate the codat, and an entry may be added in the requestor's codat confidence table for the codat that reflects the requestor's rating of the codat. As indicated at 626, on the requester, a collection of one or more such codat ratings for a given peer may be used to generate or modify a peer confidence value for the provider with respect to the given (keyword, codat) pair. This is confidence from the requester's perspective. In one embodiment, the codat rating may also be provided as feedback to the provider as indicated at 628, and an existing confidence object of the provider with respect to the keyword may be updated in response to the requester's rating of the codat as indicated at 630. In one embodiment, the provider may update its codat confidence table as a function of the previous value, the feedback on the codat (i.e. the requester's codat confidence rating of the codat), and the provider's confidence in the requester. This is confidence from the provider's perspective.

Security and the Trust Mechanism

Security may address privacy, authentication, integrity, and/or non-repudiation. Various cryptographic techniques and protocols may be implemented, for example, to attempt to guarantee that a conversation is private, to authenticate a user, to insure the integrity of data, and to assure that a transaction cannot be repudiated by its originator.

To the above cryptographic list, secure access to codat, or authorization, may be added. Codat may include static as well as dynamic or executable data, which may be locally or remotely stored. Codat may also include abstractions such as routes or paths codat might take in a network, some of which may be privileged. In one embodiment, the authorization mechanism described herein may not be a specific authorization solution, but instead may be an open mechanism that allows the implementation of various secure codat access schemes based on the mechanism. The trust mechanism may be a mechanism for peer-to-peer distributed security in which some or all of the above security features may be deployed, if desired.

Embodiments may provide mechanisms which may permit user input to set trust confidence values on a certificate for a peer received from the peer and for certificates received for a peer from a different peer with the different peer's recommendation. This recommendation may be measured. Trust is not necessarily transitive. If a peer A trusts a peer B and peer B trusts peer C, it does not necessarily follow that peer A should trust peer C with the same degree of trust that peer B trusts peer C. The transitivity of the trust may be measured from the point of view of peer A. This transitivity may be referred to as "weak transitivity." These measurements of trust and transitivity consider which peers sign and/or cosign a certificate from the recipient's point of view. Thus, using embodiments, real, "human" trust may be modeled based on reputation. Thus, trust may be "personal."

Since trust may be pipelined, peer B revealing to peer A its rating of peer C may say very little about peer C's actual rating. Peer B may not want other peers (e.g. peer A and peer C) to know this. In one embodiment, if a peer is not willing to divulge its trust in another peer, default trust values may be used.

One embodiment may provide a mechanism for a peer to build a key ring of certificates, create a peer confidence table for each key on the key ring that includes the peer's confidence in the certificate and the peer's confidence in the owner of the certificate as a recommender (weak transitivity). Confidence in a certificate's path of signers may then be computed, and a peer's confidence in another peer as a recommender (weak transitivity) may be updated.

Figure 9A:
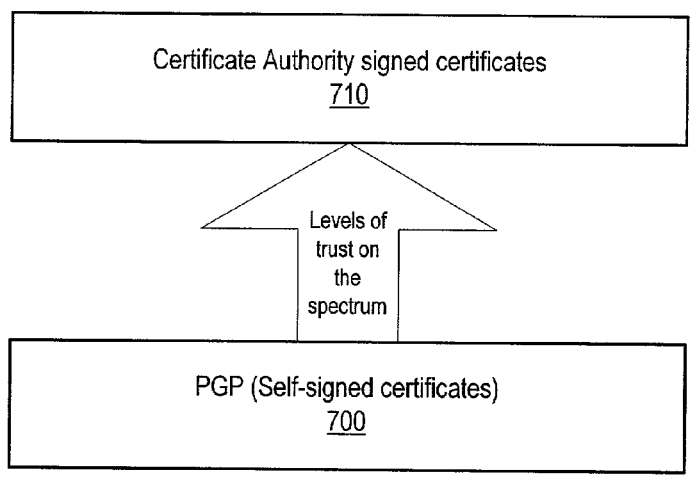
FIG. 9A illustrates a trust spectrum according to one embodiment.

In one embodiment, the trust mechanism may provide a trust spectrum as illustrated in FIG. 9A. The trust mechanism may not require a true, distributed Public Key Infrastructure (PKI), but rather may provide for the creation of a trust spectrum that neither requires nor prohibits the presence of a PKI. At what point of trust in the spectrum a peer group chooses to communicate may be up to the participants in that group. A peer may belong to two or more different peer groups each implementing a different security model on different levels of the trust spectrum. In a trust spectrum, unique peer identities may be established to enable authentication and the assignment of the peers' associated access policies within a peer group, e.g., authentication and authorization.

Figure 9B:
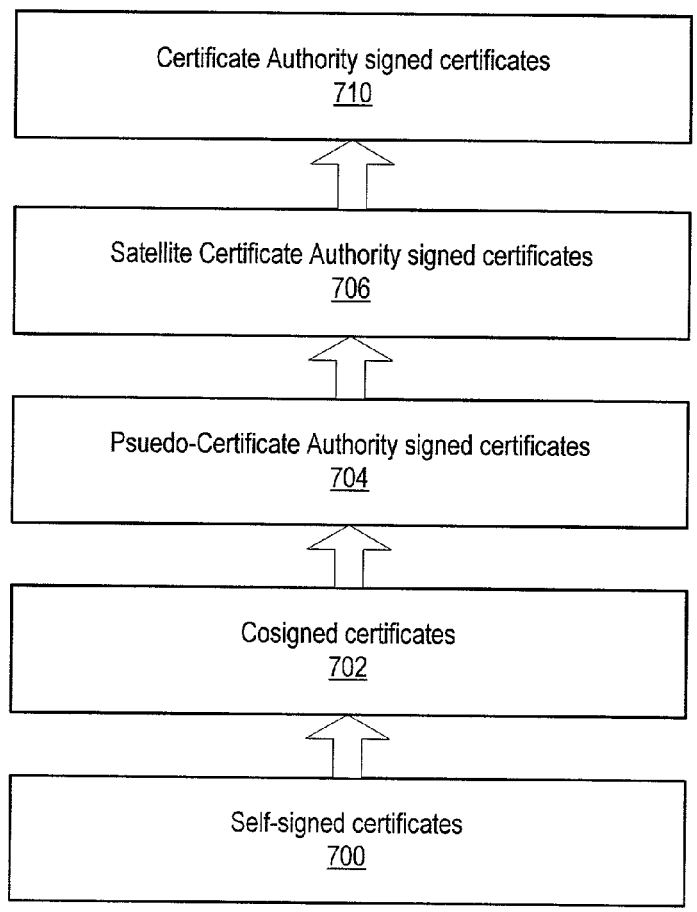
FIG. 9B further illustrates a trust spectrum according to one embodiment.

In one embodiment, as illustrated in FIG. 9A, the trust spectrum may have Certificate Authority signed certificates 710 at or near one endpoint as a maximum level of security, and self-signed certificates 700 at or near the other as a minimum level of security. In one embodiment, as illustrated in FIG. 9B, there may be one or more levels of security between Certificate Authority signed certificates 710 and self-signed certificates 700. These levels may include, but are not limited to: cosigned certificates 702 which may provide Pretty Good Privacy (PGP); pseudo-Certificate Authority signed certificates 704 where a peer group member or members may act as a Certificate authority; and satellite Certificate Authority signed certificates 706 where a central Certificate Authority (e.g. the provider of a peer-to-peer platform as described below) seeds some peer group members as satellite Certificate Authorities.

In embodiments of the trust mechanism, a method may be provided for creating and distributing signed certificates in a peer-to-peer network Some embodiments may provide a mechanism for creating and distributing public keys given a peer-generated, private-public key pair. In some embodiments, certificate creation may include using a Certificate Authority whose signature appended to a certificate guarantees the certificate's content for any recipient that has secure access to the Certificate Authority's public key. In one embodiment, the Certificate Authority's public key may be included in a root certificate on the recipient's system.

In an embodiment, any peer, including a recognized Certificate Authority, may join a peer group and offer its services (assuming it meets membership requirements, if any). The peer group members may assign a level of trust or peer confidence to that peer, as well as to each other. Mobile credentials, e.g. how to make a system's private security credentials securely available, may also be provided.

In some embodiments, peer-to-peer zero-dollar-cost certificates may be provided. In one embodiment, peer-to-peer zero-dollar-cost certificates may include self-signed certificates that may be exchanged between peers. In one embodiment, peer-to-peer zero-dollar-cost certificates may include certificates signed or cosigned by a trusted third party (e.g. a trusted peer in a peer group). In one embodiment, the trust mechanism may not prohibit very strong security, e.g., strong security mechanisms such as may be used on the Internet.

Users of self-signed certificates may be left open to "imposter in the middle" attacks. For example, if a peer A receives a peer B's self-signed certificate in a security advertisement corresponding to peer B, peer A may have no way to guarantee that in fact the certificate was received from B, and conversely, the same is true for peer B. An intruder, say peer C, may be in the middle of a conversation seeing everything in clear text, and having given a "faked" self-signed certificates to both peer A and peer B, may be pretending to be one or both of them. Since peer C possesses both peer A and peer B's public keys, peer C's presence may be undetectable. While it may take a great deal of effort to steal peer A and peer B's identities, it may be done using advertised, public information and information acquired as the imposter-in-the-middle. In one embodiment of a peer-to-peer network, for an intruder to steal a peer's identity, all of a peer's advertisements must be duplicated, possible encrypted passwords must be known, and pipe endpoint resolution spoofed. This may be possible with self-signed certificates and this attack. Such an intruder could fully participate in a peer group using this stolen role.

However, for some classes of applications, this behavior may be acceptable if the above threats are clearly understood by the users. For example, a family may form a peer group to participate in secure instant messaging among the family members. The underlying messages may be private, for example secured with TLS using 1024 bit RSA, 128-bit RC4, and SHA-1. The family may not worry that an imposter might try to intercept their conversations. This is a cost/risk decision whose risk is likely extremely small.

If the "imposter in the middle" attack is an unacceptable risk, and peer-to-peer zero-dollar-cost certificates are desired, a more secure spectrum point may be used by exchanging certificates in person, for example using infrared or floppy disks. This is eyeball-to-eyeball trust, and in certain peer groups, this is achievable and very secure.

If additional security is desired, then peer group members may delegate certificate signature authority to selected members of a peer group. For example, if peer A wants to acquire a signed certificate from peer B that is a Certificate Authority, peer A generates a public, private key pair, sends the public key, algorithm parameters and personal identification to peer B, and then proves ownership of the private key. Peer B may accomplish the latter with a challenge encrypted in the public key and sent to peer A that owns the private key. Only peer A can decrypt the challenge, again encrypt it in peer A's private key, and send it back to peer B for verification. Once ownership is verified, peer B may issue a signed certificate to peer A. To verify that peer B indeed signed the certificate, peer A must have peer B's public key. In addition, if peer A wants to communicate securely with peer C, then he too must have peer B's public key and must trust peer B's signature. This makes the imposter-in-the-middle attack very difficult since peer B's signature is created with his private key, and peer A, and peer C have peer B's public key. This taken with strong authentication, and authorization may prevent role theft.

In one embodiment, a method similar to the above may be applied to create a "web of trust"-like signed certificate distribution in a peer group. A key ring of signed certificates may be created, and trust assigned using personal input obtained, for example, using the trust mechanism.

In one embodiment, a peer group-Certificate Authority, e.g. peer B, to both sign and distribute signed certificates to peer group members. If peer B has signature authority in the peer group, and peer A is a peer group member that trusts peer B, then peer A must have peer B's public key. One way to accomplish this is to have a root certificate on each peer in the peer group when the peer-to-peer software is loaded. These root certificates may be generated, for example, by a trusted peer-to-peer organization or satellite that may be a true Certificate Authority. In a peer-to-peer environment implemented in accordance with a peer-to-peer platform, for example the peer-to-peer platform described later in this document, root certificates may be included with releases of the peer-to-peer platform.

Given such a bootstrap mechanism, peer B may request a signed certificate from any of the trusted satellites, their goal being to propagate signing authority within peer groups without taking on the entire responsibility. Peer A may then, in the same way, open a secure, TLS session with peer B's system receiving peer B's satellite-signed X.509v3 certificate in the TLS handshake, verifying peer B's authenticity, and may acquire a certificate signed by Peer B using a totally secured connection. At the same time, peer A saves peer B's certificate on a key ring for future use of peer B's public key. Here, for example, peer A might want to send peer B some private email, or chat privately with peer B.

Peer B, and other peer group Certificate Authorities may maintain certificate revocation lists to assure that any transaction with a known, breached certificate cannot take place, thus taking security one step closer to a true peer group PKI. That final step may be taken by placing known and trustworthy Certificate Authorities into the peer group and delivering their public keys in root certificates, for example with the peer-to-peer platform.

Figure 10A:
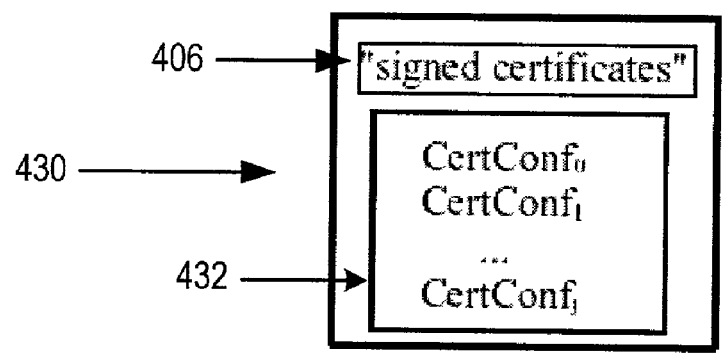
FIG. 10A illustrates a certificate confidence table according to one embodiment.
Figure 10B:
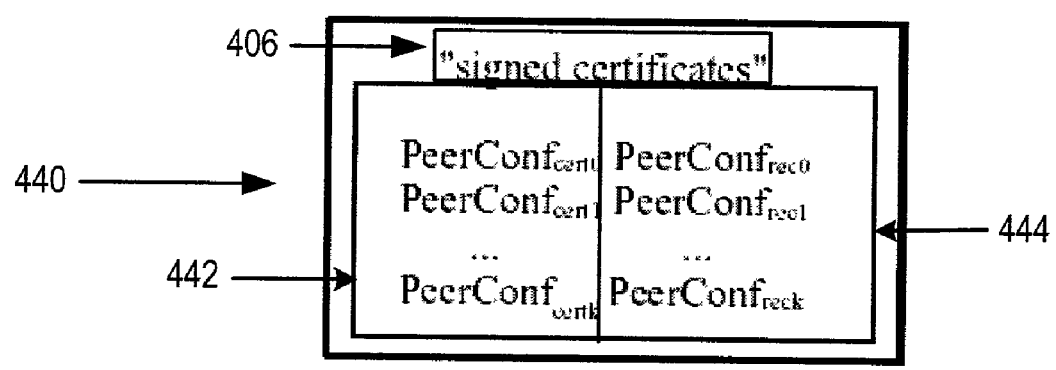
FIG. 10B illustrates a certificate confidence table comprising confidences in using a given peer's certificate for securing a transaction and confidences in the peer as a recommender, or certificate cosigner.

In one embodiment, the trust mechanism may be used in calculating codat trust based on a peer's reputation in a given peer group. Since a certificate is one form of codat, in one embodiment the trust mechanism may be applied to a peer's peer group key ring, i.e., a peer group member's collection of signed certificates for a given peer group. In the following discussion, it is assumed that the keyword is "signed certificates" or another keyword used to signify signed certificates, and that the expected response is the search target's peer group key ring contents. In one embodiment, for a peer group(i), a peer may include one or more tables as illustrated in FIGS. 10A and 10B for matches to the keyword "signed certificates," in which codat confidence is replaced with certificate confidence. In one embodiment, the tables illustrated in FIGS. 10A and 10B may be included in the codat confidence table and/or the peer confidence table(s) as illustrated in FIGS. 5A–5C.

In one embodiment, an exemplary certificate confidence table 430 as illustrated in FIG. 10A may be the peer's key ring trust table for the peer group(i), and each entry 432 may be associated with a signed certificate. Each certificate confidence entry 432 may indicate a trust in a particular path to another peer corresponding to the certificate. In FIG. 10B, the peer confidence values in table 440 may be user defined, and each peer's entry may have, for example, two values. A first value, peer confidence$_{certificate}$ 442, indicates a user's confidence in using a given peer's certificate, i.e. public key, for securing a transaction. A second, peer confidence$_{recommender}$ 444, rates that peer as a recommender, or certificate cosigner.

As an example of using peer confidence$_{recommender}$, if a peer A receives a peer C's certificate from a peer B, and peer A does not know the subject, peer C, of that certificate and peer B does, then it may need to be determined whether peer A is willing to use peer B's recommendation of peer C. Peer B may have assigned a certificate confidence value to peer C's certificate. The peer confidence$_{recommender}$ may be used to determine if peer A uses the certificate as recommended by peer B, and to what degree.

As another example of using peer confidence$_{recommender}$, the value may be used by a peer A to rate a peer B's signature, for example if peer B cosigns a certificate.

Trust may be transitive. In one embodiment, transitivity may be measured, and the degree of transitivity may be user-definable. Peer confidence$_{recommender}$ 444 may be used as an indication of the transitivity of trust. For example, if the peer confidence$_{recommender}$ is less than, for example, 4, the trust relationship may be weakly transitive. This is from the local peer's perspective and may be based on reputation.

In one embodiment, certificate confidence 432 may be initially, for example, 4.0, as a default value for certificates originating on a peer. In one embodiment the certificate confidence corresponding to a certificate may be weighted by the trust path and the peer confidence$_{recommender}$ value if the source is not the issuer. The following is an exemplary method to calculate entries 432 (trust paths) in a certificate confidence table 430 as illustrated in FIG. 10A.

Under a web of trust, if a peer A's certificate is self-signed, a peer B knows peer A, and peer B gets peer A's certificate from peer A who is then the certificate's subject, then using formula 2) for a path of length 1:

$$\text{certificate confidence}_{path} = \frac{\text{peer confidence}_{certificate}(\text{subject})}{4} \times \text{certificate confidence}_{provider} \qquad 7)$$

In one embodiment, the certificate confidence may have an initial value, e.g. 4.0, and peer confidence$_{subject}$ may default to a value, e.g. 2.0, or average, but may each be modified by the user.

Thus, for peer A:

$$\text{certificate confidence}_{path} = \frac{\text{peer confidence}_{certificate}(\text{peer } A)}{4} \times 4.0$$

Thus, if peer B's peer confidence in peer A is 3.0, the certificate confidence$_{path}$ is 3.0. This is peer B's confidence in peer A's certificate.

Next, if a peer C receives peer A's certificate from peer B, and peer C's peer confidence$_{recommender}$ in peer B's is 2.5, and peer C does not know peer A, then:

$$\text{certificate confidence}_{path} = \frac{1}{4} \times \frac{\left( \begin{array}{l} \text{peer confidence}_{recommender} + \\ \text{peer confidence}_{certificate}(\text{subject}) \end{array} \right)}{2} \times \text{certificate confidence}_{provider} \qquad 8)$$

In one embodiment, a default peer confidence$_{recommender}$ value may be 1.0, or minimal, as relationships may be initially weakly transitive.

Given the above, the certificate confidence$_{path}$ for peer A's certificate is:

$$\text{certificate confidence}_{path} = \frac{(2.5 + 2.0)}{8} \times 3.0 = 1.69$$

Here the certificate confidence for peer A's certificate on peer B's system is 3.0 (from the first example), and is used in the calculation in lieu of the default 4.0 value. Peer C rates peer B's recommendations at 3.0, and on peer C's key ring, peer A's certificate has a certificate confidence of 1.69.

In one embodiment, a certificate may have multiple signers. For example, if peer A's certificate is self-signed and cosigned by peer B, and peer C obtains the cosigned certificate from peer B, then the certificate confidence$_{path}$ is as above, and equals 1.69. In other words, peer C trusts peer B's certificate confidence in peer A.

Alternatively, if peer B cosigns the certificate, peer C gets peer A's certificate from peer A, and does not know peer A, peer C's peer confidence$_{certificate}$ in peer A is 2.0. Since peer C rates peer B's peer confidence$_{recommender}$ at 2.5, the certificate confidence$_{path}$ is:

$$certificate\ confidence_{path} = \frac{(2.5+2.0)}{8} \times 4.0 = 2.25$$

Alternatively, if peer C's peer confidence in peer A is 3.0, then:

$$certificate\ confidence_{path} = \frac{(2.5+3.0)}{8} \times 4.0 = 2.75$$

As another example, peer C may take peer B into account as a cosigner. Peer C may make peer B's peer confidence$_{recommender}$ equal to 0, and not use transitivity of trust with respect to peer B. In this case, the above certificate confidence$_{path}$ will be 3.0. The above may be applied to certificates with n signatures, n–1 cosigners, and the initial signer as $P_n$:

$$certificate\ confidence_{path} = \qquad\qquad 9)$$

$$\frac{(\sum_{i=1}^{n-1} peer\ confidence_{recommender}(P_i) + n(peer\ confidence_{certificate}(P_n)))}{2 \times 4 \times n} \times certificate\ confidence_{provider}$$

In one embodiment, if a certificate is signed by a peer group Certificate Authority, then that Certificate Authority's root certificate may be included on all peer group member peers. Such Certificate Authority signed certificates may have a default certificate confidence$_{provider}$ of, for example, 4.0, and the Certificate Authority may have default peer confidence$_{certificate}$ and peer confidence$_{recommender}$ of, for example, 4.0, thus giving all such certificates a local default certificate confidence$_{path}$ of 4.0, in one embodiment. Thus, the following is a certificate for peer A received from a Certificate Authority:

$$certificate\ confidence_{path} = \frac{(4.0+4.0)}{8} \times 4.0 = 4.0$$

A user may still apply formula 7) so that if peer B receives peer A's Certificate Authority signed certificate from peer A, and peer confidence$_{certificate}$ (peer A) is 3.0, then peer A's certificate confidence will be 3.0. This may affect peer B's willingness to do financial transactions with peer A, or willingness to send peer A private mail using S/MIME, for example. Such judgments may be personal calls made by a peer. Downgrading such a certificate may typically be rare.

At any point in time, the degree of transitivity of a given peer's reputation as a recommender with respect to another peer may be either too optimistic or pessimistic. Thus, in one embodiment, a mechanism may be provided to measure and correct, if necessary or desired, experience with respect to a peer's recommendations over time. This mechanism may be provided since peer confidence$_{recommender}$ of each such recommender may be explicitly defined.

Let K be the set of all certificate confidences for which there are non-default values for both peer confidence$_{certificate}$ and peer confidence$_{recommender}$ for certificates uniquely recommended or cosigned by a given peer, $P_0$. If K is empty, then there may not be sufficient experience to reevaluate $P_0$. In one embodiment, the average recommendation for $P_0$ may be calculated by defining:

$$cosigner\ peer\ confidence_{recommender}(P_0) = \frac{1}{|K|} \sum_{a \in K} (certificate\ confidence_{path})_a$$

where |K|=number of certificates in K. The direct peer confidence may then be calculated, e.g., as if each certificate were obtained directly from the same subjects, e.g., peer confidence$_{recommender}$ is set to 0:

$$direct\ peer\ confidence = \frac{1}{|K|} \sum_{a \in K} (peer\ confidence_{certificate})_a$$

The two values may allow a comparison of how the local peer's ratings correlate with the remote peer's ratings, and permit the local peer to adjust its ratings accordingly if they do not agree. For example, a peer A may obtain a peer B's certificate and a peer C's certificate from a peer D. If peer A gives peer D a peer confidence$_{recommender}$ value of 2.5, and the certificate confidence values of peer B and peer C on peer D are 2.6 and 3.0 respectively, then:

$$cosigner\ peer\ confidence_{peer\ d} = \frac{2.6+3.0}{2} = 2.8$$

If peer A rates peer B and peer C with peer confidence$_{certificate}$ values of 3.0 and 3.8, respectively, then by applying formula 7):

$$direct\ peer\ confidence = \frac{3.0+3.8}{2} = 3.4$$

Thus, peer A may be underrating peer D, and may adjust the peer confidence$_{recommender}$ value for peer D if desired.

Peer Identity and Authentication

In one embodiment, for a peer to be authenticated in a peer group, a peer identity may be required. In one embodiment, a peer identity may be unique across all peers. In addition, certificates issued to a peer may have a unique user identifier (UUID). For X.509 certificates this is an X.500 distinguished name that is unique across the Internet. An example is:

(CN=John Doe,
OU=Widgets,
O=ACME, Inc.,
C=FR)

Pretty Good Privacy (PGP) certificates also require user information but may be less stringent about the details. The information may be "identity" information about the user such as the user's name, identifier, photograph, etc. In either case, a unique UUID may be generated. For example:

(CN=UserName,

OU=<twenty-digit pseudo-random ID>,

O=<organization name>,

C=Country)

A concatenation of the above name identifiers may also be suitable for a PGP certificate. In one embodiment, given that each peer has its own certificate, self-signed, cosigned, or Certificate Authority-signed, a peer identity may be created by hashing the concatenation of the UUID and the public-key fields, signing this hash with the private key, and using the digital signature as the identity. Since such a signature may be large, for large keys, it may be the key length, and the first twenty bytes, for example, may be used as a digital fingerprint. Other possible fingerprint mechanisms are the MD5 or SHA-1 hash of the private key. Both are reproducible only by the owner of the private key, and verifiable, and may be used as a challenge. The identity may be used as the peer's credential in messages, for example peer-to-peer platform messages.

Given a unique identity, a peer may use the identity in accordance with a peer group's authentication policy (which also may require a password to be created) to grant or receive, for example, group privileges, account privileges, and a renewal period. This may be done over a private connection to protect the password. Finally, a group credential may be returned to the peer group member that acknowledges and embodies the authorized privileges. This same credential may then be required whenever any of the associated peer group services are used.

In one embodiment, such a method may require peer-to-peer platform authorization services. Peer group members may need to be aware of which peers or systems provide authorization services. In one embodiment, a source for lists of addresses (e.g. URIs) for authorization peers may be published, for example using a peer-to-peer platform advertisement mechanism as described later in this document.

Mobile Credentials

Some embodiments may provide the ability to move a peer's private security environment from device to device. Having multiple identities, for example, may be confusing and may add unwanted complexity to a security model. Since a private security environment may include information such as a user's private key, trusted root certificates, and peer group credentials, in some embodiments mobility may be under the constraints of strong security. If a private key is no longer private, a peer's security environment, and all of the associated relationships may need to be recreated from zero.

The IETF's (Internet Engineering Task Force) SACRED Working Group may provide a set of protocols for securely transferring credentials among devices. A general framework may be provided that may provide an abstract definition of protocols which may meet the credential-transfer requirements. This framework may allow for the development of a set or sets of protocols, which may vary from one another in some respects. Specific protocols that conform to the framework may then be developed. Some embodiments of the trust mechanism may follow and/or add to the IETF framework to provide mobile credentials.

Security Toolbox

Some embodiments of a peer-to-peer platform as described herein may include a security toolbox including security APIs and a library that may implement various security features including one or more of, but not limited to: RSA, RC4, MD5, SHA-1, a pseudorandom number generator, MAC, and digital signatures. Other ciphers and/or Diffy-Hellman may also be supported by the security toolbox. In one embodiment, the default key strength is 512 bits for RSA, and 128 bits for RC4. The peer-to-peer platform's security toolkit may be leveraged in implementing at least some embodiments of the trust mechanism.

Personal Security Environment and Codat Privacy

Users may have security parameters that need to be kept private, for example, data such as the user's private key, root certificates, and peer group credentials. In one embodiment, in order to protect a user's personal security environment, a passphrase may be used. A passphrase may be user supplied and difficult to guess. As an example, for a key of length 128 bits, and using English for the passphrase, there are 1.3 bits of information per character. Thus, in one embodiment, a secure passphrase may be 98 characters (128/1.3). In one embodiment, MD5 may be applied to the hash phrase to produce a 16-byte key for the RC4 128-bit key block cipher. This or other alternative methods may be used to encrypt the private data. It may be that not many passphrases fulfill these information theory requirements for 128-bit keys. Therefore, shorter passphrases may be used and may provide sufficient security in some embodiments. One embodiment may consider these limitations and, given a chosen key size, warn the user of passphrases of inadequate length.

In one embodiment, the same passphrase may be expanded by concatenating a few characters, e.g., "YY", then hashing the expanded passphrase and use the resulting key to create a MAC (Message Authentication Code) of the above encrypted data. This may give an integrity check for the private data, and may help prevent attacks on data that are encrypted but not MACd, for example. Using similar techniques and passphrases, information including local codat or remotely stored private codat may also be protected.

Key Rings

Over time, peers may acquire a local collection of certificates with their associated public keys. Such a collection may be referred to as the user's key ring. A peer may have at least one personal certificate. Thus, the key ring may be non-empty. A peer may both publish the existence of this key ring and distribute its contents on request, for example using peer-to-peer platform protocols as described for the exemplary peer-to-peer platform below. These peer-to-peer platform protocols may permit the creation of advertisements, for example, a peer may have one or more corresponding advertisements that may contain static information describing that peer. In one embodiment, the peer-to-peer platform peer advertisement may have an XML tag reserved for security, and to add security the peer's security pipe identifier may be advertised in that XML field.

In one embodiment, each certificate on a peer key ring may include a reference that may include, but is not limited to, the peer identifier, the address (e.g. email address) of the certificate's subject or owner, and the local peer's certificate confidence for that certificate. This list of references may be considered the peer's key ring list, and may be accessible, for example through the peer's security pipe, and thus, may be used to publish those keys that are exportable by that peer.

In one embodiment, a certificate may be accessed using either its peer identifier or domain name reference using the same pipe.

In one embodiment, the peer-to-peer platform may provide one or more protocols that may be leveraged by embodiments of the trust mechanism to support, advertise and access key ring lists and certificates as described above. In one embodiment, the absence of a security pipe identifier in the peer advertisement may imply that security services are not supported on that peer. In addition, in some embodiments, the peer advertisement may not include the security pipe identifier in order to reduce the size of these advertisements, and to make information like the security pipe identifier available on demand. In this case, the security pipe identifier may be available through a peer information protocol of the peer-to-peer platform for obtaining peer information. In one embodiment, at least the availability of security services is part of the peer advertisement.

Peer-to-Peer Platform Transport Layer Security (TLS)

In one embodiment, for private, peer-to-peer communication, TLS may be implemented within the constraints of the security model's trust spectrum discussed in the previous sections, and on top of the peer-to-peer platform's core protocols. In one embodiment, a TLS_RSA_WITH_RC4_128_SHA cipher suite from the peer-to-peer platform's security toolbox may be used. One embodiment may employ Claymore System's PureTLS code.

In one embodiment, self-signed certificates may be sent in the TLS handshake at the least secure end-point of this spectrum. Thus, as has been previously discussed, the imposter-in-the-middle attack may be possible, as it is for any PGP-like Web-of-Trust where self-signing cannot prevent forged certificates.

In one embodiment, cosigned certificates may be more difficult to forge. For example, consider a peer A that requires that all certificates it uses be cosigned by a peer B. Peer A initiates a private communication with a peer C, and a peer D is an "imposter in the middle." Peer D may forge peer C's certificate that is cosigned by peer B peer D. However, to be successful, Peer D will also have to forge peer B's certificate that is resident on peer A's system.

Thus, in some embodiments, two or more points in the trust spectrum may be implemented, e.g., self-signed and Certificate Authority signed certificates. Some embodiments may also include cosigning of certificates and/or satellite Certificate Authorities, among other measures, which may individually or together offer better than "pretty good privacy" TLS for low or no cost.

Peer Group Authentication

Some embodiments of the exemplary peer-to-peer platform described below may include a framework for Pluggable Authentication Modules (PAMs). Using peer identities, a peer group authentication module may be added to the PAM implementation of the peer-to-peer platform. In one embodiment, a peer group member that has an authentication level of authority may do the initial authentication. The initial authentication may return a peer group credential which may include one or more of, but is not limited to, the following fields:

Authorization privileges, e.g.:
  Data access: e.g. read and write.
  Authentication level: e.g. trial membership, full member, and authority.
Membership expiration date.
Hash of member's password and the algorithm used.
Peer Identity of initiating authority.
Digital Signature of the previous fields by initiating authority.

In one embodiment, the initial authentication may be done using TLS to keep the user's password private. Further authentication(s) to access other group members' systems may include the above credential, and thus may be challenged by requesting the password and reproducing the hash, after first verifying the credential with the public key of the initiating authority.

Thus, an authentication infrastructure may be included in a peer-to-peer platform, such as the exemplary peer-to-peer platform described below.

Note that the various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Peer-to-Peer Platform

The following is a description of an open network computing platform designed for peer-to-peer computing in which embodiments of the system and method for the distribution of identities and reputation on a network as described herein may be implemented.

The network computing platform may be referred to as a peer-to-peer platform. The peer-to-peer platform may be used to build a wide range of distributed services and applications in which every device is addressable as a peer, and where peers can bridge from one domain into another. The peer-to-peer platform may enable developers to focus on their own application development while easily creating distributed computing software that is flexible, interoperable, and available on any peer on the expanded Web. The peer-to-peer platform may enable software developers to deploy interoperable services and content, further springboarding the peer-to-peer revolution on the Internet. The peer-to-peer platform addresses the problems of prior art peer-to-peer systems by providing a generic and service-agnostic peer-to-peer platform that may be defined by a small number of protocols. Each protocol may be easy to implement and easy to be adopted into peer-to-peer services and applications. Thus, service offerings from one vendor may be used, perhaps transparently, by the user community of another vendor's system.

The peer-to-peer platform extends P2P computing to enable a wide range of distributed computing applications and overcome the limitations typically found in prior art P2P applications. The peer-to-peer platform is a network computing technology that provides a set of simple, small, and flexible mechanisms that can support P2P computing on any platform, anywhere, and at any time. The peer-to-peer platform generalizes P2P functionality and provides core technology that addresses the limitations of prior art P2P computing technologies.

The peer-to-peer platform is a modular platform that provides simple and essential building blocks for developing a wide range of distributed services and applications. The peer-to-peer platform specifies a set of protocols rather than an API. Thus, the peer-to-peer platform can be implemented in any language on any Operating System to provide solutions ranging from providing a simple protocol-based wrapper that enables a small device to join a network of peers to developing a fully integrated application that supports metering, monitoring, high-level security and communication across server-class systems.

In one embodiment, the peer-to-peer platform architecture may include, but is not limited to, protocols, advertisements, and core services. Network protocol bindings may be used to ensure interoperability with existing content transfer protocols, network transports, routers, and firewalls. The peer-to-peer platform may be used to combine network nodes (peers) into a simple and coherent peer-to-peer network computing platform. The platform may be directed at providing several benefits including, but not limited to, no single point of failure, asynchronous messaging, the ability for peers to adapt to their network environment, and moving content towards its consumers.

Figure 11:
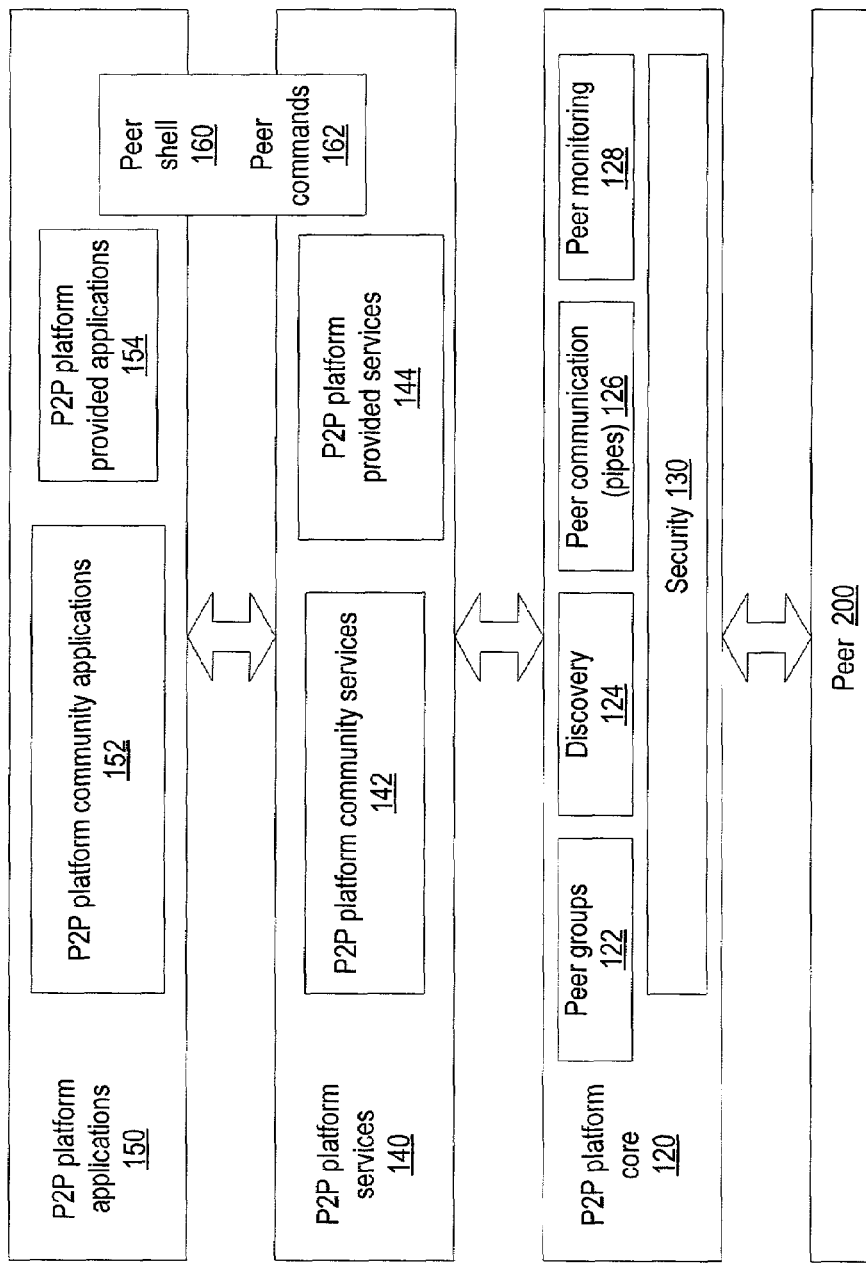
FIG. 11 illustrates one embodiment of peer-to-peer platform software architecture at the conceptual level.

FIG. 11 illustrates one embodiment of peer-to-peer platform software architecture at the conceptual level. The peer-to-peer platform may include several layers. In one embodiment, the software stack may be described using three layers; a peer-to-peer platform (core) layer 120, a service layer 140 and an application layer 150. In one embodiment, the peer-to-peer platform may include a core layer 120 that defines and encapsulates minimal primitives that are common to peer-to-peer networking, including, but not limited to, peers 110, peer groups 122, peer discovery 124, peer communication (e.g. pipes) 126, peer monitoring 128, and associated security primitives 130. This layer may be shared by all peer-to-peer devices so that interoperability becomes possible.

A peer may be defined as any entity that runs some or all of one or more protocols provided by the peer-to-peer platform core layer. As such, a peer may manifest in the form of a processor, a process or a device. A peer may be anything with a digital heartbeat that supports the peer-to-peer platform core, including sensors, servers, PCs, computers up to and including supercomputers, PDAs, manufacturing and medical equipment, phones and cellular phones. In order to interact with other peers (e.g. to form or join peer groups), the peer needs to be connected to some kind of network (wired or wireless), such as IP, Bluetooth, or Havi, among others.

The peer-to-peer platform may provide mechanisms through which peers may discover each other, communicate with each other, and cooperate with each other to form peer groups. Peers may discover each other on the network to form transient or persistent relationships called peer groups. A peer group is a collection of peers connected by a network that share a common set of interests and that have agreed upon a common set of rules to publish, share and access any computer content (code, data, applications, or other collections of computer representable resources), and communicate among themselves. Peer groups may also be statically predefined. The peers in a peer group may cooperate to provide a common set of services. A peer group may be viewed as an abstract region of the network, and may act as a virtual subnet. The concept of a region virtualizes the notion of routers and firewalls, subdividing the network in a self-organizing fashion without respect to actual physical network boundaries. In one embodiment, peer groups implicitly define a region scope that may limit peer propagation requests. Conceptually, a peer group may be viewed as a virtual entity that speaks the set of peer group protocols.

A peer group may theoretically be as large as the entire connected universe. Naming anything uniquely is a challenge in such a large namespace. In one embodiment, the peer-to-peer platform may support and/or provide sophisticated naming and binding services. In one embodiment, the peer-to-peer platform may use a universal unique identifier (UUID), for example, a 64- or 128-bit datum, to refer to an entity (e.g. a peer, peer group, pipe, content, etc.). For example, UUIDs may be embedded in advertisements for internal use. UUIDs may be used to guarantee that each entity has a unique UUID within a local runtime environment and serves as a canonical way of referring to an entity, but because a global state is not assumed, it may not be possible to provide a guarantee of uniqueness across an entire community that may consist of millions of peers. This may not be a problem because a UUID may be used within the peer-to-peer platform as an internal identifier. This may become significant only after the UUID is securely bound to other information such as a name and a network address. In one embodiment, Uniform Resource Name (URN) format may be used for the expression of UUIDs.

The core layer 120 provides core support for peer-to-peer services and applications. In a multi-platform, secure execution environment, the core mechanisms of peer groups, peer pipes and peer monitoring may be provided. Peer groups 122 may establish a set of peers and naming within a peer group with mechanisms to create policies for creation and deletion, membership, advertising and discovery of other peer groups and peer nodes, communication, security, and content sharing. Pipes provide virtual communication channels among peers. Messages sent in pipes may support transfer of data, content, and code in a protocol-independent manner, allowing a range of security, integrity, and privacy options. In one embodiment, messages may be structured with a markup language such as XML. Peer monitoring 128 enables control of the behavior and activity of peers in a peer group and can be used to implement peer management functions including access control, priority setting, traffic metering, and bandwidth balancing.

The core layer 120 may include protocols and building blocks to enable key mechanisms for peer to peer networking, including discovery, transport (including firewall handling and limited security), and the creation of peers and peer groups. The core layer 120 may be thin and small, and may provide interesting and powerful primitives for use by services and applications in the other layers. The core layer 120 may support choices such as anonymous vs. registered users and encrypted vs. clear text content without imposing specific policies on developers. Policy choices may be made, or when necessary, implemented, at the service layer 140 and/or application layer 150. For example, administration services such as accepting or rejecting a peer's membership in a peer group may be implemented using the functionality provided by the core layer 120.

The core components of the peer-to-peer protocol may be used to implement discovery mechanisms for searching, publishing and recovering of core abstractions (e.g. peers, peer group, pipes, endpoints, and advertisements). These mechanisms may be simple, administration free, and do not require special peers to act as "master" peers. These mechanisms may allow processes in the peer-to-peer network, in absence of help from other applications and/or services, to bootstrap and find out the information necessary to access applications and services that can help. Also, the core may "return" to this standalone behavior and still function if helper applications or services fail. In one embodiment, safety mechanisms may be put in place in order to avoid a major overflow of "web-crawling". In one embodiment, applications and/or services that support the peer-to-peer protocol may access, control, and/or override the core components, even to the extreme of implementing a centralized, client-server model based on the core components.

At the highest abstraction level, the peer-to-peer platform may be viewed as a set of protocols provided at the core layer 120. In one embodiment, a common thread among peer-to-peer platform peers is protocols, not APIs or software implementations. The peer-to-peer platform protocols may guarantee interoperability between compliant software components executing on potentially heterogeneous peer runtimes. Thus the peer-to-peer platform may be agnostic to programming languages. The term compliant may refer to a single protocol only. That is some peers may not implement all the core protocols. Furthermore, some peers may only use a portion (client-side or server-side only) of a protocol.

Each protocol may be defined by one or more messages exchanged among participants of the protocol. Each message may have a predefined format, and may include various data fields. In one embodiment the protocols may utilize messaging such as XML messages. The peer-to-peer platform connects peer nodes with each other. The peer-to-peer platform may be platform-independent by virtue of being a set of protocols. As such, the peer-to-peer platform may not require APIs and remains independent of programming languages, so that it can be implemented in C/C++, Java, Java 2ME, Perl, Python or other languages. This means heterogeneous devices with completely different software stacks may interoperate through the peer-to-peer platform protocols. To underpin this set of protocols, the peer-to-peer platform may define a number of concepts including peer, peer group, advertisement, message, pipe, and more.

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Several peer-to-peer platform protocols that may be provided by embodiments of the peer-to-peer platform are described later in this document. The protocols defined in this document may be realized over networks including, but not limited to, the Internet, a corporate intranet, a dynamic proximity network, a home networking environment, LANs, and WANs. The protocols defined in this document may also be realized within a single computer. Thus, the peer-to-peer platform may be transport protocol independent. The size and complexity of the network peers that may support these protocols may include a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

The peer-to-peer platform may further include a peer-to-peer services layer 140. This layer may provide capabilities that may not be absolutely necessary for a peer-to-peer network to operate but that may be desirable to provided added functionality beyond the core layer 120 in the peer-to-peer environment. The service layer 140 may deal with higher-level concepts such as search and indexing, directory, storage systems, file sharing, distributed file systems, resource aggregation and renting, protocol translation, authentication and PKI (public key infrastructure) systems. These services, which may make use of the protocols and building blocks provided by the core layer 120, may be useful by themselves but also may be included as components in an overall P2P system. Thus, services may include one or more services 144 provided by the peer-to-peer platform. These platform-provided services 144 may include indexing, searching and file sharing services, for example. The services layer 140 may provide hooks for supporting generic services (such as searching, sharing and added security) that are used in many P2P applications. Thus, services may also include one or more services 142 not provided as part of the peer-to-peer platform but rather provided by the peer-to-peer platform community. These services 142 may be user-defined and may be provided, for example, to member peers in a peer group as a peer group service.

Services may expand upon the capabilities of the core layer 120 and may be used to facilitate application development. Facilities provided as services in the service layer 140 may include mechanisms for search and indexing, directory, storage systems, file sharing, distributed file systems, resource aggregation and renting, protocol translation, authentication, PKI services, and caching code and content to enable cross-application bridging and translation of files, among others. Searching capabilities may include distributed, parallel searches across peer groups that are facilitated by matching an XML representation of a query to be processed with representations of the responses that can be provided by each peer. These facilities may be used for simple searches, for example searching a peer's repository, or more complex searches of dynamically generated content that is unreachable by conventional search engines. P2P searches may be conducted across a company's intranet, for example, to quickly locate relevant information within a secure environment. By exercising tight control over peer group membership and enabling encrypted communication between peers, a company may extend this capability to its extranet, including business partners, consultants, and suppliers as peers. The same mechanisms that facilitate searches across the peer group may be used as a bridge to incorporate Internet search results, and to include data outside of the peer's own repository, for example searching a peer's disk. The peer services layer 140 may be used to support other custom, application-specific functions. For example, a secure peer messaging system may be built to allow anonymous authorship and a persistent message store. The peer services layer 140 provides the mechanisms to create such secure tools; the application developers themselves may determine specific tool policies.

The peer-to-peer platform may also include a peer-to-peer application layer 150. The application layer 140 may support the implementation of integrated applications such as file sharing, resource sharing, monetary systems, distributed storage, peer-to-peer instant messaging, entertainment, content management and delivery, peer-to-peer email systems, distributed auction systems, among others. Applications may be "vertical" or they may be developed to interoperate with other distributed applications. One or more applications 154 may be provided as part of the peer-to-peer platform. For example, one embodiment of the peer-to-peer platform may include a shell application 160 as a development environment built on top of the platform. The shell application may provide interactive access to the peer-to-peer platform via a simple command line interface 162.

Applications may also include community applications 152 not provided by the peer-to-peer platform. These community applications 152 may be user-defined and may be provided, for example, to member peers in a peer group as a peer group application.

In one embodiment, the boundary between services and applications is not rigid. An application to one customer can be viewed as a service to another customer. An application may use services. Services may serve as protocols that may be shared among various applications. An application may provide a user interface, a way to define a set of files to share, a way to initiate a search, a way to display the results, and a way to initiate a file transfer, for example. Such an application may make use of a set of services, for example a reliable point-to-point file transfer service, a distributed search service, and a discovery service to locate other peers, among others.

Applications may be built using peer services as well as the core layer 120. The peer-to-peer platform may support the fundamental levels broadly, and rely on the P2P development community to provide additional peer services and applications. Peer applications enabled by both the core layer 120 and peer services layer 140 may include P2P auctions that link buyers and sellers directly, with buyers able to program their bidding strategies using a simple scripting language, for example. Resource-sharing applications, such as SETI@(home, may be built more quickly and easily, with heterogeneous, worldwide peer groups supported from day one. Instant messaging, mail, and calendaring services may facilitate communication and collaboration within peer groups that are secure and independent of service provider-hosted facilities. Virtually any other type of application may be build on top of the core layer 120 and services layer 140.

Some features, such as security, may manifest in all three layers and throughout a P2P system, albeit in different forms according to the location in the software architecture. The system may be modular, and may allow developers to pick and choose a collection of services and applications that suits their needs.

A typical peer-to-peer platform network may provide an inherently nondeterministic topology/response structure. In a peer-to-peer platform network, a specific resource request may not return for minutes, hours, or even days; in fact, it may never return at all. In addition, people from different parts of the world requesting the same resource are likely to get different copies of the resource from completely different locations. Peers may obtain content from multiple servers, ideally reaching a nearby one that is up and running. The original source peer need not service every resource request; in fact, it does not even have to be up and running. The nondeterministic structure may also help provide the optimized use of network bandwidth. The concentrated localized traffic congestion typical of today's Web doesn't affect P2P networking. The nondeterministic structure may also help provide a lowered cost of content distribution. The P2P network can absorb contents and replicate it for easy access. The nondeterministic structure may also help provide leveraged computing power from every node in the network. With asynchronous operations, a user may issue many requests for many resources or services simultaneously and have the network do the work. The nondeterministic structure may also help provide unlimited scalability. A properly designed P2P application may span the entire known connected universe without hitting scalability limits; this is typically not possible with centralized schemes. Note, however, that the peer-to-peer platform also may support deterministic, synchronous applications.

The peer-to-peer platform provides the ability to replicate information toward end users. Popular content tends to be replicated more often, making it easier to find as more copies are available. Peers do not have to always go back to the same peer to obtain the information they want, as is typical in the client/server model. Peers may obtain information from neighboring peers that have already cached the information. Each peer may become a provider to all other peers.

In one embodiment the peer-to-peer platform may enable peers to find content that is closest to them. This content may include data (e.g. files) or even services and applications. For example, if a peer node in an office peer-to-peer network using the peer-to-peer platform is moved, the peer-to-peer platform may allow the peer to automatically locate content (e.g. using a discovery service that participates in the discovery protocol) including services (e.g. a printer service and an email service) hosted by other peers closest to the peer's new location, without requiring any manual reconfiguration. Further, at least some content may be copied or moved to the peer in its new location and/or to other peers proximate to the new location.

The peer-to-peer platform may provide a decentralized environment that minimizes single points of failure and is not dependent on any centralized services. Both centralized and decentralized services may be developed on top of the peer-to-peer platform. With the addition of each new network peer, the network platform may become more robust as it expands. In the environment, services may be implemented to interoperate with other services giving rise to new P2P applications. For example, a P2P communications service like instant messaging may easily be added to a resource-sharing P2P application if both support at least the necessary peer-to-peer platform protocols.

The peer-to-peer platform may provide interoperability. The peer-to-peer platform may be used by developers independent of preferred programming languages, development environments, or deployment platforms. Embodiments of the peer-to-peer platform may enable interconnected peers to easily locate each other, communicate with each other, participate in community-based activities, and offer services to each other seamlessly across different P2P systems and different communities. The peer-to-peer platform may also provide platform independence. Embodiments of the peer-to-peer platform may be independent of programming languages (such as C/C++, Java, Perl, and KVM), system platforms (such as the Microsoft Windows, UNIX®, Solaris, Linux and Macintosh platforms), and networking platforms (such as TCP/IP, Bluetooth and Havi). Thus, heterogeneous devices with completely different software stacks may interoperate through the peer-to-peer platform protocols. Embodiments of the peer-to-peer platform may be implementable on any device with a digital heartbeat, including, but not limited to, sensors, consumer electronics, Personal Digital Assistants (PDAs), appliances, network routers, desktop computers, data-center servers, and storage systems. Embodiments of the peer-to-peer platform may enable peers, independent of software and hardware platform, to benefit and profit from being connected to millions of other peers.

In one embodiment, the peer-to-peer platform may run on any of various operating systems including embedded operating systems (with the appropriate level of Java runtime support, if required) such as Windows95, 98, 2000, ME, and NT, Solaris, Unix, Macintosh, Linux, Java 2 Platform, Micro Edition (J2ME) and PersonalJava Technology. The peer-to-peer platform may be implemented in any of a variety of development environments using any of a variety of programming languages, or combinations of programming languages, including, but not limited to, Java, Java 2ME, C/C++, Perl, Python and KVM. In one embodiment, the peer-to-peer platform may be implemented in Java. In one embodiment, a peer-to-peer platform may be implemented in C/C++ on some devices, for example, to support devices without Java support. In one embodiment, a peer-to-peer platform may be implemented in KVM on some devices, for example, so that all KVM capable devices such as PDAs and cell phones can be peer-to-peer platform peers. Programming languages other than those listed may also be used in various embodiments.

A minimal device with the ability to generate a text string may theoretically participate in a peer-to-peer platform network (though not necessarily in every P2P application). The simplistic device may need a surrogate peer on the P2P network. This surrogate peer may perform discovery, advertisement, and communications on behalf of the simplistic device (or many simplistic devices). The location of the surrogate may be hard-wired into the simplistic device. In this way, the simplistic device with the help of the surrogate can be a full-fledged peer on the peer-to-peer platform network. For example, a GPS locator, strapped to a sea turtle and sending out peer-to-peer platform messages wirelessly with location information, may become a peer on a peer-to-peer platform network.

The peer-to-peer platform may be independent of transport protocols. For example, the peer-to-peer platform may be implemented on top of TCP/IP, HTTP, Bluetooth, HomePNA, and other protocols. Thus, a system built on top of the peer-to-peer platform may function in the same or similar fashion when the system is expanded to a new networking environment or to a new class of devices, as long as there is a correct transport protocol handler for the new networking protocol.

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may focus on mechanisms instead of policy, so that application developers can have the maximum freedom to innovate and offer competitive solutions.

Implementations of the peer-to-peer platform may be illustrated with a few application or usage scenarios. For example, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. The peer-to-peer platform may provide a platform bridge that may be used to connect the various peer-to-peer systems together.

In another example, one engineering group requires a sizable storage capability, but also with redundancy to protect data from sudden loss. Using the peer-to-peer platform, each group may buy a simple storage system without a mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Using the peer-to-peer platform, these devices may be able to interact with each other, without extra networking interfaces except those needed by the devices themselves, using the peer-to-peer platform as the common layer of communication and data exchange.

Peers

Network nodes (peers) of various kinds may join the peer-to-peer networking platform by implementing one or more of the platform's protocols. Each peer operates independently and asynchronously of any other peer, providing a degree of reliability and scalability not typically found in current distributed systems. Some peers may have more dependencies with other peers due to special relationships (e.g. gateways or routers). In one embodiment, a peer does not need to understand all of the protocols of the peer-to-peer platform. The peer can still perform at a reduced level if it does not support one or more of the protocols.

Peers may publish and provide network resources (e.g. CPU, storage and routing resources) that may be used by other peers. Peers typically interact with a small number of other peers (network neighbors or buddy peers). Peers that provide the same set of services tend to be inter-changeable. Thus, it may not matter which peers a peer interacts with. Generally, assumptions should not be made about peer reliability or connectivity, as a peer may appear or leave the network at any time. Peers may have persistent storage. A peer may optionally cache information.

Peers may have multiple network interfaces, though a peer may not need to publish all of its interfaces for use with the peer-to-peer protocols. Each published interface may be advertised as a peer endpoint. In one embodiment, a peer endpoint is an identifier (e.g. a URN or URI) that uniquely identifies a peer network interface. Peer endpoints may be used by peers to establish direct point-to-point connection between two peers. Peers may not have direct point-to-point network connection between themselves, either due to lack of physical network connections, or network configuration (NATs, firewalls, proxies, etc.), and thus a peer may have to use one or more intermediary peers to route a message from an endpoint to another peer endpoint.

Peers may be identified by their unique ID (UUID) rather than by a fixed address. When a peer boots, it attempts to contact other peers. In one embodiment, contacted peers may include variable-sized caches that map nearby peers' UUID to their current address. This allows embodiments of the peer-to-peer platform to be run over a dialup connection, for example.

In one embodiment, a peer may be assigned a unique string as a name. Any naming scheme may be used. In one embodiment, names are not unique unless a coordinated naming service is used to guarantee name uniqueness. A naming service is typically a centralized service that guarantees the uniqueness of name and can be used to register name mapping. Examples of naming services are DNS and LDAP. Use of a naming service may be optional.

Peer Groups

Figure 12:
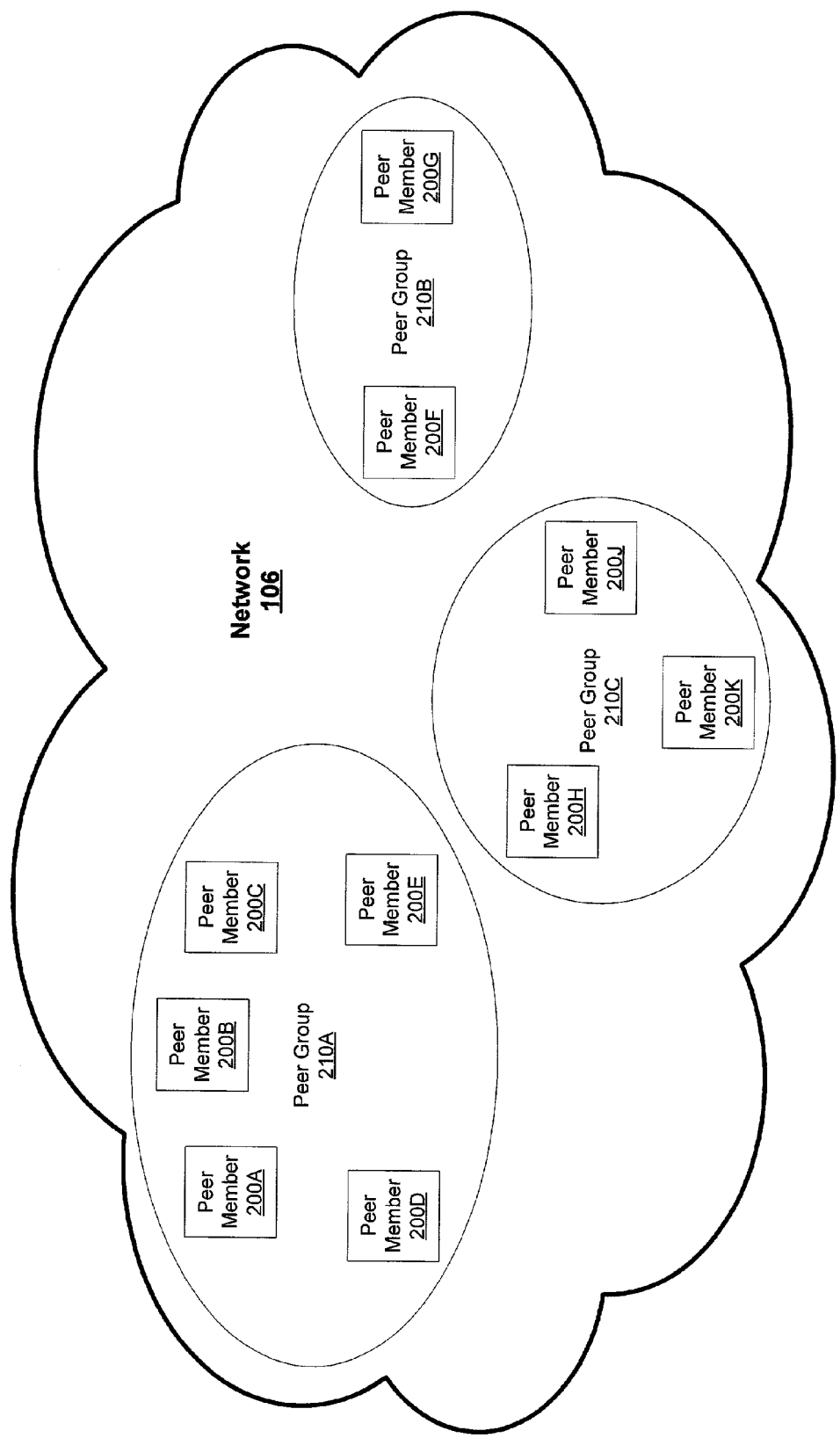
FIG. 12 illustrates an exemplary network with peer groups according to one embodiment.

FIG. 12 illustrates an exemplary network with peer groups according to one embodiment. Network 106 may include, but may not be limited to, the Internet, a corporate intranet, a dynamic proximity network, a home networking environment, LANs, and WANs supporting standards such as IP, Bluetooth, and Havi, among others. The peer groups may divide the network into virtual networks. For example, peer member 200F and peer member 200G are members of the same virtual network provided by peer group 210B. The peer groups may define limited domains of message and service availability thereby providing scope for communications and service access. For example, peer member 200H may broadcast a message over the virtual network provided by peer group 210C. This message may reach peer member 200J and peer member 200K, but may be restricted from reaching (or may be ignored by) peers in peer group 210A and 210B.

The peer-to-peer platform may describe how to create and discover peer groups, but does not dictate when, where, or why to create a peer group, the type of the group, or the membership of the group. A peer group may provide a common membership definition. Each peer group may establish its own membership policy in a range from open (any peer can join) up to highly secure and protected (a peer may join only if it possesses sufficient credentials).

In one embodiment, peers wishing to join a peer group may first locate a current member, and then request to join the peer group. The peer-to-peer platform may define how to discover peer groups, e.g. using a peer discovery protocol. The application to join may be rejected or accepted by the collective set of current members in accordance with the peer group's membership policy. In one embodiment, a peer group core membership service may be used to enforce a vote among one or more group members. Alternatively, one or more group representative member peers may be elected or appointed to accept or reject new membership applications.

In one embodiment, the peer-to-peer platform is not concerned with what sequence of events a peer or a peer group comes into existence. Moreover, in one embodiment, the peer-to-peer platform does not limit how many groups a peer can belong to. In one embodiment, nested and/or overlapping peer groups may be formed.

Figure 13:
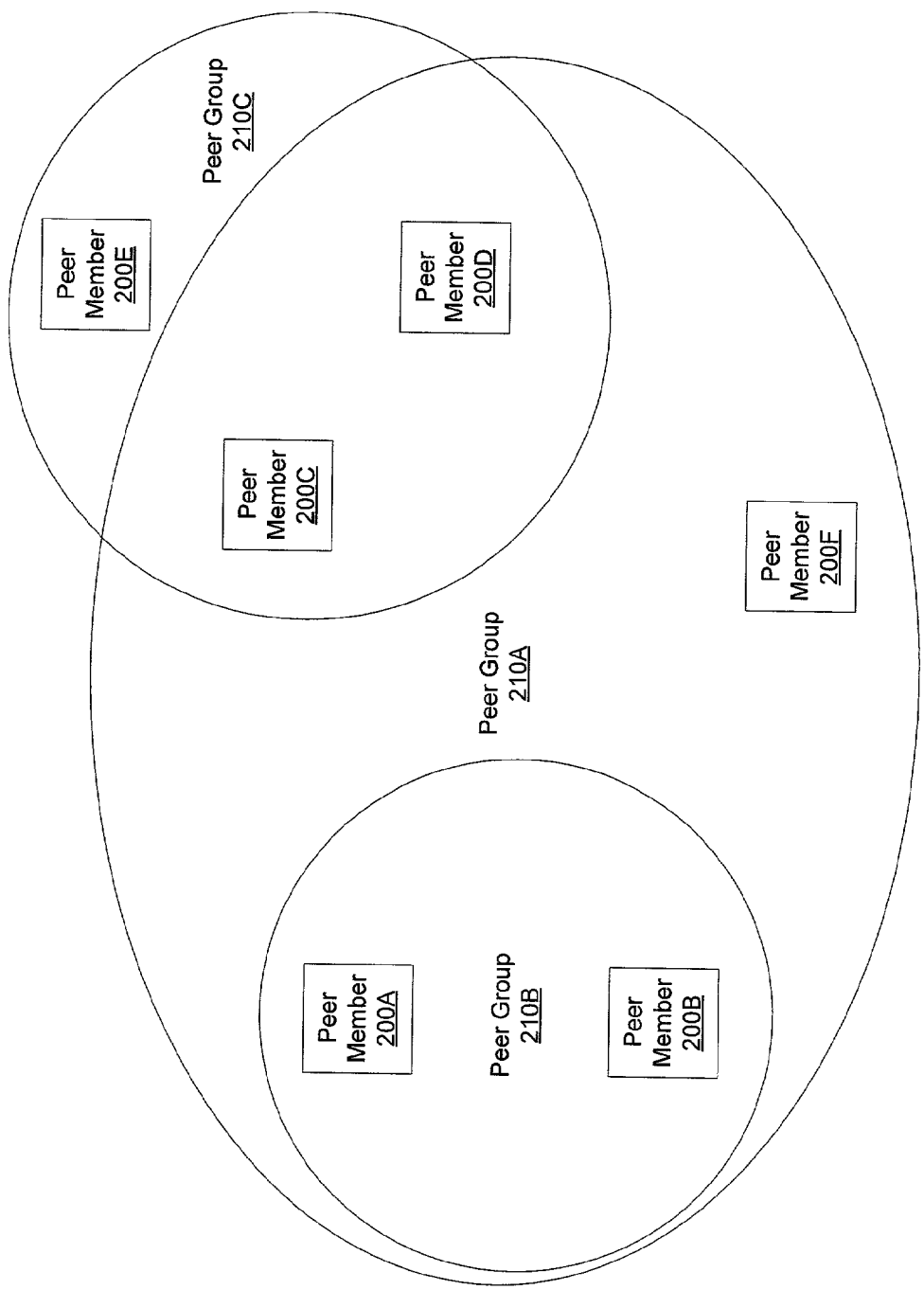
FIG. 13 illustrates nested peer groups and overlapping peer groups according to one embodiment.

FIG. 13 illustrates nested peer groups according to one embodiment. Peer group 210B may be nested within peer group 210A by virtue of all of peer group 210B's members, peer member 200A and peer member 200B, also being members of peer group 210A. Peer member 200A and peer member 200B may access services provided by both peer group 210A and peer group 210B, but peer member 200F may not have access to services provided by peer group 210B.

FIG. 13 further illustrates overlapping peer groups according one embodiment. Peer group 210A and peer group 210C may overlap by virtue of having peer member 200C and peer member 200D in common. Peer member 200C and peer member 200D may access services provided by peer group 210A and peer group 210C. Peer member 200E may access services provided by peer group 210C, but may not have access to services provided by peer group 210A. Likewise, peer member 200F of peer group 210A may not have access to services provided by peer group 210C.

In one embodiment, there may be a special group, called the World Peer Group, which may include all peer-to-peer platform peers. The world peer group may provide the minimum seed for every peer to potentially find each other and form new groups. In one embodiment, the world peer group has an open membership policy (e.g. has a null membership authenticator service). Some peers inside the world peer group may not be able to discover or communicate with each other—e.g., they may be separated by a network partition. In one embodiment, participation in the World Peer Group is by default.

The peer-to-peer platform may use the concept of a peer group as an implicit scope of all messages originated from within the group. Peer groups may serve to subdivide the network into abstract regions providing an implicit scoping mechanism. Peer groups may provide a limited scoping environment to ensure scalability. Peer groups may be formed and self organized based upon the mutual interest of peers. In one embodiment, no particular rules are imposed on the way peer groups are formed, but peers with the same interests may tend to join the same peer groups.

In one embodiment, a scope may be realized with the formation of a corresponding peer group. Peer group boundaries may define the search scope when searching for a group's content. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message may propagate the message based on the scope indicator. Using this approach, a sending peer may be bootstrapped with some well-defined scopes, and additional scopes may be discovered.

Peer groups may also be formed based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.

Peer groups may provide a secure cooperative environment. Peer group boundaries permit member peers to access and publish protected contents. Peer groups form virtual secure regions which boundaries limit access to the peer group resources. Secure services may be provided to peers within a secured peer group. Their boundaries may or may not reflect any underlying physical network boundaries such as those imposed by routers and firewalls. The concept of a region may virtualize the notion of routers and firewalls, subdividing the network into secure regions in a self-organizing fashion without respect to actual physical network boundaries.

Peer groups may also create a monitoring environment. Peer groups may permit peers to monitor a set of peers for any special purpose (heartbeat, traffic introspection, accountability, etc.). Peer groups may also provide a controlled and self-administered environment. Peer groups may provide a self-organized structure that is self-managed and that may be locally managed.

Peer groups using the peer-to-peer platform may provide several capabilities including, but not limited to, the ability to, find nearby peers, find named peers anywhere on the network, find named peer groups anywhere on the network, join and resign from a peer group, establish pipes between peer group members and find and exchange shared content.

Peers may be grouped into peer groups to share content. A content is published and shared among the peer members of a peer group. In one embodiment, content may be shared among group members, but not between groups. In this embodiment, no single item of content may belong to more than one group. If the same content is published in two different peer groups, two different contents may be created. In one embodiment, a content item may be published to make the item's existence known and available to group members using advertisements. A content may be any computer content (e.g. code, data, applications, active content such as services, or other collection of computer-representable resources). Examples of content include, but are not limited to, a text file, a structured document (e.g. a PDF or a XML file), a Java ".jar" or loadable library, code or even an executable process (checkpointed state).

Pipes may provide the primary channels for communication among peers and are a mechanism for establishing communication between peers. Pipes may be used as communication channels for sending and receiving messages between services or applications over peer endpoints. Pipes may connect peers that have a direct physical link and peers that do not have a direct physical link. In the latter case, one or more intermediary peer endpoints may be used to route messages between the two pipe endpoints. A pipe instance is, logically speaking, a resource within a peer group. The actual implementation of a pipe instance is typically through a pipe service. In one embodiment, at each endpoint, software to send, or receive, as well as to manage optional associated pipe message queues is assumed, but not mandated. In one embodiment of the peer-to-peer platform, pipes may be asynchronous, unidirectional, stateless and unreliable to provide the lowest overhead. In one embodiment, enhanced pipes with additional properties such as bi-directionality, reliability, security, and quality of service may be supported.

The pipe endpoints may be referred to as input pipes (receiving end) and output pipes (sending end). Pipes may provide the illusion of a virtual in and out mailbox that is independent of any single peer location. Services and applications may communicate through pipes without knowing on which physical peer a pipe endpoint is bound. Using pipes, developers may build highly available services where pipe connections may be established independently of a peer location. This dynamic binding of pipes helps to provide redundant implementation of services over a P2P network.

Figure 14:
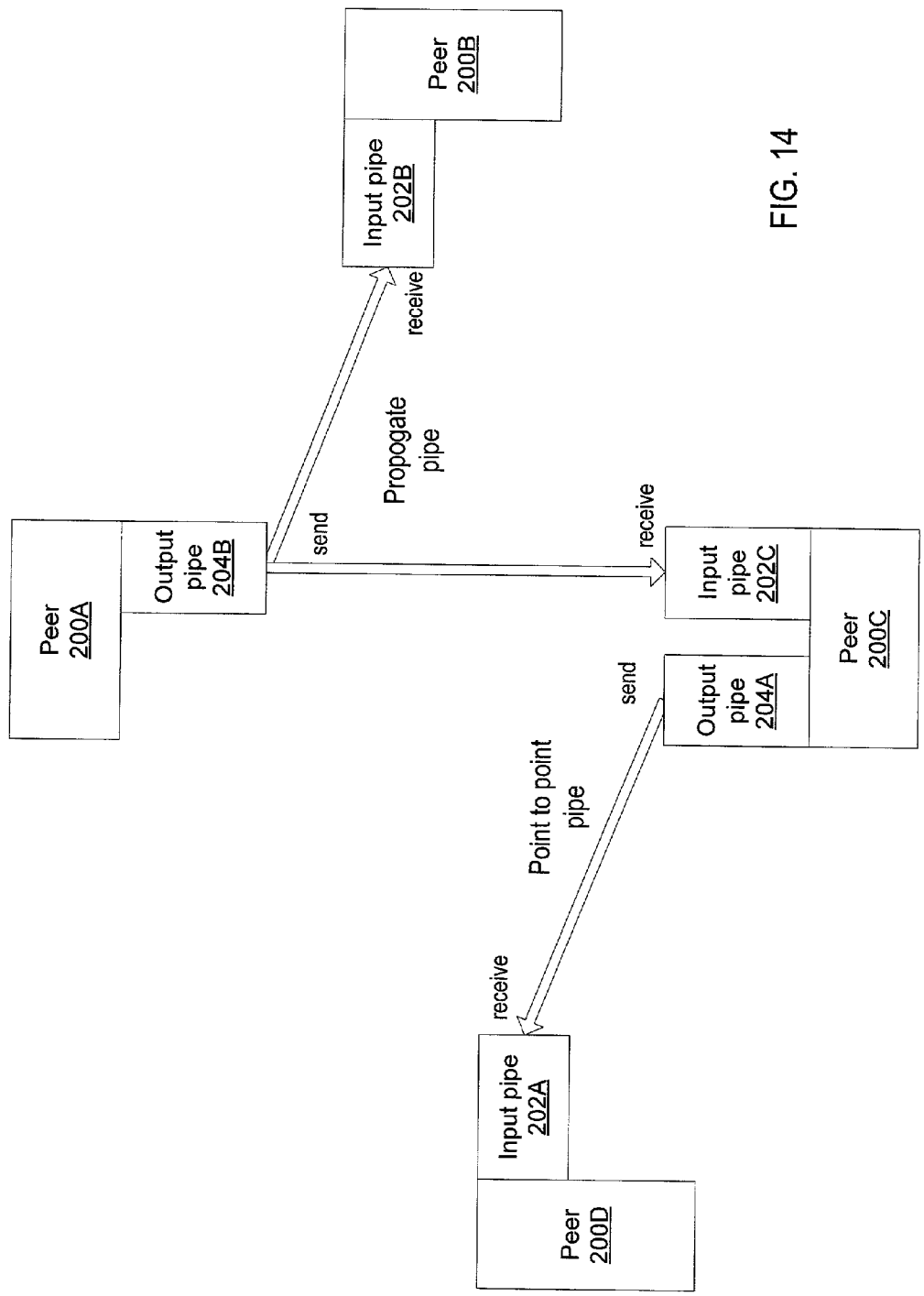
FIG. 14 illustrates a point-to-point pipe connection between peers according to one embodiment.

Pipes may offer several modes of communication. FIG. 14 illustrates a point-to-point pipe connection between peers 200C and 200D according to one embodiment. In one embodiment, a point-to-point pipe connects exactly two peer endpoints together, an input pipe 202A that receives messages sent from an output pipe 204A. The pipe appears as an output pipe to the sender and as an input pipe to the receiver, with traffic going in one direction only—from the sender to the receiver. In one embodiment, no reply or acknowledgement operation is supported. In one embodiment, additional information in the message payload (for example, a unique ID) may be required to thread message sequences. The message payload may also contain a pipe advertisement that can be used to open a pipe to reply to the sender (send/response).

FIG. 14 further illustrates a propagate pipe with peer 200A as a propagation source and peers 200B and 200C with listening input pipes according to one embodiment. A propagate pipe may connect two or more peer endpoints together, from one output pipe 204B to one or more input pipes (e.g. 202B and 202C). The result is that any message sent into the output pipe is sent to all input pipes. Messages flow into the input pipes from the output pipe (propagation source). A propagate message may be sent to all listening input pipes. This process may create multiple copies of the message to be sent. On transports that provide multicast (e.g. TCP/IP), when the propagate scope maps to underlying physical subnets in a one-to-one fashion, transport multicast be may used as an implementation for propagate. Propagate may be implemented using point-to-point communication on transports that do not provide multicast such as HTTP.

Peers may cooperate and communicate to publish, discover and invoke network services. A service denotes a set of functions that a provider offers. In one embodiment, a peer-to-peer platform peer can offer a service by itself or in cooperation with other peers. In one embodiment, a peer may publicize a service by publishing a service advertisement for the service. Other peers may then discover the service using the peer discovery protocol (through the advertisement) and make use of it. A peer may publish as many services as it can provide.

In one embodiment, the peer-to-peer platform may define peer group core services including, but not limited to, a discovery service, a membership service, an access service, a pipe service, a resolver service and a monitoring service. A discovery service may be used to search for peer group resources such as peers, peer groups, and pipes. The search criteria may include a resource name. Discovery and discovery services are described more fully later in this document.

In one embodiment, most peer groups will have at least a membership service. Current peer group members may use the membership service during the login process to reject or accept a new peer group membership application. The membership service may be a "null" authenticator service that imposes no real membership policy. Peers wishing to join a peer group first locate a current member, and then request to join. The application to join may be either rejected or accepted by the collective set of current members. The membership service may enforce a vote of peers or alternatively elect a designated group representative to accept or reject new membership applications.

An access service may be used to validate, distribute, and authenticate a group member's credentials. The access service may define the type of credential used in the message-based protocols used within the peer group. The access service may be used to validate requests made by one peer to another. The peer receiving the request provides the requesting peer's credentials and information about the request being made to the access service to determine if the access is permitted. In one embodiment, not all actions within the peer group need to be checked with the access service, only those actions which only some peers are permitted to use.

A pipe service may be used to manage and create pipe connections between the different peer group members. A resolver service may be used to send query string to peers to find information about a peer, a peer group, a service or a pipe. A monitoring service is used to allow one peer to monitor other members of the same peer group.

In one embodiment, not all the above services are required to be implemented by a peer group. Each service may implement one or more of the peer-to-peer platform protocols. A service may implement one protocol for simplicity and modularity reasons, but some services may not implement any protocols.

In one embodiment, the peer-to-peer platform core services may provide a reference implementation for user-defined services. Examples of user defined services may include, but are not limited to: efficient long-distance peer lookup and rendezvous using a peer naming and discovery service; simple, low-cost information search and indexing using a content sharing service; interoperability with existing centralized networking infrastructure and security authorities in corporate, public, private, or university networks using administration services; a resolver service may be implemented to find active (running on some peer) and inactive (not yet running) service instances; and an FTP service that allows file transfers among peers over pipes using FTP.

Advertisements

In one embodiment, the peer-to-peer protocols may use advertisements to describe and publish the existence of peer resources. An advertisement may be defined as a structured, language neutral metadata structure that names, describes, and publishes the existence of a peer-to-peer platform resource, such as a peer, a peer group, a pipe, or a service. Information exchanged between peers may include advertisement documents. The peer-to-peer platform may include advertisement documents to represent all of the peer-to-peer platform resources managed by the core platform, such as peers, peer groups, pipes and services. In one embodiment, the peer-to-peer platform may define core advertisement types including, but not limited to, one or more of peer advertisements, peer group advertisements, pipe advertisements, service advertisements, content advertisements, and endpoint advertisements. In one embodiment, user-defined advertisement subtypes (for example, using XML schemas) may be formed from these basic types.

Peer-to-Peer Platform Protocols

The peer-to-peer platform protocols may provide and support ad hoc, pervasive, and multi-hop peer-to-peer (P2P) network computing. Using the protocols, peers may cooperate to form self-organized and self-configured peer groups independently of their positions in the network (e.g. edges, firewalls), and without the need of a centralized management infrastructure. The peer-to-peer platform protocols may have very low overhead, make few assumptions about the underlying network transport and limited requirements of the peer environment, and may be used to deploy a wide variety of P2P applications and services in a highly unreliable and changing network environment.

In one embodiment, the peer-to-peer platform may include core protocols including, but not limited to, a peer membership protocol, a peer discovery protocol, a peer resolver protocol, a peer information protocol, a pipe binding protocol, and a peer endpoint protocol. These protocols may be implemented using a common messaging layer. This messaging layer binds the protocols to various network transports. In one embodiment, the peer-to-peer platform protocols may be specified as a set of markup language (e.g. XML) messages exchanged between peers. Each software platform binding describes how a message is converted to and from a native data structures such as a Java object or 'C' structure. In one embodiment, the use of markup language messages to define protocols allows many different kinds of peers to participate in a protocol. Each peer is free to implement the protocol in a manner best suited to its abilities and role. Peer-to-peer platform messages are described previously in this document.

In one embodiment, each of the protocols is independent of the others. A peer may not be required to implement all of the networking protocols. A peer may implement only the protocol that it requires. For example, a device may have all the advertisements it uses pre-stored in memory, so that peer does not need to implement the Peer Discovery Protocol. As another example, a peer may use a pre-configured set of peer routers to route all its messages, hence the peer does not need to implement the Peer Endpoint protocol. Instead, the peer sends messages to the routers to be forwarded. As yet another example, a peer may not need to obtain or wish to provide status information to other peers, hence the peer does not to implement the peer information protocol. The same can be said about all of the other protocols. In one embodiment, a peer may implement only a portion (client-side or server-side only, for example) of a protocol.

Peers may use the peer-to-peer platform protocols to advertise their resources and to discover network resources (services, pipes, etc.) available from other peers. Peers may form and join peer groups to create special relationships. The peer-to-peer platform protocols may allow peers to communicate without needing to understand or manage the potentially complex and dynamic network topologies that are becoming common. Peers may cooperate to route messages allowing for full peer connectivity. The peer-to-peer platform protocols allow peers to dynamically route messages across multiple network hops to any destination in the network (potentially traversing firewalls). Each message may include either a complete or a partial ordered list of gateway peers through which the message might be routed. If route information is incorrect, an intermediate peer may assist in dynamically finding a new route. A peer-to-peer platform protocol message that is routed through multiple hops may not be assumed to be reliably delivered, even if only reliable transports such as TCP/IP are used through all hops. A congested peer may drop messages at any time rather than routing them.

The peer-to-peer platform protocols may be implemented on a variety of networks including, but not limited to, the Internet, corporate intranets, dynamic proximity networks, home networking environments, LANs and WANs. The peer-to-peer platform protocols may allow the peer-to-peer platform to be easily implemented on unidirectional links and asymmetric transports. In particular, many forms of wireless networking do not provide equal capability for devices to send and receive. The peer-to-peer platform permits any unidirectional link to be used when necessary, improving overall performance and network connectivity in the system. Thus, the peer-to-peer platform protocols may be easy to implement on any transport. Implementations on reliable and bidirectional transports such as TCP/IP or HTTP may provide efficient bidirectional communications. Even on bidirectional transports, communication ability between any pair of peers may at times not work equally well in both directions. That is, communications between two peers will in many cases be able to operate bidirectionally, but at times the connection between two peers may be only unidirectional, allowing one peer to successfully send messages to the other while no communication is possible in the reverse direction. The peer-to-peer platform unidirectional and asymmetric transport also plays well in multi-hop network environments where the message latency may be difficult to predict. Furthermore, peers in a P2P network tend to have nondeterministic behaviors and thus may appear or leave the network very frequently.

In one embodiment, the peer-to-peer platform protocols do not require a broadcast or multicast capability of the underlying network transport. Messages intended for receipt by multiple peers (propagation) may be implemented using point-to-point communications. The peer-to-peer platform protocols may not require periodic messages of any kind at any level to be sent within the network, and thus may not require periodic polling, link status sensing, or neighbor detection messages, and may not rely on these functions from any underlying network transport in the network. This entirely on-demand behavior of the protocols and lack of periodic activity may allow the number of overhead messages generated by the peer-to-peer platform to scale all the way down to near or at zero, when all peers are stationary with respect to each other and all routes needed for current communication have already been discovered.

In one embodiment, the peer-to-peer platform protocols are defined as idempotent protocol exchanges. The same messages may be sent/received more than once during the course of a protocol exchange. In one embodiment, no protocol states are required to be maintained at both ends. Due to the unpredictability of P2P networks, assumptions may not be made about the time required for a message to reach a destination peer, and thus the peer-to-peer platform protocols may not impose any timing requirements for message receipt.

The peer-to-peer platform protocols may take advantage of additional optimizations, such as the easy ability to reverse a source route to obtain a route back to the origin of the original route.

Figure 15:
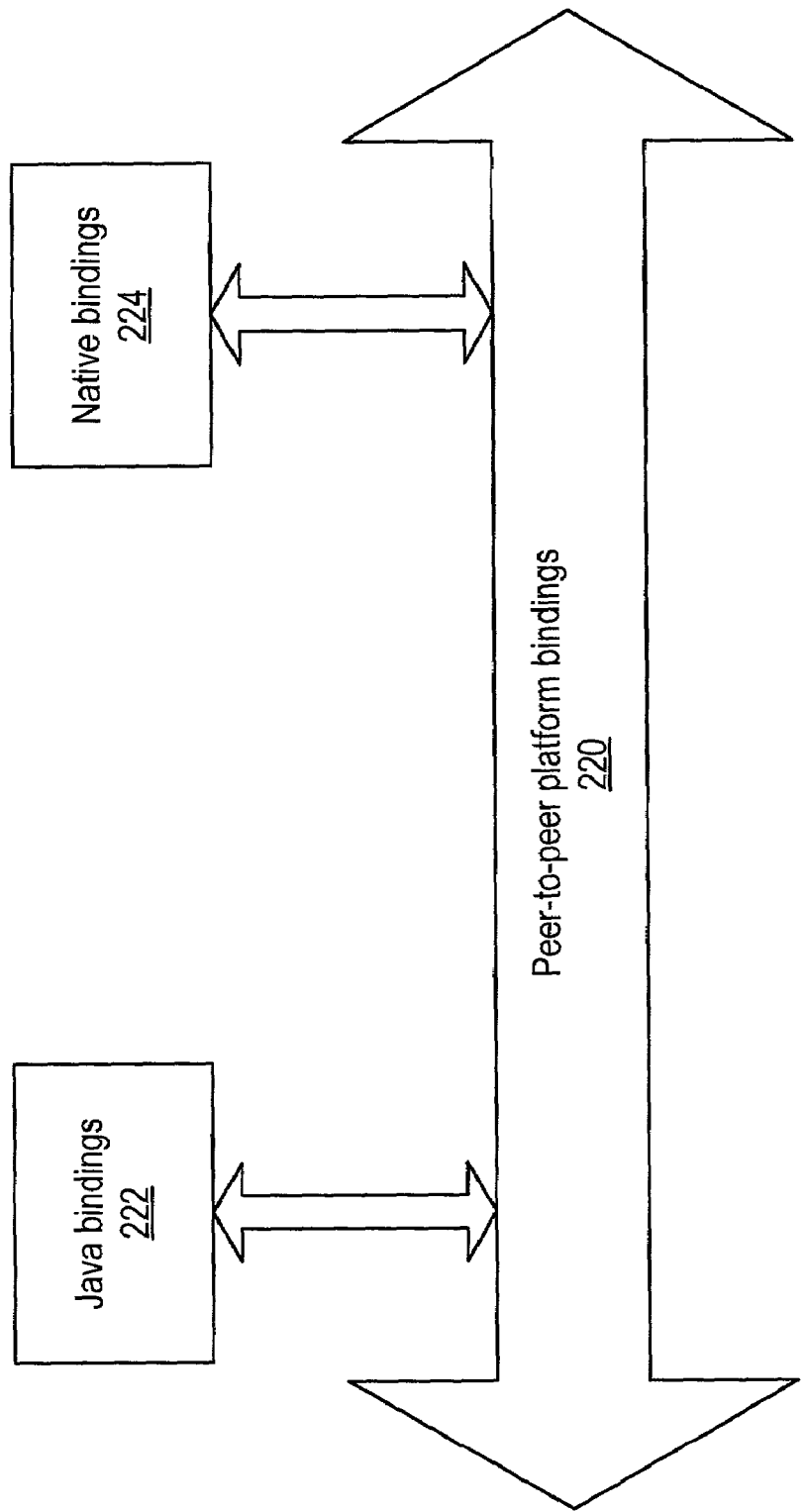
FIG. 15 illustrates protocols and bindings in a peer-to-peer platform according to one embodiment.

FIG. 15 illustrates protocols and bindings in a peer-to-peer platform according to one embodiment. When the peer-to-peer platform protocols are implemented using a particular programming language and over a particular transport protocol, the implementation is an instance of a peer-to-peer platform binding 220, where the peer-to-peer platform protocols are bound to the language and the transport layer. In one embodiment, protocol and peer software implementation issues may be defined in documents specific to the binding. A binding document describes how the protocols are bound to an underlying network transport (such as TCP/IP or UDP/IP) or to a software platform 222 such as Java or a native software platform 224 such as UNIX.

Peer Discovery Protocol

In one embodiment, the peer-to-peer platform may include a peer discovery protocol that may allow a peer to find advertisements on other peers. The peer discovery protocol may be used to discover any published peer resources including other peers, peer groups, pipes, services and any other resource that has an advertisement in the peer-to-peer network. This protocol may be used to find members of any kind of peer group, presumably to request membership. In one embodiment, the peer discovery protocol is the default discovery protocol for all peer groups, including the world peer group. The discovery protocol may be used as a default discovery protocol that allows all peer-to-peer platform peers to understand each other at a very basic level.

The peer discovery protocol may provide, at the lowest level, the minimum building blocks for propagating discovery requests between peers. Thus, the peer discovery protocol may provide the essential discovery infrastructure for building high-level discovery services. In many situations, discovery information is better known by a high-level service, because the service may have a better knowledge of the topology (firewall traversal), and the connectivity between peers. The peer discovery protocol may provide a basic mechanism to discover advertisements while providing hooks so high-level services and applications can participate in the discovery process. Services may be able to give hints to improve discovery (i.e. decide which advertisements are the most valuable to cache).

In one embodiment, the peer discovery protocol may be based on web crawling and the use of rendezvous peers. Rendezvous peers are peers that offer to cache advertisements to help others peers discover resources, and propagate requests they cannot answer to other known rendezvous peers. Rendezvous peers and their use in the discovery process are discussed later in this document.

In one embodiment, custom discovery services may choose to leverage the peer discovery protocol. If a peer group does not have its own discovery service, the peer discovery protocol may be used to probe peers for advertisements. Rendezvous peers may keep a list of known peers and peer groups. This list may or may not be exhaustive or timely. A custom discovery service (if it knew that the region's rendezvous did keep a timely exhaustive list), for example, may discover all peers in the region by sending a single message to the rendezvous peer.

In one embodiment, peer discovery may be done with, or alternatively without, specifying a name for the peer to be located and/or the group to which peers belong. When no name is specified, all discovered advertisements of the requested type may be returned. If a probing peer provides the name of the peer to be located, a simple translation may be requested that returns that peer's advertisement. Once a peer is discovered, ping, status, and capability messages may be sent to its "main" endpoint(s) using a peer information protocol. Peers may export more than one endpoint. Each peer may designate at least one primary endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). In one embodiment, peers claiming to belong to this group may respond, while other peers do not respond. The peer discovery protocol may be used to discover any type of core advertisement including, but not limited to: peer advertisements, peer group advertisements, pipe advertisements and service advertisements.

Peer groups may need customizable and adaptable discovery policies. In one embodiment, the peer-to-peer platform may be policy-agnostic, and may only provide the basics for discovery. The basics may include one or more core discovery protocols including, but not limited to, a propagate protocol (broadcast within a scope range (subnet or peer group members)), a rendezvous protocol (unicast to a trusted discovery peer) and an invite protocol (reverse discovering).

A discovery policy may be implemented in a discovery service based on the core discovery protocol. In one embodiment, a discovery service in the core peer-to-peer platform may be used to discover abstractions and/or entities in the peer-to-peer network including, but not limited to, peers, peer groups, peer group policies (group defined services) and pipe endpoints.

In some embodiments of a peer-to-peer platform, the discovery service may rely on trusted peers (discovery proxies). The discovery service may leverage local neighbors (local propagate). The discovery service may use rendezvous peers (indexes). The discovery service may leave traces in discovery proxies (cache). The discovery service may use net crawling as a last resort (propagate between trusted discovery proxies). In one embodiment, a discovery service may not discover some entities in the peer-to-peer network including, but not limited to, content (large scale; in one embodiment, a content management service may be used for content discovery), metadata (maintain relationship between data), users, and applications.

Embodiments of a peer-to-peer platform discovery service may leverage surrounding peers and peer groups, provide meetings points for far away peers and groups, use an asynchronous protocol and provide reverse discovery. The discovery service may be used to find new neighbor peers and provide the ability for a peer to learn about other peer's abilities. Embodiments of a discovery service in the peer-to-peer platform may provide extensibility, spontaneous configuration, adaptive connectivity, a dynamic (i.e. no fixed) network topology, and the ability to reach the "edge of the Internet" (firewall, and NAT).

Embodiments of a discovery method in the peer-to-peer platform may not require centralized naming (e.g. no DNS). A discovery service may provide predefined meeting points that may be used in platform bootstrapping. The discovery service may support a dynamic environment (peers may come and go). The discovery service may support an unreliable environment (peers may fail). The discovery service may help to adapt to a changing environment through viral behavior. The discovery service may be used to improve performance as a system ages (increase locality). The discovery service may be used in support of security (change of physical location). The discovery service may be used that provides administrationless discovery (zero-admin).

Embodiments of the peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Peer groups need customizable and adaptable discovery policies. One approach to implementing a discovery policy is to start simple and build more complex policies. Embodiments of the peer-to-peer platform discovery service may support discovery methods including, but not limited to: Propagate Discovery (unicast to predefined rendezvous; leverage transport dependent multicast (e.g. IP)) and; Unicast Discovery (unicast to known rendezvous for forward propagation; may be used for reverse Discovery).

The peer-to-peer platform may not mandate exactly how discovery is done. Discovery may be completely decentralized, completely centralized, or a hybrid of the two. Embodiments of the peer-to-peer platform may support discovery mechanisms including, but not limited to:

LAN-based discovery. This is done via a local broadcast over the subset.

Discovery through invitation. If a peer receives an invitation (either in-band or out-of-band), the peer information contained in the invitation may be used to discover a (perhaps remote) peer.

Cascaded discovery. If a peer discovers a second peer, the first peer may, with the permission of the second peer, view the horizon of the second peer to discover new peers, groups, and services.

Discovery via rendezvous peers. A rendezvous peer is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

In one embodiment, a peer-to-peer platform web of trust may be used. In a web of trust, a peer group creator may select initial discovery proxies, and may delegate to new peer members. Any peer, when trusted, can become a discovery proxy. Discovery proxies may propagate requests between each other for net-crawling discovery. New peers may be untrusted or low-trust peers, and may be typically difficult to find and have limited discovery range (this may help protect against misbehaviors and denial of service attacks). Trusted members are easier to discover. Peers may increase their discovery range as they become more trusted (discovery credential). Some peers may not need to discover beyond their initial net peer group range.

In one embodiment, a peer may go through a proximity network, which also may be referred to as a subnet or region, to try to find (discover) surrounding peers. The Internet includes the concept of subnets that are physically defined by physical routers that define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers that are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and also a format for a response message. A propagate may ask who's there (what peers are in the subnet). One or more peers may decide to respond. Other peers on the subnet may choose not to respond if they don't want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message that is configured to discover peer groups. Peers in the proximity network (region) that are aware of a peer group or peer groups may respond to the peer group discovery message, and may return information on the peer group(s) (e.g. peer group advertisements) of which they are aware. The new peer may use this information to determine a peer group or peer groups that it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. Peer and peer group discover are more or less at the same level in the P2P platform. In one embodiment, peer discovery may use a message that indicates the discovery is looking for peers, and peer group discovery may use a similar message that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so long, to discover peers and/or peer groups that are "distant" on the network from the requesting peer.

Rendezvous peers may offer to cache advertisements to help others peers discover resources, and may propagate (forward) requests they cannot answer to other known rendezvous peers. A rendezvous peer may implement at least one of these two functions. The services provided by a rendezvous peer may be different than message routing. Message routing is performed at a lower level involving multi-hops connections to send a message between any peers in the network. In one embodiment, the forwarding of a request between two rendezvous peers may involve routing to propagate a request between two rendezvous, but this is transparent to the rendezvous service and done underneath.

In one embodiment, rendezvous peers may forward requests between each other. A rendezvous may be typically connected to a few other rendezvous peers. There may be as many rendezvous peers as peers in a peer group. Not every peer may be a rendezvous (e.g. if a peer has no caching capabilities or is isolated behind a firewall). In one embodiment, only rendezvous peers may forward a discovery request to another rendezvous peer. This restriction may serve to limit and control the exponential growth of request propagations within the network. Rendezvous peers may thus provide a simple throttle mechanism to control the propagation of requests. In one embodiment, sophisticated rendezvous peers may be deployed to filter and distribute requests for the best usage of network resources.

In one embodiment, a peer may be pre-configured with a pre-defined set of rendezvous peers. These bootstrapping rendezvous may help the peer discover enough network resources (peers, rendezvous, services) as it needs to support itself. In one embodiment, the pre-configured rendezvous are optional. A peer may be able to bootstrap by finding rendezvous or enough network resources in its proximity environment. If a peer does not know the information, it may ask the surrounding peers (hop of 1) if they know the answer. One or more peers may already have the answer. If no surrounding peers know the answer, the peer may ask its rendezvous peers to find advertisements. Peers are recognized as rendezvous peers in their peer advertisements. When a peer discovers a new peer, it can determine if this peer is a rendezvous. A peer may not be required to use all the rendezvous peers that it has discovered.

Rendezvous peers may forward requests among themselves. The discovery process continues until one rendezvous peer has the answer or the request dies. In one embodiment, there may be a Time To Live (TTL) associated with the request, so it is not infinitely propagated. As an example, suppose a peer A is attempting to discover a resource R on the network. Peer A issues a discovery request specifying the type (peer, peer group, pipe, service) of advertisements it is looking for. To initiate the Discovery, peer A sends a discovery request message as a single propagate packet to all its available endpoints. The packet may contain the requested peer advertisement, so the receiving peer can respond to the requester. Each discovery request identifies the initiator, and a unique request identification specified by the initiator of the request. When another peer receives the discovery request (assume peer B in this example), if it has the requested R advertisement, it will return to peer A the advertisement for R in a discovery response message. If Peer A does not get response from its surrounding peers (hop of 1), Peer A may send the request to its known rendezvous peers. If the rendezvous peers do not have the advertisement, they can propagate the request to all other rendezvous peers they know. When a rendezvous receives a respond to a request, the rendezvous MAY cache the R advertisement for future usage, before sending it to the requestor.

In one embodiment, the peer rendezvous capabilities may be embedded in the core discovery protocol of the peer-to-peer platform. Rendezvous peers may be protocol-based, and may broker more information than name servers that typically only broker names of entities. In one embodiment, a rendezvous peer may maintain indexes for entities in the peer-to-peer platform including peers, peer groups, and advertisements. These indexes are dynamic which are created as the peer group community grows and more peers join. As a group joins, some peers may decide to become rendezvous peers to help peers connect with other peers in the group.

The rendezvous peer is at the peer level. A rendezvous peer is not a "service." A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer that specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource, for example a service advertisement may include information for connecting to and using the service. Advertisements may be published to allow other entities to discover them. The rendezvous peer may provide the ability for services and applications to store and cache temporary, e.g. via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications. In one embodiment, the rendezvous protocol may use an index cache (e.g. on a peer serving as a rendezvous proxy). In one embodiment, the rendezvous protocol may be used across subnets (configurable at the peer group level). In one embodiment, the rendezvous protocol may be used across/through firewalls (e.g. gateways).

In one embodiment, the peer-to-peer platform may include a propagate policy for use in discovery. In one embodiment, propagation may be controlled using TTL (time to live). In another embodiment, propagation may be controlled using message counts. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls).

In one embodiment, the peer-to-peer platform may include an invite policy. In one embodiment, the invite policy may support the adding of new peers and peer groups (e.g. publish advertisements).

In one embodiment, the peer-to-peer platform may allow the persistent local peer caching of discovery information. In this embodiment, a peer may be allowed to cache advertisements discovered via the peer discovery protocol for later usage. Caching may not be required by the peer-to-peer platform, but caching may be a useful optimization. The caching of advertisements by a peer may help avoid performing a new discovery each time the peer is accessing a network resource. In a highly transient environment, performing the discovery may be necessary. In a static environment, caching may be more efficient.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing.

In one embodiment, a peer may not initiate a new discovery request until the minimum allowable interval between discoveries is reached. This limitation on the maximum rate of discoveries may be similar to the mechanism required by Internet nodes to limit the rate at which ARP requests are sent for any single target IP address. The maximum rate may be defined by each specific implementation transport bindings and exported to the application.

A message or messages may be used to get all known, reachable advertisements within a region on the network. This list may not be exhaustive, and may be empty. Named peers may also be located using the peer discovery protocol. A message may include a peer group credential of the probing (requesting) peer that may identify the probing peer to the message recipient. The destination address may be any peer within a region (a propagate message) or alternatively a rendezvous peer (a unicast message). A response message may return one or more advertisements (e.g. peer advertisements and/or peer group advertisements) that may include "main" endpoint addresses that may be converted to a string in the standard peer endpoint format (e.g. URI or URL) and may include a network transport name. It may not be guaranteed that a response to a query request will be made. The peer discovery protocol may not require a reliable transport. Multiple discovery query requests may be sent. None, one or multiple responses may be received.

In one embodiment, a discovery query message may be used to send a discovery request to find advertisements (e.g. for peers or peer groups). The discovery query may be sent as a query string (attribute, value) form. A null query string may be sent to match any results. A threshold value may be included to indicate the maximum number of matches requested by a peer. In one embodiment, a discovery response message may be used to send a discovery response message to answer a discovery query message.

Reverse Discovery

Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery". In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Peer Resolver Protocol

In one embodiment, the peer-to-peer platform may include a peer resolver protocol that may allow a peer to send simple, generic search queries to one or more peer services. In one embodiment, only those peers that have access to data repositories and that offer advanced search capabilities typically implement this protocol. Each service may register a handler in the peer group resolver service to process resolver query requests. Resolver queries may be demultiplexed to each service. Each service may respond to a peer via a resolver response message. It is important to point the differences between the peer discovery protocol and the peer resolver protocol. The peer discovery protocol is used to search for advertisements to bootstrap a peer, and discover new network resources. The peer resolver protocol is a generic service that services query protocols. The peer resolver protocol may be used by a service on a peer to interact with a service on another peer.

The peer resolver protocol may enable each peer to send and receive generic queries to find or search for peer, peer group, pipe or service specific information such as the state of a service or the state of a pipe endpoint. Each resolver query may have a unique service handler name to specify the receiving service, and a query string to be resolved by the service. The peer resolver protocol may provide a generic mechanism for peers to send queries and receive responses. The peer resolver protocol may remove the burden for registered message handlers by each service and set message tags to ensure uniqueness of tags. The peer resolver protocol may ensure that messages are sent to correct addresses and peer groups. The peer resolver protocol may perform authentication and verification of credentials and the dropping of rogue messages. In one embodiment, there is no guarantee that a response to a resolver query request will be made. In one embodiment, a peer may not be required to respond to a resolver query request. In one embodiment, a reliable transport is not required by the peer resolver protocol. In one embodiment, multiple resolver query messages may be sent. None, one or multiple responses may be received.

In one embodiment, propagating a query to the next set of peers may be delegated to the peer rendezvous protocol. The rendezvous service may be responsible for determining the set of peers that may receive a message being propagated, but may not re-propagate an incoming propagated message. The decision of propagating a message one step further may be left to the service handling the message. The peer rendezvous protocol's policy may be that if the query handler does not instruct the peer rendezvous protocol to discard the query, and if the local peer is a rendezvous, then the query is re-propagated (within the limits of loop and time-to-live rules that may be enforced by the rendezvous service). In addition, if instructed by the query handler, an identical query may be issued with the local peer as the originator.

In one embodiment, a resolver query message may be used to send (unicast) a resolver query request to a service on another member of a peer group. In one embodiment, the resolver query may be sent as a query string to a specific service handler. Each query may include a unique identifier.

The query string may be any string that may be interpreted by the targeted service handler. A resolver response message may be sent (unicast) to the requesting peer by the service handler. A resolver response message may be returned in response to a resolver query message.

Peer Information Protocol

Once a peer is located, its capabilities and status may be of interest. In one embodiment, the peer-to-peer platform may include a peer information protocol that may allow a peer to learn about other peers' capabilities and status. For example, a peer can send a ping message to see if another peer is alive. A peer may also query another peer's properties where each property has a name and a value string. A peer may not be required to respond to a peer information protocol request.

In one embodiment, messages may be used to get a list of named control "properties" exported by a peer. A property is a "knob" used to get information or configuration parameters from the peer. All properties may be named (e.g. using a string), and may be "read-only." In one embodiment, higher-level services may offer "read-write" capability to the same information, given proper security credentials. Each property may have a name and a value string. Read-write widgets may allow the string value to be changed, while read-only widgets may not. In one embodiment, the peer information protocol may only provide read access. The destination address is a peer's main endpoint that may have been returned in a discovery response message.

A reliable transport may not be required by the peer information protocol. In one embodiment, multiple peer information messages may be sent. None, one or multiple responses may be received. In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. In one embodiment, a peer information response message may be returned in response to a ping message.

Peer Membership Protocol

In one embodiment, the peer-to-peer platform may include a peer membership protocol that may allow a peer to join or leave peer groups, and to manage membership configurations, rights and responsibilities. This protocol may allow a peer to obtain group membership requirements (such as an understanding of the necessary credential for a successful application to join the group), to apply for membership and receive a membership credential along with a full group advertisement, to update an existing membership or application credential, and to cancel a membership or an application credential. In one embodiment, authenticators and/or security credentials may be used to provide the desired level of protection.

In one embodiment, the process of joining a peer group may include obtaining a credential that is used to become a group member. In one embodiment, the process of joining a peer group may include obtaining a "form" listing the set of requirements asked of all group members. In one embodiment, this form may be a structured document (e.g. a peer group advertisement) that lists the peer group membership service.

In one embodiment, the peer membership protocol may define messages including, but not limited to, an apply message, a join message, an acknowledgement (ACK) message, a renew message, and a cancel message. A peer membership protocol apply message may be sent by a potential new group member to the group membership application authenticator. The authenticator's endpoint may be listed in the peer group advertisement of every member. In one embodiment, a successful response from the group's authenticator may include an application credential and a group advertisement that may list, at a minimum, the group's membership service. In one embodiment, the apply message may include, but is not limited to, the current credential of the candidate group member and the peer endpoint for the peer group membership authenticator to respond to with an acknowledgement (ACK) message.

A peer membership protocol join message may be sent by a peer to the peer group membership authenticator to join a group. The peer may pass an application credential (from an apply response ACK message) for authentication purposes. A successful response from the group's authenticator may include a full membership credential and a is full group advertisement that lists, at a minimum, the group's membership configurations requested of full members in good standing. The message may include a credential (application credential of the applying peer: see ACK message). This credential may be used as the application form when joining. The message may also include the peer endpoint for the authenticator to respond to with an ACK message.

A peer membership protocol ACK message is an acknowledge message that may be used for both join and apply operations. A peer membership protocol ACK message may be sent back by the membership authenticator to indicate whether or nor the peer was granted application rights to the peer group if the peer is applying, or full membership to the peer group if peer is attempting to join. In one embodiment, an ACK message may also be sent in response to peer membership protocol renew messages and cancel messages. The message may include a credential (an application or membership credential allocated to the peer by the peer group authenticator). The message may also include a more complete peer group advertisement that may provide access to further configurations. In one embodiment, not all configuration protocols are visible until the peer has been granted membership or application rights. Some configurations may need to be protected. In addition, depending on the peer credential, the peer may not have access to all the configurations.

A peer membership protocol renew message may be sent by a peer to renew its credential (membership or application) access to the peer group. An ACK (acknowledgement) message may be returned with a new credential and lease if the new is accepted. The renew message may include, but is not limited to, a credential (a membership or application credential of the peer) and the peer endpoint to which an ACK response message may be sent. A peer membership protocol cancel message may be sent by a peer to cancel the peer's membership or application rights in a peer group. The message may include, but is not limited to, a credential (a membership or application credential of the peer) and the peer endpoint to send an ACK message. In one embodiment, an ACK to a cancel may include a response status indicating the cancel was accepted.

Pipe Binding Protocol

In one embodiment, the peer-to-peer platform may include a pipe binding protocol that may allow a peer to find the physical location of a pipe endpoint and to bind a pipe advertisement to the pipe endpoint, thus indicating where messages actually go over the pipe. A pipe is conceptually a virtual channel between two pipe endpoints (input and output pipes) and may serve as a virtual link between two or more peer software components (e.g. services or applications).

A pipe may be viewed as an abstract, named message queue that supports a number of abstract operations such as create, open, close, delete, send, and receive. The pipe virtual link (pathway) may be layered upon any number of physical network transport links such as TCP/IP. Each end of the pipe may work to maintain the virtual link and to reestablish it, if necessary, by binding endpoints or finding the pipe's currently bound endpoints.

Actual pipe implementations may differ, but peer-to-peer platform-compliant implementations may use the pipe binding protocol to bind pipes to pipe endpoints. In one embodiment, during the abstract create operation, a local peer binds a pipe endpoint to a pipe transport. In another embodiment, bind may occur during the open operation. Unbind occurs during the close operation. In one embodiment, each peer that "opens" a group pipe may make an endpoint available (binds) to the pipe's transport. In one embodiment, messages may be sent only to one or more endpoints bound to the pipe. Peer members that have not opened the pipe may not receive or send any messages on that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

In one embodiment, the pipe binding protocol may define messages including, but not limited to, a query message and a response message. In one embodiment, a pipe binding protocol query message may be sent by a peer pipe endpoint to find a pipe endpoint bound to the same pipe advertisement.

In one embodiment, the requestor may ask that the information not be obtained from a cache. This is to obtain the most up-to-date information from a peer to address stale connection. The Peer field specifies a peer identifier. This peer is the one that should respond to the query. In one embodiment, there is no guarantee that a response to a pipe binding request will be made. A peer may not be required to respond to a binding request. A reliable transport may not be required. In one embodiment, multiple binding query messages may be sent. None, one or multiple responses may be received. In one embodiment, a pipe binding protocol response message may be sent to the requesting peer by each peer bound to the pipe in response to a query message.

Endpoint Routing Protocol

In one embodiment, the peer-to-peer platform may include an endpoint routing protocol. The endpoint routing protocol may be used by peers to send messages to router peers requesting available routes for sending message(s) to destination peers.

A peer-to-peer platform network is typically an ad hoc, multi-hops, and adaptive network by nature. Connections in the network may be transient, and message routing may be nondeterministic. Routes may be unidirectional and change rapidly. Peers may appear and leave frequently. Two communicating peers may not be directly connected to each other. Two communicating peers may need to use router peers to route messages depending on the network topology. For example, the two peers may be on different network transports, or the peers may be separated by a firewall or a NAT (Network Address Translation) router. A peer behind a firewall may send a message directly to a peer outside a firewall. However, a peer outside the firewall cannot establish a connection directly with a peer behind the firewall.

The endpoint routing protocol may define a set of request/query messages that is processed by a routing service to help a peer route messages to its destination. When a peer is asked to send a message to a given peer endpoint address, it may look in its local cache to determine if it has a cached route to this peer. If the peer does not find a route, it may send a route resolver query message to available peer routers requesting route information. A peer may have access to as many peer routers as it can find, or optionally a peer may be pre-configured to access certain routers.

Peer routers provide the low-level infrastructures to route a message between two peers in the network. Any number of peers in a peer group may elect themselves to become peer routers for other peers. Peers routers offer the ability to cache route information, as well as bridging different physical (different transport) or logical (firewall and NAT) networks. A peer may dynamically find a router peer via a qualified discovery search. A peer may find out if a peer it has discovered is a peer router via the peer advertisement properties tag.

When a peer router receives a route query, if it knows the destination (a route to the destination), it may answer the query by returning the route information as an enumeration of hops. The message may be sent to the first router and that router may use the route information to route the message to the destination peer. The route may be ordered from the next hop to the final destination peer. At any point the routing information may be obsoleted, requiring the current router to find a new route.

The peer endpoint may add extra routing information to the messages sent by a peer. When a message goes through a peer, the endpoint of that peer may leave its trace on the message. The trace may be used for loop detection and to discard recurrent messages. The trace may also be used to record new route information by peer routers.

In one embodiment, the endpoint routing protocol may provide the last resort routing for a peer. More intelligent routing may be implemented by more sophisticated routing services in place of the core routing service. High-level routing services may manage and optimize routes more efficiently than the core service. In one embodiment, the hooks necessary for user defined routing services to manipulate and update the route table information (route advertisements) used by the peer router may be provided by the endpoint routing protocol. Thus, complex route analysis and discovery may be performed above the core by high-level routing services, and those routing services may provide intelligent hints to the peer router to route messages.

Router peers may cache route information. Router peers may respond to queries with available route information. Route information may include a list of gateways along the route. In one embodiment, any peer may become a router peer by implementing the endpoint routing protocol.

The time-to-live parameter specifies how long this route is valid. The creator of the route can decide how long this route will be valid. The gateways may be defined as an ordered sequence of peer identifiers that define the route from the source peer to the destination peer. The sequence may not be complete, but at least a first gateway may be sufficient to initially route the messages. The remaining gateway sequence may be optional.

The endpoint routing protocol may provide messages including, but not limited to, a route request message and a route answer message from the router peer. In one embodiment, a peer may send a route request message to a router peer to request route information. Route information may be cached or not cached. In some cases, the route query request message may indicate to bypass the cache content and thus to search dynamically for a route. In one embodiment, it is not guaranteed that a route response will be received after a query is sent. In one embodiment, a router peer may send a route answer message to a peer in response to a route information request.

Routing

A peer-to-peer platform may provide a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

In one embodiment, in order to bootstrap the system, and also in order to have a fallback mechanism if an application cannot or does not support one or more of the tasks, the core peer-to-peer protocols may be used in providing a discovery and router mechanism for discovering peers and other core abstractions such as advertisements, pipes, and peer groups. The discovery and routing mechanism of the peer-to-peer platform may use as few protocols as possible, is simple, and makes use of underlying optimizations when available. Hooks into the core discovery and router mechanism may be provided so that applications and services may participate in the discovery and router mechanisms, for example, by passing information to the core discovery and router mechanism. In one embodiment, an application or service may be allowed to override the core discovery and router mechanism with its own custom mechanism.

Figure 16:
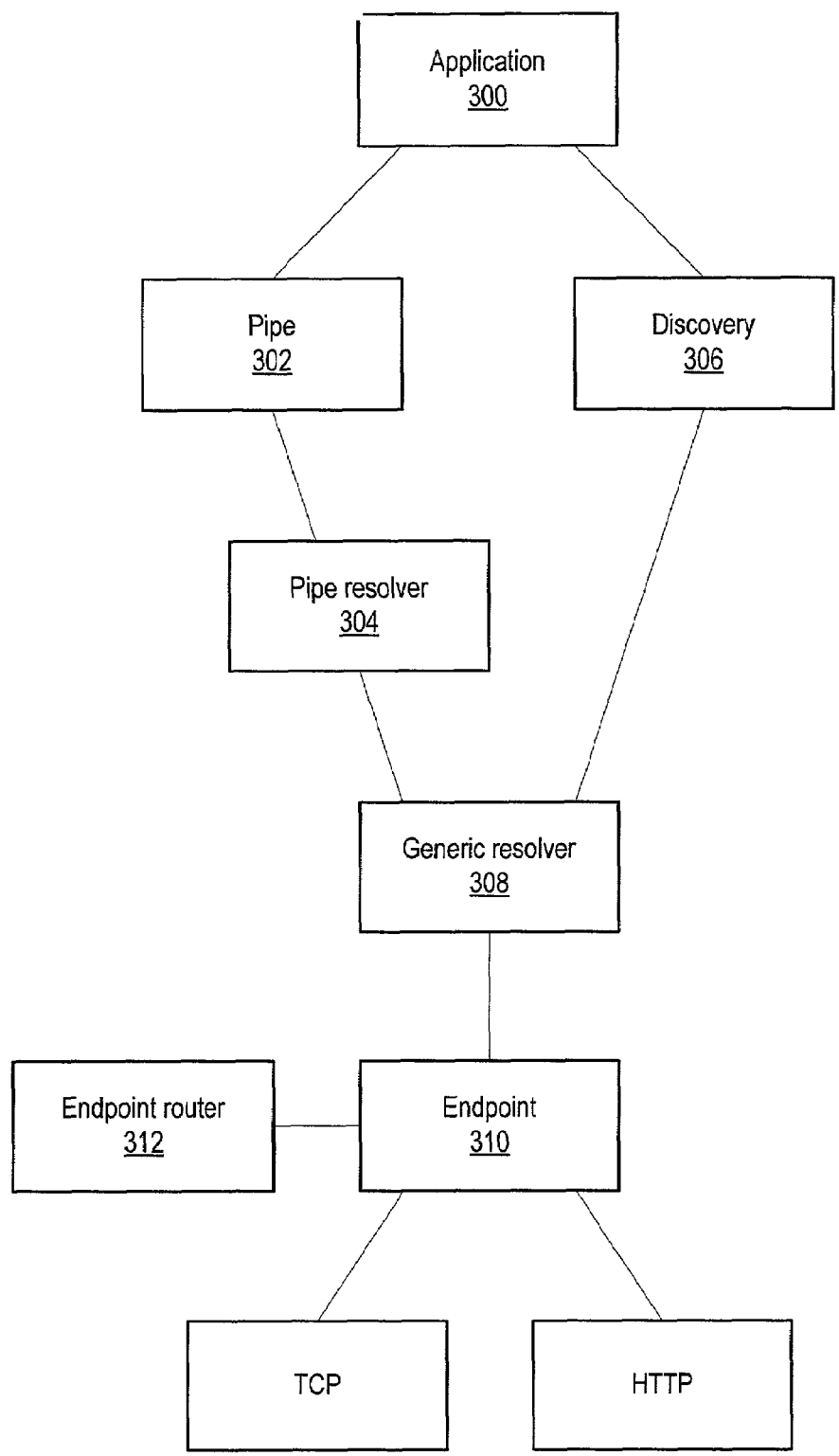
FIG. 16 illustrates several core components and how they interact for discovery and routing according to one embodiment.

FIG. 16 illustrates several core components and how they interact for discovery and routing according to one embodiment. Application 300 may use discovery 308 to find peers, peer groups, advertisements, and other entities on the peer-to-peer network, and may also publish pipe, peer, peer group, service, and other advertisements for access by other peers, applications and services on the peer-to-peer network. In one embodiment, the endpoint 310 may be responsible for exchanging messages between peers that are directly "connected" to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For instance, the endpoint router 312 may be configured to route search (propagate) requests or to not route the requests.

In one embodiment, the generic resolver 308 is a protocol that implements a sort of RPC (query/response) protocol on top of the endpoint 310. Discovery 306 and pipe resolver 304 may use the generic resolver. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provides uniqueness that may not be provided by an endpoint 310 since a pipe identifier is unique in time and space, and an endpoint 310, being a network address, may not be.

Security

The security requirements of a P2P system are very similar to any other computer system. The three dominant requirements are confidentiality, integrity, and availability. These translate into specific functionality requirements that include authentication, access control, audit, encryption, secure communication, and non-repudiation. Such requirements are usually satisfied with a suitable security model or architecture, which is commonly expressed in terms of subjects, objects, and actions that subjects can perform on objects. For example, UNIX has a simple security model. Users are subjects. Files are objects. Whether a subject can read, write, or execute an object depends on whether the subject has permission as expressed by the permissions mode specified for the object. However, at lower levels within the system, the security model is expressed with integers, in terms of UID, GID, and the permission mode. Here, the low-level system mechanisms do not (need to) understand the concept of a user and do not (need to) be involved in how a user is authenticated and what UID and GID they are assigned.

In one embodiment, the peer-to-peer platform protocols may be compatible with widely accepted transport layer security mechanisms for message-based architectures such as Secure Sockets Layer (SSL) and Internet Protocol Security (IPSec). However, secure transport protocols such as SSL and IPSec only provide the integrity and confidentiality of message transfer between two communicating peers. In order to provide secure transfer in multi-hops network, a trust association may be established among all the intermediary peers. Security is compromised if anyone of the communication links is not secured.

The peer-to-peer platform security model may be implemented to provide a P2P web of trust. The web of trust may be used to exchange public keys among its members. Each peer group policy may permit some members to be trusted to the extent that they have the authority to sign public keys for other members as well as to do things like authenticate, add new members, and remove or revoke membership.

Embodiments may implement security classes for the RSA public key exchange, the RC4 byte stream cipher, and the SHA-1 hash algorithm, among others. These classes may enable privacy by the means of a P2P TLS implementation; integrity with signed hashes; non-repudiation using the web of trust; and MACs for data authenticity. Combinations of these classes may form security suites, and the peer-to-peer platform provides the mechanism to add new customized suites as required.

In some embodiments, for peer group authentication a separate Pluggable Authentication Module (PAM) may be provided. Embodiments may provide anonymous or guest login, and login with user name and password. A login session may be in clear or cipher-text as per the peer group security policy.

The security module may be available to the core level, and thus services, applications and advanced services and applications may plug in their own security components and protocols. For example, the web of trust may be defined by a policy that requires authorized peer group members to be well-known certificate authorities, and that peers exchange X509v3 CA signed certificates.

Given that the peer-to-peer platform is defined around the concepts of peers and peer groups, one embodiment may include a security architecture in which peer IDs and group IDs are treated as low-level subjects Oust like UID and GID), codats are treated as objects Oust like files), and actions are those operations on peers, peer groups, and codats.

The term "codat" as used herein refers to any computer content—code, data, applications, or other collection of computer representable resources. The peer-to-peer protocol may not distinguish among different types of resources that can be stored on a computer and shared among peers in a peer group. Examples of "codat" include text files, photographs, applets, executable files, serialized Java objects, SOAP messages, etc. Codats are the elementary unit of information that is exchanged among peers. In this embodiment, given that codats may have arbitrary forms and properties, it may not be clear what sets of actions should be defined for them. In one embodiment, the codats may carry or include definitions of how they should be accessed. Such codats are analogous to objects, which define for themselves access methods others can invoke.

One or more of several other characteristics of the peer-to-peer platform may further affect the security requirements of the peer-to-peer platform. In one embodiment, the peer-to-peer platform may be focused on mechanisms and not policy. For example, UUIDs are used throughout, but they by themselves have no external meaning. Without additional naming and binding services, UUIDs are just numbers that do not correspond to anything like a user or a principal. Therefore, the peer-to-peer platform may not define a high-level security model such as information flow, Bell-LaPadula, or Chinese Wall. In one embodiment, when UUIDs are bound to external names or entities to form security principals, authenticity of the binding may be ensured by placing in the data field security attributes, for example, digital signatures that testify to the trustworthiness of the binding. Once this binding is established, authentication of the principal, access control based on the principal as well as the prevailing security policy, and other functions such as resource usage accounting may be performed.

The peer-to-peer platform may be neutral to cryptographic schemes and security algorithms. As such, the peer-to-peer platform may not mandate any specific security solution. In such cases, a framework may be provided where different security solutions can be plugged in. In one embodiment, hooks and placeholders may be provided so that different security solutions may be implemented. For example, every message may have a designated credential field that may be used to place security-related information. In one embodiment, exactly how to interpret such information is not defined in the peer-to-peer platform, and may be left to services and applications.

In one embodiment, the peer-to-peer platform may sometimes satisfy security requirements at different levels of the system. To allow maximum flexibility and avoid redundancy, the peer-to-peer platform may not force a particular implementation on developers. Instead, enhanced platforms based on the peer-to-peer platform may provide the appropriate security solutions to their targeted deployment environment. To illustrate the last point, two security concerns (communications security and anonymity) are examined.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

Anonymity does not mean the absence of identity. Indeed, sometimes a certain degree of identification is unavoidable. For example, a cell phone number or a SIM card identification number cannot be kept anonymous, because it is needed by the phone company to authorize and set up calls. As another example, the IP number of a computer cannot be hidden from its nearest gateway or router if the computer wants to send and receive network traffic. In general, anonymity can be built on top of identity, but not vice versa. There may be multiple ways to ensure anonymity. In the examples above, it is difficult to link a prepaid SIM card sold over the retail counter for cash to the actual cell phone user. Likewise, a cooperative gateway or router may help hide the computer's true IP address from the outside world by using message relays or NAT (Network Address Translation).

In one embodiment, a peer-to-peer platform-based naming service may bind a peer to a human user. The user's anonymity may be ensured through the naming service, or the authentication service, or a proxy service, or any combination of these. The peer-to-peer platform may be independent of the solution chosen by a particular application.

At many places, the peer-to-peer platform may be independent of specific security approaches. In one embodiment, the peer-to-peer platform may provide a comprehensive set of security primitives to support the security solutions used by various peer-to-peer platform services and applications. Embodiments of the peer-to-peer platform may provide one or more security primitives including, but not limited to:

A simple crypto library supporting hash functions (e.g., MD5), symmetric encryption algorithms (e.g., RC4), and asymmetric crypto algorithms (e.g., Diffie-Hellman and RSA).

An authentication framework that is modeled after PAM (Pluggable Authentication Module, first defined for the UNIX platform and later adopted by the Java security architecture).

A simple password-based login scheme that, like other authentication modules, can be plugged into the PAM framework.

A simple access control mechanism based on peer groups, where a member of a group is automatically granted access to all data offered by another member for sharing, whereas non-members cannot access such data.

A transport security mechanism that is modeled after SSL/TLS, with the exception that it is impossible to perform a handshake, a crypto strength negotiation, or a two-way authentication on a single pipe, as a pipe is unidirectional.

The demonstration services called InstantP2P and CMS (content management service) also make use of additional security features provided by the underlying Java platform.

In one embodiment, peers, configurations, peer groups, and pipes form the backbone of the peer-to-peer platform. Security in some embodiments of the peer-to-peer platform may use credentials and authenticators (code e.g. computer-executable instructions) that may be used to receive messages that either request a new credential or request that an existing credential be validated). A credential is a token that when presented in a message body is used to identify a sender and can be used to verify that sender's right to send the message to the specified endpoint and other associated capabilities of the sender. The credential is an opaque token that must be presented each time a message is sent. The sending address placed in the message envelope may be crosschecked with the sender's identity in the credential. In one embodiment, each credential's implementation may be specified as a plug-in configuration, which allows multiple authentication configurations to co-exist on the same network.

In one embodiment, all messages include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RSA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
    a plurality of nodes;
    wherein the plurality of nodes are each configured to participate on a network with others of the plurality of nodes in areas of interest and to exchange codats relevant to the areas of interest with the other nodes, wherein a codat is computer-representable content or data;
    wherein one of the plurality of nodes is configured to:
        receive one or more codats relevant to a particular area of interest from one of the other nodes; and
        determine trust in the other node as a provider of codats relevant to the particular area of interest from the one or more codats received from the other node and relevant to the particular area of interest.

2. The system as recited in claim 1, wherein, to determine trust in the other node as a provider of codats, the node is further configured to:
    determine codat confidence in the one or more codats relevant to the particular area of interest received from the other node; and
    determine the trust in the other node from the determined codat confidence in the one or more codats.

3. The system as recited in claim 2, wherein, to determine codat confidence in the one or more codats relevant to the particular area of interest received from the other node, the node is further configured to determine the codat confidence of each of the codats from the relevance of each of the codats to the particular area of interest.

4. The system as recited in claim 2, wherein, to determine codat confidence in the one or more codats relevant to the particular area of interest received from the other node, the node is further configured to:
    determine popularity of each of the codats among the plurality of nodes;
    determine relevance of each of the codats to the particular area of interest; and
    determine the codat confidence of each of the codats from the popularity of the particular codat and the relevance of the particular codat.

5. The system as recited in claim 2, wherein, to determine codat confidence in the one or more codats relevant to the particular area of interest received from the other node, the node is further configured to:
    determine confidence in the other node as a provider of codats in the particular area of interest; and
    determine the codat confidence in the one or more codats from the determined confidence in the other node.

6. The system as recited in claim 5, wherein, to determine confidence in the other node as a provider of codats in the particular area of interest, the node is further configured to:
    receive one or more confidences in the other node from one or more other nodes; and
    determine confidence in the other node as a provider of codats in the particular area of interest from the one or more confidences in the other node received from the one or more other nodes.

7. The system as recited in claim 1, wherein, to determine trust in the other node as a provider of codats, the node is further configured to:
    determine codat confidence in the one or more codats relevant to the particular area of interest received from the other node;
    determine risk associated with the other node from one or more of integrity of codats provided by the other node, accessibility of the other node, and performance of the other node; and
    determine the trust in the other node from the determined codat confidence in the one or more codats and the determined risk associated with the other node.

8. The system as recited in claim 1, wherein the node is configured to store a confidence in the other node as a provider of codats in the particular area of interest, and wherein, to determine trust in the other node as a provider of codats, the node is further configured to:
    determine codat confidence in the one or more codats relevant to the particular area of interest received from the other node;
    modify the stored confidence in the other node in accordance with the determined codat confidence in the one or more codats; and
    determine the trust in the other node from the modified confidence in the other node.

9. The system as recited in claim 1, wherein the nodes are peer nodes configured to participate in a peer-to-peer environment on the network.

10. The system as recited in claim 1, wherein the plurality of nodes is configured to implement a peer-to-peer environment on the network according to a peer-to-peer platform comprising one or more peer-to-peer platform protocols for enabling the plurality of nodes to discover each other, communicate with each other, and share the codat in the peer-to-peer environment.

11. A node comprising:
    a processor;
    a memory comprising program instructions, wherein the program instructions are executable by the processor to:
        participate on a network with other nodes in an area of interest and to exchange codats relevant to the areas of interest with the other nodes, wherein a codat is computer-representable content or data;
        receive one or more codats relevant to the area of interest from one of the other nodes; and
        determine trust in the other node as a provider of codats relevant to the particular area of interest from the one or more codats received from the other node and relevant to the particular area of interest.

12. The node as recited in claim 11, wherein, to determine trust in the other node as a provider of codats, the node is further configured to:
    determine codat confidence in the one or more codats relevant to the particular area of interest received from the other node; and
    determine the trust in the other node from the determined codat confidence in the one or more codats.

13. The node as recited in claim 12, wherein, to determine codat confidence in the one or more codats relevant to the particular area of interest received from the other node, the node is further configured to determine the codat confidence of each of the codats from the relevance of each of the codats to the particular area of interest.

14. The node as recited in claim 12, wherein, to determine codat confidence in the one or more codats relevant to the particular area of interest received from the other node, the node is further configured to:
    determine popularity of each of the codats among the other nodes;
    determine relevance of each of the codats to the particular area of interest; and determine the codat confidence of each of the codats from the popularity of the particular codat and the relevance of the particular codat.

15. The node as recited in claim 12, wherein, to determine codat confidence in the one or more codats relevant to the particular area of interest received from the other node, the node is further configured to:
   determine confidence in the other node as a provider of codats in the particular area of interest; and
   determine the codat confidence in the one or more codats from the determined confidence in the other node.

16. The node as recited in claim 15, wherein, to determine confidence in the other node as a provider of codats in the particular area of interest, the node is further configured to:
   receive one or more confidences in the other node from one or more other nodes; and
   determine confidence in the other node as a provider of codats in the particular area of interest from the one or more confidences in the other node received from the one or more other nodes.

17. The node as recited in claim 11, wherein, to determine trust in the other node as a provider of codats, the node is further configured to:
   determine codat confidence in the one or more codats relevant to the particular area of interest received from the other node;
   determine risk associated with the other node from one or more of integrity of codats provided by the other node, accessibility of the other node, and performance of the other node; and
   determine the trust in the other node from the determined codat confidence in the one or more codats and the determined risk associated with the other node.

18. The node as recited in claim 11, wherein the node is configured to store a confidence in the other node as a provider of codats in the particular area of interest, and wherein, to determine trust in the other node as a provider of codats, the node is further configured to:
   determine codat confidence in the one or more codats relevant to the particular area of interest received from the other node;
   modify the stored confidence in the other node in accordance with the determined codat confidence in the one or more codats; and
   determine the trust in the other node from the modified confidence in the other node.

19. The node as recited in claim 11, wherein the node is further configured to participate with the other nodes as peer nodes in a peer-to-peer environment on the network.

20. The node as recited in claim 11, wherein the program instructions are further executable within the node to participate with the other nodes as peer nodes in
   a peer-to-peer environment on the network according to a peer-to-peer platform comprising one or more peer-to-peer platform protocols for enabling peer nodes to discover each other, to communicate with each other, and to find and exchange the codats in the peer-to-peer environment.

21. A method comprising:
   a node participating on a network with other nodes in an area of interest and to exchange codats relevant to the areas of interest with the other nodes, wherein a codat is computer-representable content or data;
   the node receiving one or more codats relevant to the area of interest from one of the other nodes; and
   the node determining trust in the other node as a provider of codats relevant to the particular area of interest from the one or more codats received from the other node and relevant to the particular area of interest.

22. The method as recited in claim 21, wherein, in said determining trust in the other node as a provider of codats, the method further comprises:
   determining codat confidence in the one or more codats relevant to the particular area of interest received from the other node; and
   determining the trust in the other node from the determined codat confidence in the one or more codats.

23. The method as recited in claim 22, wherein, in said determining codat confidence in the one or more codats relevant to the particular area of interest received from the other node, the method further comprises determining the codat confidence of each of the codats from the relevance of each of the codats to the particular area of interest.

24. The method as recited in claim 22, wherein, in said determining codat confidence in the one or more codats relevant to the particular area of interest received from the other node, the method further comprises:
   determining popularity of each of the codats among the other nodes;
   determining relevance of each of the codats to the particular area of interest; and
   determining the codat confidence of each of the codats from the popularity of the particular codat and the relevance of the particular codat.

25. The method as recited in claim 22, wherein, in said determining codat confidence in the one or more codats relevant to the particular area of interest received from the other node, the method further comprises:
   determining confidence in the other node as a provider of codats in the particular area of interest; and
   determining the codat confidence in the one or more codats from the determined confidence in the other node.

26. The method as recited in claim 25, wherein, in said determining confidence in the other node as a provider of codats in the particular area of interest, the method further comprises:
   receiving one or more confidences in the other node from one or more other nodes; and
   determining confidence in the other node as a provider of codats in the particular area of interest from the one or more confidences in the other node received from the one or more other nodes.

27. The method as recited in claim 21, wherein, in said determining trust in the other node as a provider of codats, the method further comprises:
   determining codat confidence in the one or more codats relevant to the particular area of interest received from the other node;
   determining risk associated with the other node from one or more of integrity of codats provided by the other node, accessibility of the other node, and performance of the other node; and
   determining the trust in the other node from the determined codat confidence in the one or more codats and the determined risk associated with the other node.

28. The method as recited in claim 21, wherein the node is configured to store a confidence in the other node as a provider of codats in the particular area of interest, and wherein, in said determining trust in the other node as a provider of codats, the method further comprises:
   determining codat confidence in the one or more codats relevant to the particular area of interest received from the other node;

modifying the stored confidence in the other node in accordance with the determined codat confidence in the one or more codats; and determining the trust in the other node from the modified confidence in the other node.

29. The method as recited in claim 21, further comprising the node participating with the other nodes as peer nodes in a peer-to-peer environment on the network.

30. The method as recited in claim 21, wherein the nodes are configured to implement a peer-to-peer environment on the network according to a peer-to-peer platform comprising one or more peer-to-peer platform protocols for enabling the nodes to discover each other, communicate with each other, and to find and exchange the codats in the peer-to-peer environment.

31. A tangible, computer-accessible storage medium comprising software instructions executable to implement:

a node participating on a network with other nodes in an area of interest and to exchange codats relevant to the areas of interest with the other nodes, wherein a codat is computer-representable content or data;

the node receiving one or more codats relevant to the area of interest from one of the other nodes; and the node determining trust in the other node as a provider of codats relevant to the particular area of interest from the one or more codats received from the other node and relevant to the particular area of interest.

32. The tangible, computer-accessible storage medium as recited in claim 31, wherein, in said determining trust in the other node as a provider of codats, the software instructions are further executable to implement:

determining codat confidence in the one or more codats relevant to the particular area of interest received from the other node; and determining the trust in the other node from the determined codat confidence in the one or more codats.

33. The tangible, computer-accessible storage medium as recited in claim 32, wherein, in said determining codat confidence in the one or more codats relevant to the particular area of interest received from the other node, the software instructions are further executable to implement determining the codat confidence of each of the codats from the relevance of each of the codats to the particular area of interest.

34. The tangible, computer-accessible storage medium as recited in claim 32, wherein, in said determining codat confidence in the one or more codats relevant to the particular area of interest received from the other node, the software instructions are further executable to implement:

determining popularity of each of the codats among the other nodes;

determining relevance of each of the codats to the particular area of interest; and determining the codat confidence of each of the codats from the popularity of the particular codat and the relevance of the particular codat.

35. The tangible, computer-accessible storage medium as recited in claim 32, wherein, in said determining codat confidence in the one or more codats relevant to the particular area of interest received from the other node, the software instructions are further executable to implement:

determining confidence in the other node as a provider of codats in the particular area of interest; and determining the codat confidence in the one or more codats from the determined confidence in the other node.

36. The tangible, computer-accessible storage medium as recited in claim 35, wherein, in said determining confidence in the other node as a provider of codats in the particular area of interest, the software instructions are further executable to implement:

receiving one or more confidences in the other node from one or more other nodes; and determining confidence in the other node as a provider of codats in the particular area of interest from the one or more confidences in the other node received from the one or more other nodes.

37. The tangible, computer-accessible storage medium as recited in claim 31, wherein, in said determining trust in the other node as a provider of codats, the software instructions are further executable to implement:

determining codat confidence in the one or more codats relevant to the particular area of interest received from the other node;

determining risk associated with the other node from one or more of integrity of codats provided by the other node, accessibility of the other node, and performance of the other node; and determining the trust in the other node from the determined codat confidence in the one or more codats and the determined risk associated with the other node.

38. The tangible, computer-accessible storage medium as recited in claim 31, wherein the node is configured to store a confidence in the other node as a provider of codats in the particular area of interest, and wherein, in said determining trust in the other node as a provider of codats, the software instructions are further executable to implement:

determining codat confidence in the one or more codats relevant to the particular area of interest received from the other node;

modifying the stored confidence in the other node in accordance with the determined codat confidence in the one or more codats; and determining the trust in the other node from the modified confidence in the other node.

39. The tangible, computer-accessible storage medium as recited in claim 31, wherein the node is configured to participate with the other nodes as peer nodes in a peer-to-peer environment on the network.

40. The tangible, computer-accessible storage medium as recited in claim 31, wherein the nodes are configured to implement a peer-to-peer environment on the network according to a peer-to-peer platform comprising one or more peer-to-peer platform protocols for enabling the nodes to discover each other, communicate with each other, and to find and exchange the codats in the peer-to-peer environment.

* * * * *